(12) United States Patent
Nana et al.

(10) Patent No.: US 12,374,711 B2
(45) Date of Patent: *Jul. 29, 2025

(54) REVERSE ELECTRODIALYSIS OR PRESSURE-RETARDED OSMOSIS CELL WITH HEAT PUMP

(71) Applicants: Rahul S. Nana, Panama City, FL (US); Rafael A. Feria, Pickens, SC (US)

(72) Inventors: Rahul S. Nana, Panama City, FL (US); Rafael A. Feria, Pickens, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,039

(22) Filed: Nov. 15, 2023

(65) Prior Publication Data

US 2024/0162469 A1    May 16, 2024

Related U.S. Application Data

(63) Continuation of application No. 18/314,261, filed on May 9, 2023, now Pat. No. 11,855,324.

(Continued)

(51) Int. Cl.
*H01M 8/22* (2006.01)
*B01D 5/00* (2006.01)
(Continued)

(52) U.S. Cl.
CPC ............ *H01M 8/227* (2013.01); *B01D 5/006* (2013.01); *B01D 53/18* (2013.01); *B01D 61/002* (2013.01);
(Continued)

(58) Field of Classification Search
CPC ............ H01M 8/04007; H01M 8/227; H01M 8/04029; H01M 8/0693; C25B 1/04
See application file for complete search history.

(56) References Cited

U.S. PATENT DOCUMENTS

| 4,171,409 A | 10/1979 | Loeb |
| 4,283,913 A | 8/1981 | Loeb |

(Continued)

FOREIGN PATENT DOCUMENTS

| AU | 2010201962 A1 | 12/2010 |
| BR | MU8702650 U2 | 4/2009 |

(Continued)

OTHER PUBLICATIONS

Fumatech https://www.fumatech.com/en/products/membranes-pem-water-electrolysis/ pp. 1-2 (Year: 2024).*

(Continued)

*Primary Examiner* — Christopher P Domone
(74) *Attorney, Agent, or Firm* — Fox Rothschild LLP

(57) ABSTRACT

A method and a system of generating electrical power or hydrogen from thermal energy is disclosed. The method includes separating, by a selectively permeable membrane, a first saline solution from a second saline solution, receiving, by the first saline solution and/or the second saline solution, thermal energy from a heat source, and mixing the first saline solution and the second saline solution in a controlled manner, capturing at least some salinity-gradient energy as electrical power as the salinity difference between the first saline solution and the second saline solution decreases. The method further includes transferring, by a heat pump, thermal energy from the first saline solution to the second saline solution, causing the salinity difference between the first saline solution and the second saline solution to increase. The method and system may include a regeneration process, such as membrane distillation, forward osmosis, electrodialysis, salt evaporation and/or salt decomposition.

22 Claims, 19 Drawing Sheets

Related U.S. Application Data

(60) Provisional application No. 63/490,405, filed on Mar. 15, 2023, provisional application No. 63/425,511, filed on Nov. 15, 2022.

(51) Int. Cl.

| | | |
|---|---|---|
| *B01D 53/18* | (2006.01) | |
| *B01D 61/00* | (2006.01) | |
| *B01D 61/36* | (2006.01) | |
| *B01D 61/44* | (2006.01) | |
| *B01D 69/02* | (2006.01) | |
| *C25B 1/04* | (2021.01) | |
| *C25B 9/65* | (2021.01) | |
| *H01M 8/04029* | (2016.01) | |
| *H01M 8/06* | (2016.01) | |
| *H02N 11/00* | (2006.01) | |

(52) U.S. Cl.
CPC .......... *B01D 61/364* (2013.01); *B01D 61/44* (2013.01); *B01D 69/02* (2013.01); *C25B 1/04* (2013.01); *C25B 9/65* (2021.01); *H01M 8/04029* (2013.01); *H01M 8/0693* (2013.01); *H02N 11/002* (2013.01); *B01D 2313/221* (2022.08); *B01D 2313/502* (2022.08); *B01D 2325/38* (2013.01)

(56) References Cited

U.S. PATENT DOCUMENTS

| | | | |
|---|---|---|---|
| 4,390,402 A | 6/1983 | Mani et al. | |
| 4,404,081 A | 9/1983 | Murphy | |
| 5,238,574 A | 8/1993 | Kawashima et al. | |
| 5,421,962 A | 6/1995 | Shvarts et al. | |
| 5,496,659 A | 3/1996 | Zito | |
| 5,618,507 A | 4/1997 | Olper et al. | |
| 5,643,968 A | 7/1997 | Andreola et al. | |
| 6,030,535 A | 2/2000 | Hayashi et al. | |
| 6,042,701 A | 3/2000 | Lichtwardt et al. | |
| 6,187,201 B1 | 2/2001 | Abe et al. | |
| 6,569,298 B2 | 5/2003 | Merida-Donis | |
| 6,783,682 B1 | 8/2004 | Awerbuch | |
| 7,037,430 B2 | 5/2006 | Donaldson et al. | |
| 7,127,894 B2 | 10/2006 | Battah | |
| 7,189,325 B2 | 3/2007 | Wobben | |
| 7,303,674 B2 | 12/2007 | Lampi et al. | |
| 7,550,088 B2 | 6/2009 | Wobben | |
| 7,628,921 B2 | 12/2009 | Efraty | |
| 7,879,243 B2 | 2/2011 | Al-Mayahi et al. | |
| 7,901,577 B2 | 3/2011 | SenGupta et al. | |
| 7,914,680 B2 | 3/2011 | Cath et al. | |
| 8,029,671 B2 | 10/2011 | Cath et al. | |
| 8,062,527 B2 | 11/2011 | Ito et al. | |
| 8,083,942 B2 | 12/2011 | Cath et al. | |
| 8,099,198 B2 | 1/2012 | Gurin | |
| 8,123,948 B2 | 2/2012 | Jensen | |
| 8,142,942 B2 | 3/2012 | Imanaka | |
| 8,177,978 B2 | 5/2012 | Kurth et al. | |
| 8,197,664 B2 | 6/2012 | Murahara | |
| 8,216,474 B2 | 7/2012 | Cath et al. | |
| 8,323,491 B2 | 12/2012 | Brauns | |
| 8,647,509 B2 | 2/2014 | Vora et al. | |
| 8,685,249 B2 | 4/2014 | Takeuchi et al. | |
| 8,695,343 B2 | 4/2014 | Moe | |
| 8,758,954 B2 | 6/2014 | Van Baak et al. | |
| 8,834,712 B2 | 9/2014 | Katayama et al. | |
| 8,871,074 B2 | 10/2014 | Suh et al. | |
| 8,915,378 B2 | 12/2014 | Tokimi et al. | |
| 8,932,448 B2 | 1/2015 | Valk et al. | |
| 8,956,782 B2 | 2/2015 | Van Berchum et al. | |
| 8,956,783 B2 | 2/2015 | Antheunis et al. | |
| 8,968,963 B2 | 3/2015 | Van Berchum et al. | |
| 8,968,964 B2 | 3/2015 | Antheunis et al. | |
| 8,968,965 B2 | 3/2015 | Antheunis et al. | |
| 8,980,100 B2 | 3/2015 | Chidambaran | |
| 9,067,811 B1 | 6/2015 | Bennett et al. | |
| 9,108,169 B2 | 8/2015 | Sano et al. | |
| 9,112,217 B2 | 8/2015 | Kim et al. | |
| 9,156,714 B2 | 10/2015 | McCluskey et al. | |
| 9,216,385 B2 | 12/2015 | Isaias et al. | |
| 9,227,168 B1 | 1/2016 | DeVaul et al. | |
| 9,242,213 B1 | 1/2016 | Aylesworth | |
| 9,278,315 B2 | 3/2016 | Davis et al. | |
| 9,297,366 B2 | 3/2016 | Paripati et al. | |
| 9,359,998 B2 | 6/2016 | Linnig et al. | |
| 9,382,135 B2 | 7/2016 | Moe et al. | |
| 9,409,117 B2 | 8/2016 | Ukai et al. | |
| 9,433,900 B2 | 9/2016 | Ordonez Fernandez | |
| 9,474,998 B2 | 10/2016 | Koo et al. | |
| 9,502,720 B2 | 11/2016 | Tsai et al. | |
| 9,540,255 B2 | 1/2017 | Kang et al. | |
| 9,556,316 B2 | 1/2017 | Antheunis | |
| 9,604,178 B1 | 3/2017 | Bharwada et al. | |
| 9,611,368 B2 | 4/2017 | Lin | |
| 9,675,940 B2 | 6/2017 | Van Berchum et al. | |
| 9,688,548 B2 | 6/2017 | Dette et al. | |
| 9,751,046 B2 | 9/2017 | Sakai et al. | |
| 9,851,129 B1 * | 12/2017 | Tanner .................. H01M 8/227 |
| 9,915,436 B2 | 3/2018 | Feria | |
| 9,932,257 B2 | 4/2018 | Prakash et al. | |
| 9,938,167 B2 | 4/2018 | Su et al. | |
| 9,944,765 B2 | 4/2018 | Antheunis | |
| 9,950,297 B2 | 4/2018 | Chang et al. | |
| 9,957,169 B2 | 5/2018 | Shinoda et al. | |
| 9,982,104 B2 | 5/2018 | Choi et al. | |
| 9,988,287 B2 | 6/2018 | Cai | |
| 10,029,927 B2 | 7/2018 | Murtha et al. | |
| 10,046,280 B2 | 8/2018 | Hayakawa et al. | |
| 10,065,868 B2 | 9/2018 | Alshahrani | |
| 10,093,747 B2 | 10/2018 | Kurihara et al. | |
| 10,118,836 B2 | 11/2018 | Dette et al. | |
| 10,144,654 B2 | 12/2018 | Govindan et al. | |
| 10,177,396 B2 | 1/2019 | Van Baak | |
| 10,189,733 B2 | 1/2019 | Wallace | |
| 10,221,491 B2 | 3/2019 | Blunn et al. | |
| 10,226,740 B2 | 3/2019 | Wallace | |
| 10,308,524 B1 | 6/2019 | Ahmed et al. | |
| 10,336,638 B1 | 7/2019 | Bader | |
| 10,363,688 B2 | 7/2019 | Moon et al. | |
| 10,384,164 B2 | 8/2019 | Iyer | |
| 10,384,165 B1 | 8/2019 | Haidar et al. | |
| 10,399,878 B2 | 9/2019 | Ukai et al. | |
| 10,473,091 B2 | 11/2019 | Halloy et al. | |
| 10,562,793 B2 | 2/2020 | Cioanta et al. | |
| 10,597,309 B2 | 3/2020 | Alshahrani | |
| 10,603,636 B2 | 3/2020 | Bublitz | |
| 10,615,441 B2 | 4/2020 | Kaku et al. | |
| 10,626,029 B2 | 4/2020 | Lin | |
| 10,626,037 B2 | 4/2020 | Lienhard et al. | |
| 10,653,976 B2 | 5/2020 | Miki | |
| 10,829,913 B1 | 11/2020 | Ahmed et al. | |
| 10,830,508 B2 | 11/2020 | Tanner | |
| 10,934,181 B2 | 3/2021 | Constantz | |
| 10,954,145 B2 | 3/2021 | Ortiz Diaz-Guerra et al. | |
| 10,988,391 B2 | 4/2021 | Kim et al. | |
| 11,000,806 B2 | 5/2021 | Efraty | |
| 11,002,373 B2 | 5/2021 | Fink et al. | |
| 11,014,833 B2 | 5/2021 | Weng | |
| 11,014,834 B2 | 5/2021 | Janson et al. | |
| 11,067,317 B2 | 7/2021 | Feria | |
| 11,198,096 B1 | 12/2021 | Efraty | |
| 11,198,097 B2 | 12/2021 | Wei et al. | |
| 11,220,448 B2 | 1/2022 | Scheu | |
| 11,502,322 B1 | 11/2022 | Nana | |
| 11,502,323 B1 | 11/2022 | Nana | |
| 11,563,229 B1 | 1/2023 | Nana | |
| 11,566,823 B1 | 1/2023 | Feria | |
| 11,611,099 B1 | 3/2023 | Nana | |
| 11,855,324 B1 * | 12/2023 | Nana .................... B01D 61/002 |
| 2004/0013918 A1 | 1/2004 | Merida-Donis | |
| 2004/0219400 A1 | 11/2004 | Al-Hallaj et al. | |
| 2005/0006295 A1 | 1/2005 | Bharwada | |
| 2005/0067352 A1 | 3/2005 | Kontos | |

(56) References Cited

U.S. PATENT DOCUMENTS

| | | |
|---|---|---|
| 2005/0103631 A1 | 5/2005 | Freydina et al. |
| 2006/0263646 A1 | 11/2006 | Seale |
| 2007/0227966 A1 | 10/2007 | Koo et al. |
| 2009/0272692 A1 | 11/2009 | Kurth et al. |
| 2010/0163471 A1 | 7/2010 | Elyanow et al. |
| 2011/0042219 A1 | 2/2011 | Wei et al. |
| 2011/0050158 A1 | 3/2011 | MacDonald et al. |
| 2011/0100218 A1 | 5/2011 | Wolfe |
| 2011/0117395 A1 | 5/2011 | Roodenburg |
| 2011/0309020 A1 | 12/2011 | Rietman et al. |
| 2012/0018365 A1 | 1/2012 | Iyer |
| 2012/0080377 A1 | 4/2012 | Jensen et al. |
| 2012/0132591 A1 | 5/2012 | Zhu et al. |
| 2012/0160753 A1 | 6/2012 | Vora et al. |
| 2013/0001162 A1 | 1/2013 | Yangali-Quintanilla et al. |
| 2013/0101486 A1 | 4/2013 | Liu et al. |
| 2013/0288142 A1 | 10/2013 | Fu et al. |
| 2014/0021135 A1 | 1/2014 | Sawyer et al. |
| 2014/0042089 A1 | 2/2014 | Matsui et al. |
| 2014/0246371 A1 | 9/2014 | Cao et al. |
| 2014/0255813 A1 | 9/2014 | Kingsbury |
| 2014/0308712 A1 | 10/2014 | Hanakawa et al. |
| 2015/0165380 A1 | 6/2015 | Jung et al. |
| 2015/0266762 A1 | 9/2015 | Jang et al. |
| 2016/0016116 A1 | 1/2016 | Ge et al. |
| 2016/0023925 A1 | 1/2016 | Liu |
| 2016/0115061 A1 | 4/2016 | Ukai et al. |
| 2016/0376680 A1 | 12/2016 | Abuhasel et al. |
| 2017/0014758 A1 | 1/2017 | Wilkinson et al. |
| 2017/0098846 A1 | 4/2017 | Watakabe et al. |
| 2017/0152159 A1 | 6/2017 | Stauffer |
| 2017/0173532 A1 | 6/2017 | Ide et al. |
| 2017/0240439 A1 | 8/2017 | Lin |
| 2017/0326499 A1 | 11/2017 | Iyer |
| 2017/0334738 A1 | 11/2017 | Suh |
| 2018/0126336 A1 | 5/2018 | Iyer |
| 2018/0147532 A1 | 5/2018 | Switzer et al. |
| 2018/0169541 A1 | 6/2018 | Anderson |
| 2018/0180034 A1 | 6/2018 | Wei |
| 2018/0326366 A1 | 11/2018 | Kim et al. |
| 2019/0226463 A1 | 7/2019 | Feng et al. |
| 2019/0374780 A1 | 12/2019 | Hestekin et al. |
| 2020/0047130 A1 | 2/2020 | Ishii |
| 2020/0061541 A1 | 2/2020 | Herron et al. |
| 2020/0101427 A1 | 4/2020 | Gao et al. |
| 2020/0267894 A1 | 8/2020 | Maisonneuve |
| 2020/0292207 A1 | 9/2020 | Feria |
| 2020/0316354 A1 | 10/2020 | Jeong et al. |
| 2021/0002148 A1 | 1/2021 | Sato et al. |
| 2021/0024375 A1 | 1/2021 | Cen et al. |
| 2021/0054252 A1 | 2/2021 | Novek |
| 2021/0087697 A1 | 3/2021 | Riabtsev et al. |
| 2021/0268438 A1 | 9/2021 | Nishiura |
| 2021/0323851 A1 | 10/2021 | Jones et al. |
| 2022/0002170 A1 | 1/2022 | Phatak |

FOREIGN PATENT DOCUMENTS

| | | |
|---|---|---|
| CA | 2604132 A1 | 5/2009 |
| CN | 1208719 A | 2/1999 |
| CN | 1375461 A | 10/2002 |
| CN | 2883340 Y | 3/2007 |
| CN | 101029733 A | 9/2007 |
| CN | 101767840 A | 7/2010 |
| CN | 101891267 A | 11/2010 |
| CN | 101955277 A | 1/2011 |
| CN | 101967017 A | 2/2011 |
| CN | 201746366 U | 2/2011 |
| CN | 102040258 A | 5/2011 |
| CN | 102134137 A | 7/2011 |
| CN | 202054635 U | 11/2011 |
| CN | 202056062 U | 11/2011 |
| CN | 202072502 U | 12/2011 |
| CN | 101358578 B | 5/2012 |
| CN | 202246147 U | 5/2012 |
| CN | 102120663 B | 7/2012 |
| CN | 102747717 A | 10/2012 |
| CN | 202474102 U | 10/2012 |
| CN | 202586809 U | 12/2012 |
| CN | 102211803 B | 1/2013 |
| CN | 102452751 B | 1/2013 |
| CN | 102897800 A | 1/2013 |
| CN | 202729841 U | 2/2013 |
| CN | 102963966 A | 3/2013 |
| CN | 202811178 U | 3/2013 |
| CN | 202811240 U | 3/2013 |
| CN | 202924780 U | 5/2013 |
| CN | 103172189 A | 6/2013 |
| CN | 102627339 B | 7/2013 |
| CN | 102795686 B | 7/2013 |
| CN | 103193304 A | 7/2013 |
| CN | 203112560 U | 8/2013 |
| CN | 203159267 U | 8/2013 |
| CN | 102976559 B | 9/2013 |
| CN | 103362763 A | 10/2013 |
| CN | 203222497 U | 10/2013 |
| CN | 203229396 U | 10/2013 |
| CN | 203360202 U | 12/2013 |
| CN | 103570088 A | 2/2014 |
| CN | 103274488 B | 4/2014 |
| CN | 203530063 U | 4/2014 |
| CN | 102840091 B | 5/2014 |
| CN | 102840092 B | 5/2014 |
| CN | 102840093 B | 5/2014 |
| CN | 102852702 B | 5/2014 |
| CN | 102852703 B | 5/2014 |
| CN | 102852704 B | 5/2014 |
| CN | 203625184 U | 6/2014 |
| CN | 102610844 B | 7/2014 |
| CN | 103101932 B | 7/2014 |
| CN | 103359896 B | 7/2014 |
| CN | 102464343 B | 8/2014 |
| CN | 102812884 B | 8/2014 |
| CN | 103288285 B | 8/2014 |
| CN | 203781962 U | 8/2014 |
| CN | 104098157 A | 10/2014 |
| CN | 104140135 A | 11/2014 |
| CN | 204058158 U | 12/2014 |
| CN | 102757138 B | 1/2015 |
| CN | 104370394 A | 2/2015 |
| CN | 103818978 B | 4/2015 |
| CN | 104534731 A | 4/2015 |
| CN | 204301361 U | 4/2015 |
| CN | 104601042 A | 5/2015 |
| CN | 204334382 U | 5/2015 |
| CN | 204434315 U | 7/2015 |
| CN | 103708665 B | 10/2015 |
| CN | 204689747 U | 10/2015 |
| CN | 105048870 A | 11/2015 |
| CN | 204752255 U | 11/2015 |
| CN | 105110543 A | 12/2015 |
| CN | 204848326 U | 12/2015 |
| CN | 204897499 U | 12/2015 |
| CN | 104071875 B | 1/2016 |
| CN | 105254101 A | 1/2016 |
| CN | 105428089 A | 3/2016 |
| CN | 205088043 U | 3/2016 |
| CN | 104591461 B | 4/2016 |
| CN | 105502756 A | 4/2016 |
| CN | 205133216 U | 4/2016 |
| CN | 205170431 U | 4/2016 |
| CN | 103964527 B | 5/2016 |
| CN | 104649478 B | 5/2016 |
| CN | 105540930 A | 5/2016 |
| CN | 105540953 A | 5/2016 |
| CN | 105540970 A | 5/2016 |
| CN | 103615363 B | 6/2016 |
| CN | 205313150 U | 6/2016 |
| CN | 205328675 U | 6/2016 |
| CN | 105810985 A | 7/2016 |
| CN | 205442690 U | 8/2016 |
| CN | 205472805 U | 8/2016 |
| CN | 105948337 A | 9/2016 |
| CN | 205590347 U | 9/2016 |

(56) References Cited

FOREIGN PATENT DOCUMENTS

| | | |
|---|---|---|
| CN | 205590348 U | 9/2016 |
| CN | 205603350 U | 9/2016 |
| CN | 104355473 B | 10/2016 |
| CN | 106058921 A | 10/2016 |
| CN | 106145229 A | 11/2016 |
| CN | 205740453 U | 11/2016 |
| CN | 205740598 U | 11/2016 |
| CN | 106207234 A | 12/2016 |
| CN | 106219648 A | 12/2016 |
| CN | 106242145 A | 12/2016 |
| CN | 106277120 A | 1/2017 |
| CN | 106277121 A | 1/2017 |
| CN | 106277122 A | 1/2017 |
| CN | 106277123 A | 1/2017 |
| CN | 106277124 A | 1/2017 |
| CN | 106277125 A | 1/2017 |
| CN | 106277133 A | 1/2017 |
| CN | 106277134 A | 1/2017 |
| CN | 106277135 A | 1/2017 |
| CN | 106277136 A | 1/2017 |
| CN | 106277137 A | 1/2017 |
| CN | 106348510 A | 1/2017 |
| CN | 106365233 A | 2/2017 |
| CN | 106365234 A | 2/2017 |
| CN | 106379961 A | 2/2017 |
| CN | 106395926 A | 2/2017 |
| CN | 106400879 A | 2/2017 |
| CN | 106430786 A | 2/2017 |
| CN | 205974125 U | 2/2017 |
| CN | 105060380 B | 3/2017 |
| CN | 106477800 A | 3/2017 |
| CN | 104944487 B | 4/2017 |
| CN | 106554103 A | 4/2017 |
| CN | 206098553 U | 4/2017 |
| CN | 104986818 B | 5/2017 |
| CN | 106630359 A | 5/2017 |
| CN | 106242133 B | 6/2017 |
| CN | 106830479 A | 6/2017 |
| CN | 206244450 U | 6/2017 |
| CN | 206279019 U | 6/2017 |
| CN | 104153946 B | 7/2017 |
| CN | 105261808 B | 7/2017 |
| CN | 106981674 A | 7/2017 |
| CN | 206308197 U | 7/2017 |
| CN | 107008155 A | 8/2017 |
| CN | 107165791 A | 9/2017 |
| CN | 107188358 A | 9/2017 |
| CN | 206529357 U | 9/2017 |
| CN | 105439351 B | 10/2017 |
| CN | 105439352 B | 10/2017 |
| CN | 105439353 B | 10/2017 |
| CN | 105439354 B | 10/2017 |
| CN | 105540968 B | 10/2017 |
| CN | 206592241 U | 10/2017 |
| CN | 107311353 A | 11/2017 |
| CN | 107326387 A | 11/2017 |
| CN | 107522307 A | 12/2017 |
| CN | 104944492 B | 1/2018 |
| CN | 206878725 U | 1/2018 |
| CN | 105502784 B | 3/2018 |
| CN | 207064144 U | 3/2018 |
| CN | 105753104 B | 4/2018 |
| CN | 107922213 A | 4/2018 |
| CN | 107973481 A | 5/2018 |
| CN | 107987844 A | 5/2018 |
| CN | 108083518 A | 5/2018 |
| CN | 108097059 A | 6/2018 |
| CN | 108114599 A | 6/2018 |
| CN | 207478339 U | 6/2018 |
| CN | 108380050 A | 8/2018 |
| CN | 108423733 A | 8/2018 |
| CN | 108439675 A | 8/2018 |
| CN | 108910996 A | 11/2018 |
| CN | 108996616 A | 12/2018 |
| CN | 109020021 A | 12/2018 |
| CN | 208279441 U | 12/2018 |
| CN | 208327445 U | 1/2019 |
| CN | 208394968 U | 1/2019 |
| CN | 105800886 B | 2/2019 |
| CN | 109304088 A | 2/2019 |
| CN | 109311709 A | 2/2019 |
| CN | 109534568 A | 3/2019 |
| CN | 109534585 A | 3/2019 |
| CN | 208639229 U | 3/2019 |
| CN | 109593973 A | 4/2019 |
| CN | 109599572 A | 4/2019 |
| CN | 109607918 A | 4/2019 |
| CN | 106492639 B | 5/2019 |
| CN | 109810254 A | 5/2019 |
| CN | 208916850 U | 5/2019 |
| CN | 103269777 B | 6/2019 |
| CN | 106995253 B | 6/2019 |
| CN | 109867317 A | 6/2019 |
| CN | 109889099 A | 6/2019 |
| CN | 109928561 A | 6/2019 |
| CN | 106587446 B | 7/2019 |
| CN | 109956604 A | 7/2019 |
| CN | 109957885 A | 7/2019 |
| CN | 110104851 A | 8/2019 |
| CN | 110182915 A | 8/2019 |
| CN | 209259726 U | 8/2019 |
| CN | 110204009 A | 9/2019 |
| CN | 209411984 U | 9/2019 |
| CN | 110358143 A | 10/2019 |
| CN | 107158968 B | 11/2019 |
| CN | 110407276 A | 11/2019 |
| CN | 110498523 A | 11/2019 |
| CN | 209567937 U | 11/2019 |
| CN | 209685356 U | 11/2019 |
| CN | 110560179 A | 12/2019 |
| CN | 110601600 A | 12/2019 |
| CN | 209721842 U | 12/2019 |
| CN | 110683693 A | 1/2020 |
| CN | 110734178 A | 1/2020 |
| CN | 110776185 A | 2/2020 |
| CN | 210122508 U | 3/2020 |
| CN | 107158967 B | 4/2020 |
| CN | 109617455 B | 4/2020 |
| CN | 111036098 A | 4/2020 |
| CN | 111056676 A | 4/2020 |
| CN | 210313850 U | 4/2020 |
| CN | 111170517 A | 5/2020 |
| CN | 210620293 U | 5/2020 |
| CN | 108123152 B | 6/2020 |
| CN | 111268754 A | 6/2020 |
| CN | 111282443 A | 6/2020 |
| CN | 111342703 A | 6/2020 |
| CN | 106877742 B | 7/2020 |
| CN | 107265734 B | 7/2020 |
| CN | 110510712 B | 7/2020 |
| CN | 111470704 A | 7/2020 |
| CN | 211056755 U | 7/2020 |
| CN | 111517533 A | 8/2020 |
| CN | 111564884 A | 8/2020 |
| CN | 111573787 A | 8/2020 |
| CN | 211310967 U | 8/2020 |
| CN | 107362694 B | 9/2020 |
| CN | 109179832 B | 9/2020 |
| CN | 109811358 B | 9/2020 |
| CN | 211497236 U | 9/2020 |
| CN | 211595081 U | 9/2020 |
| CN | 106915789 B | 10/2020 |
| CN | 106927541 B | 10/2020 |
| CN | 111744364 A | 10/2020 |
| CN | 111763103 A | 10/2020 |
| CN | 111792743 A | 10/2020 |
| CN | 211644724 U | 10/2020 |
| CN | 111871219 A | 11/2020 |
| CN | 111943398 A | 11/2020 |
| CN | 111995011 A | 11/2020 |
| CN | 111807473 B | 12/2020 |
| CN | 107954528 B | 1/2021 |
| CN | 112266050 A | 1/2021 |
| CN | 212403781 U | 1/2021 |

(56) References Cited

FOREIGN PATENT DOCUMENTS

| | | |
|---|---|---|
| CN | 108083369 B | 2/2021 |
| CN | 109802163 B | 2/2021 |
| CN | 112299515 A | 2/2021 |
| CN | 212504155 U | 2/2021 |
| CN | 212504424 U | 2/2021 |
| CN | 212581574 U | 2/2021 |
| CN | 110316913 B | 3/2021 |
| CN | 112436758 A | 3/2021 |
| CN | 112456608 A | 3/2021 |
| CN | 112479314 A | 3/2021 |
| CN | 112479467 A | 3/2021 |
| CN | 112520915 A | 3/2021 |
| CN | 112551624 A | 3/2021 |
| CN | 112569805 A | 3/2021 |
| CN | 108976258 B | 4/2021 |
| CN | 112607806 A | 4/2021 |
| CN | 112610433 A | 4/2021 |
| CN | 112661223 A | 4/2021 |
| CN | 112694180 A | 4/2021 |
| CN | 112707566 A | 4/2021 |
| CN | 109336206 B | 5/2021 |
| CN | 108716447 B | 6/2021 |
| CN | 111628675 B | 6/2021 |
| CN | 112194136 B | 6/2021 |
| CN | 112713808 B | 6/2021 |
| CN | 112892230 A | 6/2021 |
| CN | 112910314 A | 6/2021 |
| CN | 112939321 A | 6/2021 |
| CN | 213416391 U | 6/2021 |
| CN | 108025930 B | 7/2021 |
| CN | 113134305 A | 7/2021 |
| CN | 113137338 A | 7/2021 |
| CN | 113153676 A | 7/2021 |
| CN | 213656765 U | 7/2021 |
| CN | 109250846 B | 8/2021 |
| CN | 110746657 B | 8/2021 |
| CN | 112973463 B | 8/2021 |
| CN | 113233623 A | 8/2021 |
| CN | 113278152 A | 8/2021 |
| CN | 113292144 A | 8/2021 |
| CN | 113321257 A | 8/2021 |
| CN | 113415838 A | 9/2021 |
| CN | 113244779 B | 10/2021 |
| CN | 113461887 A | 10/2021 |
| CN | 214400132 U | 10/2021 |
| CN | 112678930 B | 11/2021 |
| CN | 214571328 U | 11/2021 |
| CN | 214654101 U | 11/2021 |
| CN | 214654190 U | 11/2021 |
| CN | 109534465 B | 12/2021 |
| CN | 109867313 B | 12/2021 |
| CN | 110523296 B | 12/2021 |
| CN | 215539863 U | 1/2022 |
| DE | 114941 A1 | 9/1975 |
| DE | 2510168 A1 | 9/1976 |
| DE | 2829530 A1 | 1/1980 |
| DE | 2847519 A1 | 5/1980 |
| DE | 2851105 A1 | 5/1980 |
| DE | 3714628 A1 | 11/1987 |
| DE | 19620214 A1 | 10/1996 |
| DE | 19603494 C2 | 2/1998 |
| DE | 19649146 A1 | 5/1998 |
| DE | 19714512 C2 | 6/1999 |
| DE | 10222316 B4 | 5/2004 |
| DE | 202007013079 U1 | 12/2007 |
| DE | 102009051845 A1 | 9/2011 |
| DE | 102014225190 A1 | 6/2016 |
| DK | 166657 B | 6/1993 |
| EA | 31763 B1 | 2/2019 |
| EP | 979801 A1 | 2/2000 |
| EP | 1426097 A1 | 6/2004 |
| EP | 1833595 A1 | 9/2007 |
| EP | 1935479 B1 | 9/2009 |
| EP | 2125173 A1 | 12/2009 |
| EP | 2089142 B1 | 7/2010 |
| EP | 2374760 A1 | 10/2011 |
| EP | 1540019 B1 | 4/2012 |
| EP | 2516561 A1 | 10/2012 |
| EP | 2546201 A1 | 1/2013 |
| EP | 2122736 B1 | 11/2013 |
| EP | 2697512 A1 | 2/2014 |
| EP | 2507515 B1 | 7/2016 |
| EP | 2804682 B1 | 11/2016 |
| EP | 2367613 B1 | 3/2018 |
| EP | 3201140 B1 | 7/2018 |
| EP | 2996989 B1 | 10/2018 |
| EP | 3643683 A2 | 4/2020 |
| EP | 3680847 A1 | 7/2020 |
| EP | 3708544 A1 | 9/2020 |
| EP | 2857441 B1 | 10/2020 |
| EP | 3656461 A4 | 3/2021 |
| EP | 3912707 A1 | 11/2021 |
| EP | 3939692 A1 | 1/2022 |
| ES | 2299396 B1 | 4/2009 |
| ES | 1229209 U | 5/2019 |
| ES | 1229209 Y | 7/2019 |
| ES | 1248815 Y | 9/2020 |
| ES | 2814028 A1 | 3/2021 |
| FR | 2583738 A1 | 12/1986 |
| FR | 2848877 B1 | 4/2012 |
| GB | 2194669 A | 3/1988 |
| GB | 2194855 A | 3/1988 |
| GB | 2197116 A | 5/1988 |
| GB | 2202550 A | 9/1988 |
| GB | 2195818 B | 8/1990 |
| GB | 2442941 A | 4/2008 |
| IL | 72916 A | 9/1987 |
| IL | 147905 | 7/2005 |
| IL | 225697 | 8/2017 |
| IN | 201500935 I1 | 10/2016 |
| IN | 201741039747 A | 12/2017 |
| IN | 202011038480 A | 10/2020 |
| JP | 60168504 A | 9/1985 |
| JP | 63100996 A | 6/1988 |
| JP | 2002306118 A | 10/2002 |
| JP | 2003031255 A | 1/2003 |
| JP | 2003120427 A | 4/2003 |
| JP | 2003305343 A | 10/2003 |
| JP | 2003340439 A | 12/2003 |
| JP | 2004012303 A | 1/2004 |
| JP | 2005049173 A | 2/2005 |
| JP | 03637458 B2 | 4/2005 |
| JP | 2005268114 A | 9/2005 |
| JP | 2006004797 A | 1/2006 |
| JP | 2006004832 A | 1/2006 |
| JP | 03773437 B2 | 5/2006 |
| JP | 03906677 B2 | 4/2007 |
| JP | 4092374 B2 | 5/2008 |
| JP | 2008103262 A | 5/2008 |
| JP | 2008269807 A | 11/2008 |
| JP | 2009112925 A | 5/2009 |
| JP | 2010077934 A | 4/2010 |
| JP | 2010517746 A | 5/2010 |
| JP | 04629999 B2 | 2/2011 |
| JP | 2011025119 A | 2/2011 |
| JP | 04843908 B2 | 12/2011 |
| JP | 05131952 B2 | 1/2013 |
| JP | 2013181501 A | 9/2013 |
| JP | 2014069181 A | 4/2014 |
| JP | 05713348 B2 | 5/2015 |
| JP | 2015166478 A | 9/2015 |
| JP | 2015202445 A | 11/2015 |
| JP | 2016000995 A | 1/2016 |
| JP | 05862372 B2 | 2/2016 |
| JP | 2016051519 A | 4/2016 |
| JP | 05940387 B2 | 6/2016 |
| JP | 05970664 B2 | 8/2016 |
| JP | 05980521 B2 | 8/2016 |
| JP | 06021739 B2 | 11/2016 |
| JP | 2017025834 A | 2/2017 |
| JP | 2017091857 A | 5/2017 |
| JP | 2017152199 A | 8/2017 |
| JP | 06311089 B2 | 4/2018 |
| JP | 06431658 B2 | 11/2018 |

(56) References Cited

FOREIGN PATENT DOCUMENTS

| | | |
|---|---|---|
| JP | 2019072660 A | 5/2019 |
| JP | 2019098205 A | 6/2019 |
| JP | 2020027761 A | 2/2020 |
| JP | 2021502239 A | 1/2021 |
| JP | 2021100744 A | 7/2021 |
| JP | 06956953 B2 | 11/2021 |
| KR | 100893565 B1 | 4/2009 |
| KR | 100956652 B1 | 5/2010 |
| KR | 101011403 B1 | 1/2011 |
| KR | 20110138464 A | 12/2011 |
| KR | 101109534 B1 | 1/2012 |
| KR | 101131092 B1 | 3/2012 |
| KR | 101184650 B1 | 9/2012 |
| KR | 101184652 B1 | 9/2012 |
| KR | 101190610 B1 | 10/2012 |
| KR | 101200838 B1 | 11/2012 |
| KR | 101206618 B1 | 11/2012 |
| KR | 1239440 B1 | 3/2013 |
| KR | 101245264 B1 | 3/2013 |
| KR | 101297857 B1 | 8/2013 |
| KR | 101311360 B1 | 10/2013 |
| KR | 101328279 B1 | 11/2013 |
| KR | 101328433 B1 | 11/2013 |
| KR | 101328524 B1 | 11/2013 |
| KR | 2013123888 A | 11/2013 |
| KR | 101338187 B1 | 12/2013 |
| KR | 20130143219 A | 12/2013 |
| KR | 101387136 B1 | 4/2014 |
| KR | 101394132 B1 | 5/2014 |
| KR | 101394237 B1 | 5/2014 |
| KR | 20140003731 A | 6/2014 |
| KR | 101431636 B1 | 8/2014 |
| KR | 101454314 B1 | 10/2014 |
| KR | 20140116724 A | 10/2014 |
| KR | 20150046410 A | 4/2015 |
| KR | 1519828 B1 | 5/2015 |
| KR | 1526214 B1 | 6/2015 |
| KR | 101544747 B1 | 8/2015 |
| KR | 101555781 B1 | 9/2015 |
| KR | 2015100091 A | 9/2015 |
| KR | 101557704 B1 | 10/2015 |
| KR | 20150145997 A | 12/2015 |
| KR | 101587592 B1 | 1/2016 |
| KR | 101596301 B1 | 2/2016 |
| KR | 101609795 B1 | 4/2016 |
| KR | 20160054230 A | 5/2016 |
| KR | 20160059438 A | 5/2016 |
| KR | 101632685 B1 | 6/2016 |
| KR | 101641789 B1 | 7/2016 |
| KR | 101643146 B1 | 8/2016 |
| KR | 101647994 B1 | 8/2016 |
| KR | 1668244 B1 | 10/2016 |
| KR | 20160116824 A | 10/2016 |
| KR | 20160127402 A | 11/2016 |
| KR | 101683602 B1 | 12/2016 |
| KR | 101695881 B1 | 1/2017 |
| KR | 1705783 B1 | 2/2017 |
| KR | 101702850 B1 | 2/2017 |
| KR | 101710006 B1 | 2/2017 |
| KR | 101712408 B1 | 3/2017 |
| KR | 20170023237 A | 3/2017 |
| KR | 20170023238 A | 3/2017 |
| KR | 101723807 B1 | 4/2017 |
| KR | 101726393 B1 | 4/2017 |
| KR | 101730643 B1 | 4/2017 |
| KR | 1751291 B1 | 6/2017 |
| KR | 1758979 B1 | 7/2017 |
| KR | 101766780 B1 | 8/2017 |
| KR | 101778562 B1 | 9/2017 |
| KR | 101789093 B1 | 10/2017 |
| KR | 101815298 B1 | 1/2018 |
| KR | 101822188 B1 | 3/2018 |
| KR | 20180034106 A | 4/2018 |
| KR | 101844275 B1 | 5/2018 |
| KR | 101857444 B1 | 5/2018 |
| KR | 20180081279 A | 7/2018 |
| KR | 101892075 B1 | 8/2018 |
| KR | 101906544 B1 | 10/2018 |
| KR | 101909397 B1 | 10/2018 |
| KR | 2018111229 A | 10/2018 |
| KR | 101918275 B1 | 11/2018 |
| KR | 101946980 B1 | 2/2019 |
| KR | 101933000 B1 | 3/2019 |
| KR | 101966941 B1 | 4/2019 |
| KR | 20190041104 A | 4/2019 |
| KR | 20190058117 A | 5/2019 |
| KR | 101956293 B1 | 6/2019 |
| KR | 101958734 B1 | 7/2019 |
| KR | 102016320 B1 | 8/2019 |
| KR | 2016503 B1 | 9/2019 |
| KR | 102020657 B1 | 9/2019 |
| KR | 2015064 B1 | 10/2019 |
| KR | 102006120 B1 | 10/2019 |
| KR | 102018617 B1 | 11/2019 |
| KR | 102030113 B1 | 11/2019 |
| KR | 102042043 B1 | 11/2019 |
| KR | 102055255 B1 | 1/2020 |
| KR | 102063831 B1 | 1/2020 |
| KR | 102065275 B1 | 1/2020 |
| KR | 102072469 B1 | 2/2020 |
| KR | 20200024695 A | 3/2020 |
| KR | 20200036416 A | 4/2020 |
| KR | 20200073886 A | 6/2020 |
| KR | 102143397 B1 | 8/2020 |
| KR | 102144454 B1 | 8/2020 |
| KR | 102175288 B1 | 11/2020 |
| KR | 102183195 B1 | 11/2020 |
| KR | 20200139009 A | 12/2020 |
| KR | 2021067116 A | 6/2021 |
| KR | 102274447 B1 | 7/2021 |
| KR | 20210102076 A | 8/2021 |
| KR | 20210102077 A | 8/2021 |
| KR | 102297153 B1 | 9/2021 |
| KR | 20210112483 A | 9/2021 |
| KR | 102315033 B1 | 10/2021 |
| KR | 2325186 B1 | 11/2021 |
| KR | 102344835 B1 | 12/2021 |
| KZ | 27309 A4 | 9/2013 |
| KZ | 27310 A4 | 9/2013 |
| MX | 2016001468 A | 7/2016 |
| SG | 10201804036 A1 | 12/2019 |
| SU | 1550292 A1 | 3/1990 |
| TW | I363838 B | 5/2012 |
| TW | 201334847 A | 9/2013 |
| TW | M476844 U | 4/2014 |
| TW | 201909514 A | 3/2019 |
| TW | I717277 B | 1/2021 |
| WO | 1994027913 A1 | 12/1994 |
| WO | 1997016464 A1 | 5/1997 |
| WO | 2001092555 A1 | 12/2001 |
| WO | 2006067240 A1 | 6/2006 |
| WO | 2006072122 A2 | 7/2006 |
| WO | 2006123258 A2 | 11/2006 |
| WO | 2007132477 A1 | 11/2007 |
| WO | 2008053700 A1 | 5/2008 |
| WO | 2009015511 A1 | 2/2009 |
| WO | 2010004819 A1 | 1/2010 |
| WO | 2010008275 A1 | 1/2010 |
| WO | 2010018249 A1 | 2/2010 |
| WO | 2010021158 A1 | 2/2010 |
| WO | 2010108872 A1 | 9/2010 |
| WO | 2010143950 A1 | 12/2010 |
| WO | 2011003874 A1 | 1/2011 |
| WO | 2011050473 A1 | 5/2011 |
| WO | 2011148422 A1 | 12/2011 |
| WO | 2012000558 A1 | 1/2012 |
| WO | 2012025656 A1 | 3/2012 |
| WO | 2012032557 A1 | 3/2012 |
| WO | 2012071994 A1 | 6/2012 |
| WO | 2012099074 A1 | 7/2012 |
| WO | 2012102677 A1 | 8/2012 |
| WO | 2012115114 A1 | 8/2012 |
| WO | 2012161663 A1 | 11/2012 |
| WO | 2013036111 A1 | 3/2013 |

(56) References Cited

FOREIGN PATENT DOCUMENTS

| | | |
|---|---|---|
| WO | 2013134710 A1 | 9/2013 |
| WO | 2013154367 A1 | 10/2013 |
| WO | 2013169023 A1 | 11/2013 |
| WO | 2013172605 A1 | 11/2013 |
| WO | 2014058469 A1 | 4/2014 |
| WO | 2014091199 A1 | 6/2014 |
| WO | 2014181898 A1 | 11/2014 |
| WO | 2016056778 A1 | 4/2016 |
| WO | 2017190505 A1 | 11/2017 |
| WO | 2018229505 A1 | 12/2018 |
| WO | 2019164462 A1 | 8/2019 |
| WO | 2020017694 A1 | 1/2020 |
| WO | 2020032356 A1 | 2/2020 |
| WO | 2020068930 A1 | 4/2020 |
| WO | 2020072080 A1 | 4/2020 |
| WO | 2020186665 A1 | 9/2020 |
| WO | 2020237155 A1 | 11/2020 |
| WO | 2020251218 A1 | 12/2020 |
| WO | 2020251568 A1 | 12/2020 |
| WO | 2020259733 A1 | 12/2020 |
| WO | 2021047417 A1 | 3/2021 |
| WO | 2021057558 A1 | 4/2021 |
| WO | 2021071425 A1 | 4/2021 |
| WO | 2021071824 A1 | 4/2021 |
| WO | 2021085979 A1 | 5/2021 |
| WO | 2021090919 A1 | 5/2021 |
| WO | 2021165338 A1 | 8/2021 |
| WO | 2021177823 A1 | 9/2021 |

OTHER PUBLICATIONS

Norwegian University of Science and Technology, https://scitechdaily.com/turning-waste-heat-into-hydrogen-fuel-using-reverse-electrodialysis/, Nov. 23, 2019.

Nuclear Power 2022, https://www.nuclear-power.com/nuclear-engineering/thermodynamics/thermodynamic-cycles/heating-and-air-conditioning/coefficient-of-performance-heat-pump/.

Energy Transition Model, https://docs.energytransitionmodel.com/main/heat-pumps/.

Isidoro Martinez, Heat of Solution Data for Aqueous Solutions, 1995-2022, https://docs.energytransitionmodel.com/main/heat-pumps/.

Saltworks, https://docs.energytransitionmodel.com/main/heat-pumps/.

Krakhella, K. et al. Heat to H2: Using Waste Heat for Hydrogen Production through Reverse Electrodialysis, Energies 2019, 12(18): 3428.

Researchgate, https://www.researchgate.net/figure/Illustration-of-reverse-electrodialysis-RED-power-generation-system-Internal_fig7_337494612.

Vermaas, D. et al., Influence of multivalent ions on renewable energy generation in reverse electrodialysis, Energy & Environmental Science, Issue No. 4, 2014, https://pubs.rsc.org/en/content/articlelanding/2014/ee/c3ee43501f <https://urldefense.com/v3/_https:/pubs.rsc.org/en/content/articlelanding/2014/ee/c3ee43501f_;!!A14RNwflftzD!Fc3vkktGCsrDwurEjKK31PqBgHJjiB5xAGk03Da88Mo0RBPbGIBnjRJqXvO3jmTjVg$>.

Materials Today, Graphene Could Make Tunable Ion Filter, Nov. 27, 2018, https://www.materialstoday.com/computation-theory/news/graphene-could-make-tunable-ion-filter/.

Facchinetti, I. et al., Thermally Regenerable Redox Flow Battery for Exploiting Low-Temperature Heat Sources, Cell Reports Physical Science 1(5): 100056, May 20, 2020.

Palakkal, V. et al., High Power Thermally Regenerative Ammonia-Copper Redox Flow Battery Enabled by a Zero Gap Cell Design, Low-Resistant Membranes, and Electrode Coatings, ACS Appl. Energy Matter, 3(5): 4787-98, 2020.

Moreno, J. et al., Upscaling Reverse Electrodialysis, Environ. Sci. Technol. 52: 10856-63, 2018.

Veerman, J. et al., Reverse electrodialysis: evaluation of suitable electrode systems, Journal of Applied Electrochemistry, 40: 1461-74, 2010.

Solbert, Simon B. B., et al., "Heat to Hydrogen by Reverse Electrodialysis—Using a Non-Equilibrium Thermodynamics Model to Evaluate Hydrogen Production Concepts Utilising Waste Heat", Energies 2022, 15, 6011, published Aug. 19, 2022.

International Search Report and Written Opinion dated Jul. 31, 2023 in counterpart application No. PCT/US2023/021444.

International Search Report and Written Opinion in counterpart patent application Ser. No. PCT/US2023/079862 dated Feb. 19, 2024.

International Search Report and Written Opinion in counterpart patent application Ser. No. PCT/US2023/0798865 dated Feb. 20, 2024.

* cited by examiner

REVERSE ELECTRODIALYSIS OR PRESSURE-RETARDED OSMOSIS CELL WITH HEAT PUMP

CROSS-REFERENCE TO RELATED APPLICATIONS

This application is a continuation of U.S. patent application Ser. No. 18/314,261, filed May 9, 2023, which claims priority to U.S. Provisional Application No. 63/425,511, filed on Nov. 15, 2022, and U.S. Provisional Application No. 63/490,405, filed on Mar. 15, 2023. The entire contents of each of the foregoing applications is incorporated by reference herein.

FIELD

The present technology is generally related to salt gradient heat engine systems and methods for generating electrical power and/or hydrogen from thermal energy.

BACKGROUND

Salinity gradient power is the energy created from the difference in salt concentration between two fluids, commonly fresh and salt water that naturally occurs, e.g., when a river flows into the sea. Reverse electrodialysis (RED) can be used to retrieve energy from the salinity gradient, e.g., by passing a salt solution and fresh water through a stack of alternating cation and anion exchange membranes. The chemical potential difference between the salt and fresh water generates a voltage over each membrane and the total potential of the system is the sum of the potential differences over all membranes. An open-loop RED battery requires a continuous source of salt and fresh water to maintain the salinity gradient. This constraint may limit practical locations of commercial-scale RED batteries. Furthermore, open-loop RED batteries are susceptible to contamination from minerals, microbes, or other foreign objects or material in the sources of water. Closed-loop RED cells do not require continuous sources of concentrated and dilute saline solutions but do require ongoing regeneration of the salinity difference between the concentrated and dilute solutions which can be energy intensive and/or inefficient.

This document describes methods and systems that are directed to addressing the problems described above, and/or other issues.

SUMMARY

A method of generating electrical power from thermal energy is disclosed. That method included: separating, by a selectively permeable membrane, a first saline solution from a second saline solution; transferring, by a heat pump, thermal energy to the first saline solution and/or the second saline solution; mixing the first saline solution and the second saline solution in a controlled manner, capturing at least some salinity-gradient energy as electrical power as the salinity difference between the first saline solution and the second saline solution decreases. It may further include regenerating the salinity difference between the first saline solution and the second saline solution by applying a regeneration process selected from the group consisting of: salt decomposition, electrodialysis, membrane distillation, evaporation, forward osmosis, salt precipitation, or any combination thereof. The process of salt decomposition includes: providing at least a portion of a spent dilute solution formed from the first saline solution, wherein the spent dilute solution contains a salt; heating the spent dilute solution to decompose the salt to make at least one gaseous product; transferring the at least one gaseous product to a cold solution; and solidifying the gaseous product to reform as a salt precipitate in the cold solution. When the method includes generating the third saline solution by membrane distillation, the method may further include mixing the third saline solution into the first saline solution and/or the second saline solution. The first saline solution and the second saline solution method may include circulating the solution in a closed system, substantially or completely closed.

The selectively permeable membrane may comprise graphene, graphene oxide, or reduced graphene oxide, optionally with nanopores therein. The selectively permeable membrane may be a single layer thin sheet, multilayered sheets, or a cartridge.

The method may further comprise capturing the salinity-gradient energy using reverse electrodialysis or using pressure-retarded osmosis driving an electrical generator.

The method may include transferring thermal energy from the first saline solution to the second saline solution causes the first saline solution to precipitate a salt, and optionally further comprising introducing the precipitated salt into the second saline solution, causing the salinity difference between the first saline solution and the second saline solution to increase.

The method may comprise using a portion of the generated electrical power to produce hydrogen gas through electrolysis.

The method may include the regeneration process comprises applying the process of salt decomposition comprising: providing a spent dilute solution formed from the first saline solution, wherein the spent dilute solution contains a salt: heating the spent dilute solution to decompose the salt to make a gaseous product; and transferring the gaseous product to an absorber; and solidifying the gaseous product to reform as a salt precipitate in a spent concentrate solution within the absorber. By transferring the gaseous product to the absorber, the salinity content of the spent dilute solution may be lowered to regenerate the first saline solution The salt precipitate may dissolve in the spent concentrate solution to regenerate the second saline solution, and optionally the spent dilute solution has a salinity content higher than the first saline solution;

The method may include the regeneration process comprises applying the process of electrodialysis comprising: providing a spent dilute solution formed from the first saline solution, wherein the spent dilute solution contains salt; providing a spent concentrated solution formed from the second saline solution; supplying electricity to separate the salt into ions and move ions from the spent dilute solution to the spent concentrated solution. The salinity content of the spent dilute solution decreases to regenerate the first saline solution while the salinity content of the spent concentrated solution increases to regenerate the second saline solution.

The method may include the regeneration process comprises applying the process of evaporation comprising: providing a spent concentrated solution formed from the second saline solution; heating the spent concentrated solution to produce water vapor; and transferring the water vapor to mix with a spent dilute solution. The salinity content of the spent dilute solution decreases to regenerate the first saline solution while the salinity content of the spent concentrated solution increases to regenerate the second saline solution.

The method may include the regeneration process comprises applying the process of membrane distillation comprising: providing a membrane distillation vessel comprising a hydrophobic membrane having a spent concentrate solution on one side of the membrane and a spent dilute solution on the opposite side of the membrane; and warming the spent concentrate solution to produce water vapor. The water vapor permeates the hydrophobic membrane to mix with the spent dilute solution to regenerate the first saline solution while the salinity content of the spent concentrated solution increases to regenerate the second saline solution.

The method may include the regeneration process comprises applying the process of forward osmosis comprising: circulating a spent concentrated solution and draw solution through a forward osmosis system to regenerate the second saline solution and produce a spent draw solution; and circulating the spent draw solution through a switchable solubility system to regenerate the draw solution and to produce water.

The method may include applying a pressure-retarded osmosis (PRO) system, a capacitive mixing (CAP) system, or both the PRO and CAP systems to generate additional electrical power.

A system for generating electricity is disclosed. That system comprising: a first saline solution; a second saline solution, wherein the salinity of the second saline solution is different than the salinity of the first saline solution; a heat pump configured to transfer thermal energy to the first saline solution and/or the second saline solution; a selectively permeable membrane separating the first saline solution from the second saline solution; and at least one regeneration system. The selectively permeable membrane may be configured to control the mixing of the first saline solution and the second saline solution, and further configured to capture at least some salinity-gradient energy as electrical power as the first saline solution and the second saline solution mix. The selectively permeable membrane may comprise graphene, graphene oxide, or reduced graphene oxide, and optionally containing nanopores therein. The selectively permeable membrane may be a single layer thin sheet, multilayered sheets, or a cartridge containing graphene, graphene oxide, and/or reduced graphene oxide. The heat pump may be a vapor compress cycle, a thermoelectric chiller, a chemical absorption chiller, or other apparatus known for use in the art for simultaneous heating and cooling. The regeneration system includes one or more of: a salt precipitation system, a membrane distillation system, a salt decomposition system, an electrodialysis system, a forward osmosis system, evaporation, or any combination thereof. When the regeneration system includes the membrane distillation system, the membrane distillation system includes: a vessel containing at least a portion of the first or second saline solution, the vessel being covered by a hydrophobic membrane; and the heat pump (or alternatively, a second heat pump) being a configured to warm the vessel, and cool the opposite side of the hydrophobic membrane. The membrane distillation system is configured to create a salt gradient at the membrane after warming, and generate a third saline solution in the vessel. The hydrophobic membrane may include polytetrafluoroethylene, polypropylene, or polyvinylidene fluoride, and, optionally, may be configured in a sandwiched cell stack configuration.

When the regeneration system includes the salt decomposition system, the salt decomposition system comprises: a vessel configured to receive at least a portion of a spent dilute solution formed from the first saline solution, wherein the spent dilute solution contains a salt; the heat pump (or alternatively, a second heat pump) being configured to warm the vessel; and a cold water stream configured to receive at least one gaseous product released from the vessel. The salt decomposition system may be configured to decompose the salt and then reform a salt precipitate in the cold water stream.

The salt decomposition system may comprise: a vessel configured to receive a spent dilute solution from the reverse electrodialysis battery, wherein the spent dilute solution contains a salt, a heat pump configured to warm the vessel and generate a gaseous product containing salt in the vessel, and an absorber configured to receive a spent concentrated solution from the reverse electrodialysis battery, and receive the gaseous product. The salt in the gaseous product may be absorbed by the spent concentrate solution to regenerate the concentrated saline solution.

The salt gradient heat engine system may include the salt precipitation system and the membrane distillation system, or electrodialysis system and the salt precipitation system. The salt gradient heat engine system may further include a liquid desiccant dehumidification process.

When the regeneration system includes the membrane distillation system, the membrane distillation system may comprise: a membrane distillation vessel comprising a hydrophobic membrane; and a heat pump being a configured to warm the vessel, and cool one side of the hydrophobic membrane. The membrane distillation system may be configured to create a salt gradient at the hydrophobic membrane after warming, and generate an ultra-dilute solution and regenerate the concentrated saline solution. The membrane distillation system may further comprise: a concentrate tank configured to receive a spent concentrated solution from the reverse electrodialysis battery and connected to the membrane distillation vessel; a dilute tank configured to receive a spent dilute solution from the reverse electrodialysis battery and connected to the membrane distillation vessel. The concentrate tank may be configured to receive the concentrated solution from membrane distillation vessel, and the dilute tank may be configured to receive the ultra-dilute solution from the membrane distillation vessel. The hydrophobic membrane may comprise polytetrafluoroethylene, polypropylene, or polyvinylidene fluoride, and is configured in a sandwiched cell stack configuration.

When the regeneration system includes the evaporation system, the evaporation system may comprise: an evaporator configured to receive a spent concentrated solution from the reverse electrodialysis battery and produce water vapor to regenerate the concentrate saline solution; a heat pump configured to provide thermal energy to the evaporator; a condenser configured to receive a spent dilute solution from the reverse electrodialysis battery and receive the water vapor generated by the evaporator. The water vapor condenses and mixes with by the spent dilute solution to regenerate to dilute saline solution.

When the regeneration system includes the electrodialysis system, the electrodialysis system may be configured to receive a spent dilute solution and a spent concentrated solution. The electricity is supplied to the electrodialysis system causing ions to move from the spent dilute solution to the spent concentrated solution, to regenerate the dilute saline solution and the concentrated saline solution.

The regeneration system may comprise a salt precipitation system and the electrodialysis system, with the salt precipitation system comprising: a salt precipitator configured to receive a spent dilute solution from the reverse electrodialysis battery and precipitate salt from the spent dilute before it is supplied to the electrodialysis system; a concentrate tank configured to receive a spent concentrated solution from the reverse electrodialysis battery and receive salt generated by the salt precipitator. The concentrate tank may be configured to receive the concentrated solution, and the dilute tank is configured to receive the dilute saline solution from the electrodialysis system.

The regeneration system may comprise the forward osmosis system configured to receive a spent concentrated solution from the reverse electrodialysis battery, and regenerate the concentrate saline solution using a switchable solubility system. With the forward osmosis system, the regeneration system may further comprise a dilute tank configured to receive a spent dilute solution from the reverse electrodialysis battery and to receive water from the switchable solubility system, wherein the water mixes with the spent dilute solution to regenerate the dilute saline solution. The switchable solubility system may comprise: a draw solution to be circulated through the forward osmosis system and produce a spent draw solution; a recovery configured to receive the spent draw solution and add heat, wherein $CO_2$ is released and water is produced; and a generator configured to receive the solution from the recovery and add $CO_2$ to regenerate the draw solution.

BRIEF DESCRIPTION OF DRAWINGS

The accompanying drawings, which are incorporated herein and constitute part of this specification, are illustrative of particular embodiments of the present disclosure and do not limit the scope of the present disclosure.

DETAILED DESCRIPTION

Figure 1:
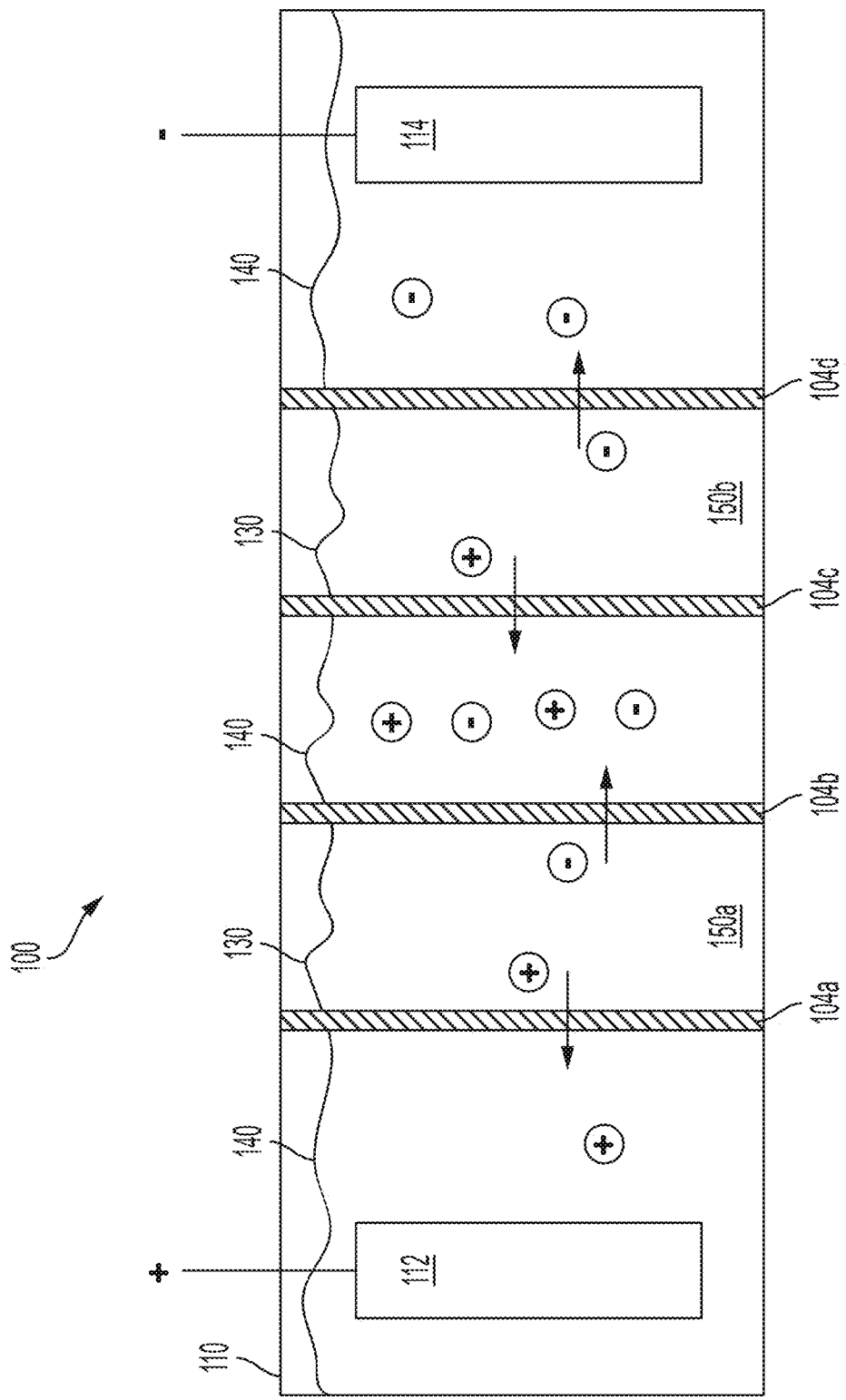
FIG. 1 illustrates an example reverse electrodialysis (RED) system.

The present disclosure is related to salt gradient heat engine systems which utilizes heat and generating electrical power from thermal energy. A salt gradient heat engine may be any system that utilizes thermal energy to generate or regenerate a salinity gradient and produce usable energy such as electricity and/or hydrogen. Examples of salt gradient heat engine systems include RED and PRO batteries. A RED battery may incorporate more than one selectively permeable membrane and one or more electrodes, and is discussed in more detail below. A PRO battery may incorporate one membrane and does not require one or more electrodes. Rather than directly generating electrical power from the salinity difference between a concentrated saline solution and a solution like a RED battery, the PRO battery generates pressure. The selectively permeable membrane of a PRO battery may be configured to preferentially allow solvent, rather than solute, to pass through the membrane, e.g., from the dilute solution to the concentrated saline solution so as to decrease the salinity difference between the solutions.

Both the RED and PRO batteries may include a concentrated saline solution separated from a dilute solution by a selectively permeable membrane. Also in both systems, the rate of power generated by the system is a function at least of the salinity difference between the concentrated saline solution and the dilute solution, and optionally also the temperature of at least the concentrated saline solution.

A reverse-electrodialysis system is disclosed that includes an anode, a cathode, and one or more cells disposed between the anode and the cathode. At least one of the one or more cells includes a first membrane configured to be selectively permeable to cations and a second membrane configured to be selectively permeable to anions, the second membrane spaced apart from the first membrane. The cell further includes a concentrated saline solution disposed between the first membrane and the second membrane, the first and second membranes separating the concentrated saline solution from a dilute saline solution such that the first membrane selectively allows cations to migrate toward the cathode and the second membrane selectively allows anions to migrate toward the anode, causing a voltage difference between the cathode and the anode. The first selectively permeable membrane and the second selectively permeable membrane may include ion-exchange membranes.

A plurality of selectively permeable membrane, for example, 2-500, 2-200, 10-400, or 2-100, used in the reverse-electrodialysis system disclosed herein. Certain selectively permeable membranes limit the ability of ionic constituents to freely diffuse. Instead, the cation-exchange membranes (and anion-exchange membranes) allow cationic constituents and anionic constituents, respectively, to migrate, or move in opposite directions. Each of the selectively permeable membranes may be made of organic or inorganic polymer with charged (ionic) side groups, such as ion-exchange resins. Each selectively permeable membrane may be made of graphene, reduced graphene oxide, or graphene oxide. The selectively permeable membrane may comprise graphene configured in a single layer or be multilayered thin sheets, optionally stacked, and optionally including nanopores. The selectively permeable membrane may comprise graphene, reduced graphene oxide, or graphene oxide may be a cartridge, such as those commonly used in a reverse osmosis water filtration system. The permeability of the membrane may depend on configuration or other aspects of the graphene sheets. The single layer or be multilayered thin sheets may be stretched or otherwise configured to alter the permeability of the membrane.

The selectively permeable membrane may be a bipolar membrane (e.g., anion on one side and cation on the opposite side) which, upon use, produces an acid and base from the salt present in the solution. The selectivity of the selective permeable membrane may be by size, charge, charge density, phase (e.g., hydrophobic/hydrophilic) or polarity.

The selectively permeable membrane may be a polymeric composite membrane having oriented nanochannels, such as those disclosed in WO 2022/032236, which is incorporated by reference herein in its entirety. For example, selectively permeable membrane may be a thin film composite membrane comprising: (i) a polymer membrane, film or coating comprising a layer having a first surface, a second surface and a film thickness therebetween, and comprising cylindrical polymer fibers at least partially ordered as hexagonal packed cylinders within the film, aligned parallel to the film surface, and present as an H1 mesophase; wherein the cylinders are crosslinked internally within the cylinders; and wherein the cylinders are spatially arranged to provide channels between the cylinders for fluid flow through the membrane, film or coating; and (ii) a porous support layer in contact with the polymer membrane, film or coating. In embodiments, the porous support layer is polyacrylonitrile, polyvinylidene fluoride, polysulfone, polyamide, polyimide, polypropylene, anodized aluminum oxide, cellulose acetate, or nonwoven fabric.

The salt gradient heat engine system may include a heat source configured to transfer thermal energy to the concentrated saline solution or the dilute saline solution and a regeneration system including a heat pump. The heat pump may be any apparatus known for use in the art for simultaneous heating and cooling, and optionally producing a coefficient of performance greater than about 1, or about 1 to about 10, about 1 to about 6, or about 3 to about 4. The heat pump may be a vapor compress cycle, a thermoelectric chiller, a chemical absorption chiller, or the like. The vapor compress cycle may be a screw, acoustic, air conditioner. The heat pump used herein may include a refrigerant that does or does not change phase. The refrigerant may be $CO_2$, helium, or any other refrigerant known for use in heat pumps. The heat pump may include a thermodynamic cycle. The thermodynamic cycle may include any combination of refrigerant and/or non refrigerant cycles providing the ability to simultaneously heat and cool. The heat pump may be a thermo-acoustic heat pump, such as the one developed by Equium (https://www.pv-magazine.com/2023/01/02/residential-thermo-acoustic-heat-pump-produces-water-up-to-80-c/). The heat pump may be a system disclosed in U.S. Pat. No. 9,915,436, entitled: "Heat Source Optimization System," or in U.S. Pat. No. 11,067,317, entitled: "Heat Source Optimization System." Each of the foregoing patents are incorporated herein by reference in their entireties. In certain embodiments, a humidifier, a dehumidifier, a bidirectional exhaust fan, and/or a swamp cooler may be used in connection with the heat pump to drive reverse-electrodialysis. The heat pump may be fueled by any known heat exchange fluid, such as, but not limited to, water, refrigerant, glycol, or oil.

Traditionally, humidity is unfavored in HVAC cooling as it adds a dead load to the system; energy is consumed by condensing water vapor, thereby wasting energy and causing energy inefficiencies. Typically, when a desired temperature is set on a thermostat for cooling, any energy that is spent condensing water vapor is energy that could have otherwise been used for cooling the air. In this scenario, energy is consumed to condense vapor into condensate and the HVAC unit works against the latent heat of vaporization.

In contrast, with the present disclosure, humidity in the environment can be highly favorable as the humidity provides additional energy into the system that can be used to drive the reverse electrodialysis process and generate electricity, hydrogen, oxygen, and any combination thereof. For example, humidity may be introduced into the system and the latent heat of the water vapor may be captured and utilized to drive reverse-electrodialysis and generate electricity. Similarly, with the formation of ice, the heat crystallization of water may be used to drive the reverse electrodialysis process to produce electricity, hydrogen, oxygen, or any combination thereof.

The regeneration system may be configured to receive the dilute saline solution from the at least one of the one or more cells and remove (by the heat pump) thermal energy from the dilute saline solution, causing the dilute saline solution to precipitate a salt. The regeneration system may be configured to, after causing the dilute saline solution to precipitate the salt, circulate the dilute saline solution to the at least one of the one or more cells, introduce the precipitated salt into the concentrated saline solution, and cause the precipitated salt to dissolve in the concentrated saline solution.

The regeneration system may be configured to transfer at least some of the thermal energy removed from the dilute saline solution back to the dilute saline solution after causing salt dissolved in the dilute saline solution to precipitate. The regeneration system may be configured to transfer at least some of the thermal energy removed from the dilute saline solution to the concentrated saline solution, causing the precipitated salt to dissolve in the concentrated saline solution. The heat source may be configured to transfer thermal energy to the concentrated saline solution, causing the precipitated salt to dissolve in the concentrated saline solution. The concentrated saline solution may include an endothermic solution or an exothermic solution. The concentrated saline solution may include a substance having a solubility with a non-linear temperature dependence.

Figure 12:
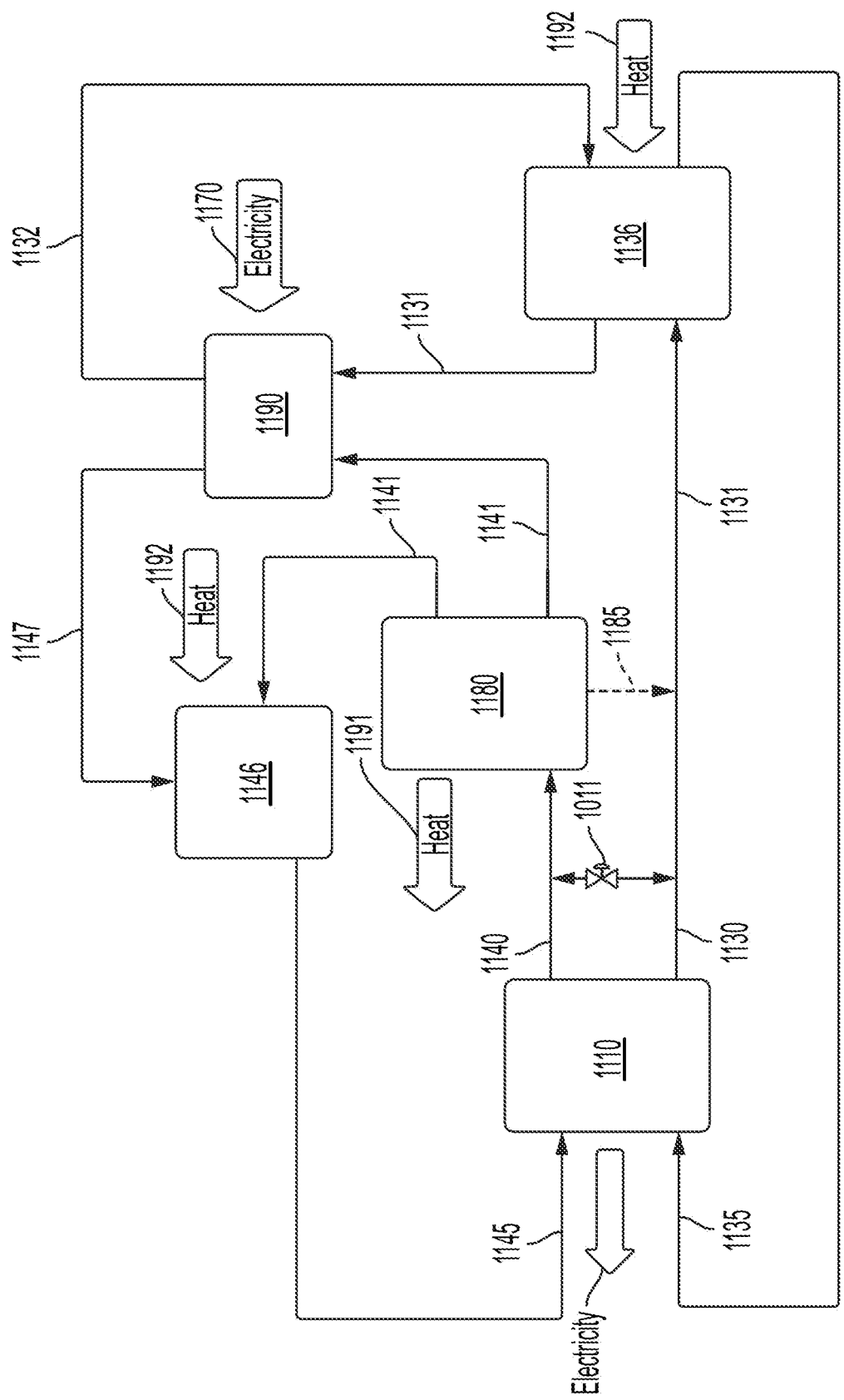
FIG. 12 an example of a system and method of the disclosure including a RED or PRO battery in connection with an electrodialysis system and salt precipitation.

One or more other regeneration systems may be employed. A regeneration system may comprise electrodialysis. Electrodialysis may be used for water purification in addition to the reverse-electrodialysis system. With electrodialysis, the dilute saline solution may be further desalinated using electrodialysis. For example, when precipitating salt, the concentration of the dilute saline solution is limited by the solubility curve. To further dilute the dilute saline solution, electrodialysis may be employed. Any renewable electricity (e.g., solar/wind etc.) may be used to force electrodialysis to separate salt from dilute saline solution and create a further diluted stream. This provides energy storage. For example, during the hours the sun is out, the salt gradient utilizing electrodialysis may be charged and then that energy from that salt gradient harnessed after sunset. The same battery/tank may be used for electrodialysis as used for reverse-electrodialysis. FIG. 12 is an example of a system including electrodialysis and a RED/PRO battery, which is further discussed below.

The reverse-electrodialysis system may further include a control system configured to coordinate the transfer of heat between one or more heat sources and the reverse-electrodialysis system based on one or more measurements of a state of the one or more heat sources or the reverse-electrodialysis system. The heat source includes one or more of geothermal heat, industrial waste heat, or solar heat.

Figure 10:
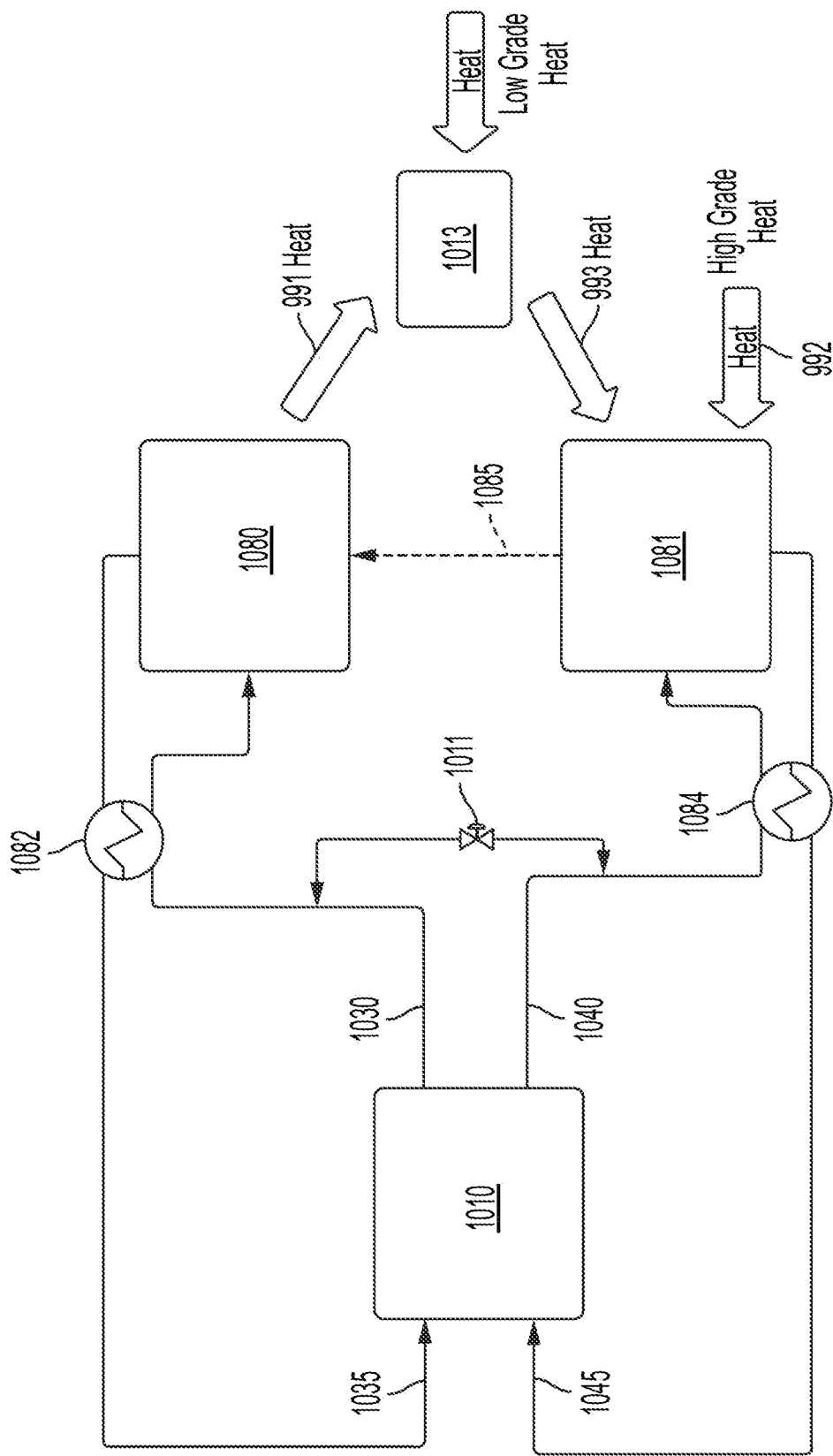
FIG. 10 is an example of a system and method of the disclosure including a RED or PRO battery in connection with a salt decomposition system.

The salt gradient heat engine system may comprise a salt decomposition system to produce a salt gradient. Salt decomposition may be employed with reverse electrodialysis instead of the process of salt precipitation as disclosed herein. For example, a spent dilute solution (supplied from the RED battery) may be heated to a temperature above the temperature of at which the salts decompose (e.g., ammonium bicarbonate decomposes around 60° C. into $CO_2$ and ammonia). As the solution is heated, the salt decomposes and leaves the spent dilute solution as a gaseous product, which decreases the concentration of salt in the spent dilute solution creating a regenerated dilute solution. Vacuum or optional application of a fan may assist in the movement of the gaseous product to the cold stream. The gaseous product (e.g., $CO_2$ and ammonia) can be driven into a cold water stream to react and precipitate back into solid salt form (e.g., $CO_2$ ammonia and cold water into ammonium bicarbonate salt). The precipitated solid salt (e.g., ammonium bicarbonate) in solution may be delivered to the concentrated saline solution in the RED battery. A heat pump may be used for heating and cooling of the spent dilute solution and cold water steam, respectively, in this process. The heat pump may be the same or different than the heat pump used in other steps of the reverse electrodialysis system disclosed herein. Optionally, when the gaseous product precipitates in the cold stream, thermal energy may be extracted and transferred to the spent dilute solution to decompose the salt. Additionally, the thermal energy may be used to increase the temperature of the precipitated solution to increase the solubility and allow for a super concentrated solution. FIG. 10 is an example of salt decomposition process showing the flow of solutions between the RED battery and the vessels of the salt decomposition process, and is further discussed in detail below. With application of a salt decomposition process, regeneration of concentrate and dilute saline solutions is possible by incorporation of salt decomposition.

The reverse-electrodialysis system may include a second cell. The second cell may include a third membrane configured to be selectively permeable to cations and a fourth membrane configured to be selectively permeable to anions, the fourth membrane spaced apart from the third membrane. The second cell may include a second concentrated saline solution disposed between the third membrane and the fourth membrane, the third and fourth membranes separating the second concentrated saline solution from a second dilute saline solution. The concentrated saline solution mat includes an endothermic solution, the second concentrated saline solution may include an exothermic solution, and the heat pump may be configured to transfer heat between the concentrated saline solution and the second concentrated saline solution.

Figure 13:
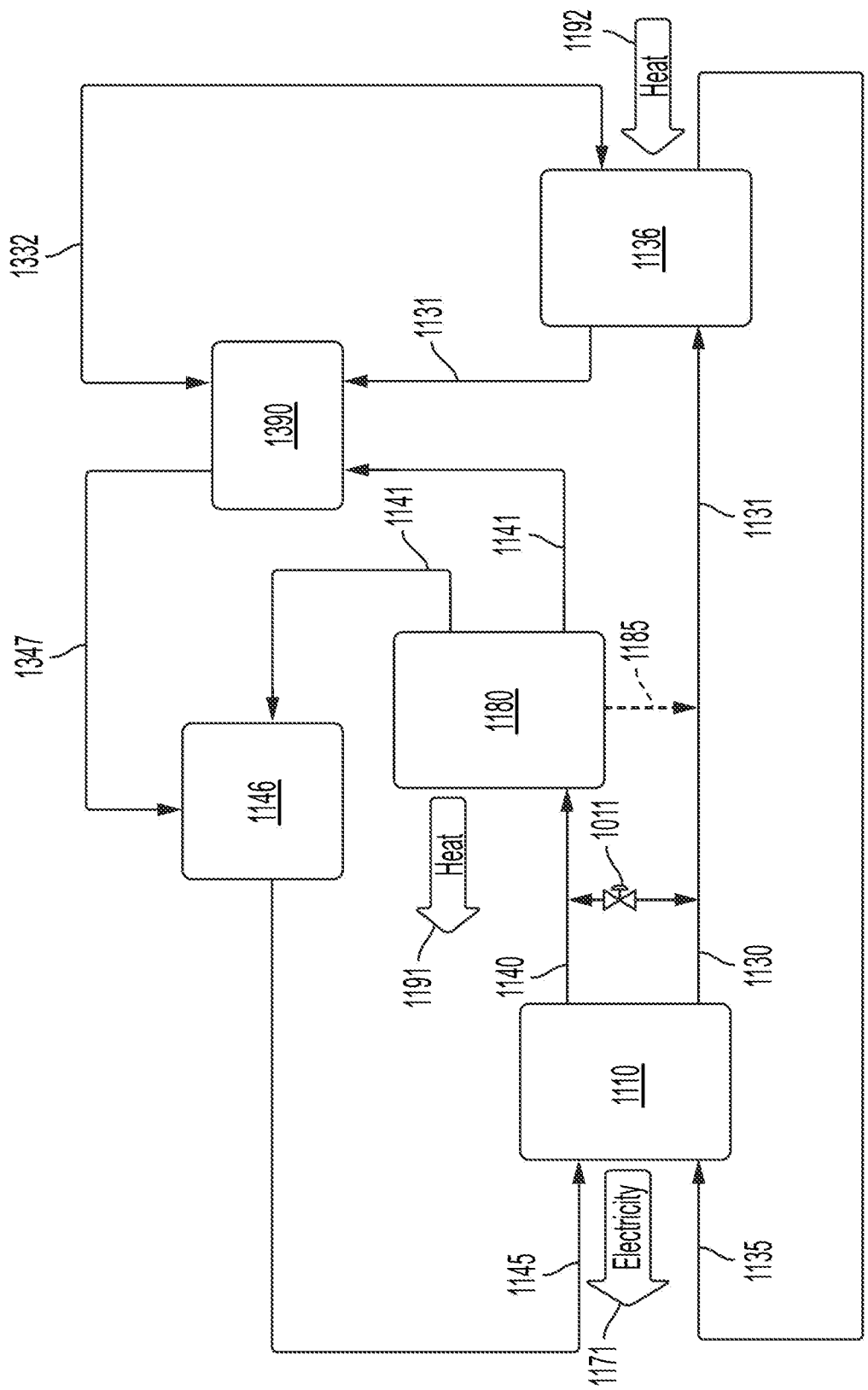
FIG. 13 is an example of a regeneration system incorporating a membrane distillation system and salt precipitation.

The reverse-electrodialysis system may include a membrane distillation system. Membrane Distillation (MD) is a thermally driven separation process, in which liquid is rejected and only vapor molecules permeate through a microporous hydrophobic membrane. The driving force in the MD process a difference in vapor pressure created by a temperature difference across the hydrophobic membrane. The hydrophobic membrane must be intrinsically hydrophobic, or its surface may be modified to be hydrophobic. The hydrophobic membrane for MD may be polytetrafluoroethylene (PTFE), polypropylene (PP), polyvinylidene fluoride (PVDF), or any combination thereof. Large surface area of a hydrophobic membrane may be used in a sandwiched cell stack design similar to a RED stack. A stack of hydrophobic membranes may include only one or multiple types of hydrophobic membrane with no electrodes. Utilizing a heat pump can increase the efficiency of the MD process by simultaneously heating and cooling, creating a strong temperature gradient driving force. For example, a heat pump may be used to simultaneously heat a spent concentrated solution or spent dilute solution to about 40° C. to about 80° C. on one side of the hydrophobic membrane while providing a cooling means, such as a cooling stream heat exchanger, an evaporator with refrigerant, or chilled water, on the other side of the hydrophobic membrane to produce a dilute solution and sourcing heat, e.g., from ambient conditions, geothermal, solar, industrial waste heat. Membrane distillation allows one to leverage the power of a heat pump to create a salt gradient efficiently which can be used in the reverse-electrodialysis system disclosed herein. The heat pump may be the same or different than the heat pump used in other steps of the reverse electrodialysis system disclosed herein. Membrane distillation may be used to generate a concentrated saline solution, and optionally also a dilute saline solution, for introduction into the RED battery. FIG. 13 is an example of a membrane distillation system showing the flow of solutions between a MD system and the RED system. The regeneration of concentrate and dilute saline solutions is possible by incorporation of membrane distillation.

The membrane distillation process utilized herein may be Direct Contact MD (DCMD), Air Gap MD (AGMD), Vacuum MD (VMD), Sweeping Gas MD (SWGMD), Vacuum multi-effect membrane distillation (V-MEMD), Permeate Gap MD (PGMD), or a combination thereof.

The membrane distillation system may include: a vessel containing at least a portion of the first or second saline solution, the vessel being covered by a hydrophobic membrane that permits permeation of vapor; the heat pump being a configured to warm the vessel; and cool the opposite side of the membrane. The membrane distillation system may be configured to create a salt gradient at the membrane after warming, and generate a third saline solution (i.e., concentrated) in the vessel. The membrane distillation system may include a second heat pump to warm the vessel, and optionally, a cooling device on the opposite side of the membrane as the vessel. The cooling device may be a cool stream, heat exchanger, refrigerant loop, or otherwise operates, e.g., to condense vapor back into liquid. FIG. 13 is an example of a membrane distillation process showing a hydrophobic membrane creating a salt gradient between a warm concentrated solution and a cold dilute solution, as is further discussed in detail below. The membrane distillation system may include: at least a portion of the first or second saline solution separated by a hydrophobic membrane that permits permeation of vapor. In this embodiment, solution is provided on either side of the hydrophobic membrane, and the heat pump is configured to warm one side of the membrane; while a cooling device is provided on the opposite side of the membrane to cool the solution.

The reverse-electrodialysis system may include a microbial reverse-electrodialysis electrolysis cell (MREC), as disclosed in U.S. Pat. No. 9,112,217, which is incorporated by reference herein in its entirety. In this embodiment, the microorganisms produce electricity to drive the RED system. The MREC may include a plurality of exoelectrogenic microorganisms disposed in the RED battery that may assist in the production of hydrogen and electricity by the oxidation of organic matter on the anode and oxygen reduction on the cathode. As the microbes thrive in a warmer condition, the use of a heat pump may increase the ability of the microbes to remove electrode overpotential. Electrode overpotentials contribute to significant energy loss due to thermodynamically unfavorable electrode reactions. Additionally, the leveraged thermal energy provided by a heat pump contributes to greater reaction kinetics, which decreases the amount of membrane required to produce the same amount of energy in RED. In a residential setting, for example, organic waste, such as sewerage from a septic tank, may be converted into usable energy through the use of microbial reverse-electrodialysis. Ultra-violet light may be used with any of the salt gradient heat engine systems disclosed herein to limit any microbial growth/fouling within the system.

In the salt gradient heat engine system, RED and PRO may operate together continuously or in a batch system. When operational in a batch system, the reverse-electrodialysis system may include multiples precipitators, and/or multiple tanks in parallel or in a stacked arrangement. When operating in a batch system, the precipitators, tanks, and stacks as a whole may be of different sizes and operated in series, parallel or in a combination of both, and may operate in counter, cross or co-flow. For example, the system may include two or more precipitators that each produce a regenerated dilute solution, that are combined prior to flow into the RED battery; and/or the system may include two or more dissolving tanks that each produce a regenerated concentrated saline solution, that are combined prior to flow into the RED battery. When operating as a batch system, the saline solutions may pass through the RED battery stack several times (multiple passes) to increase efficiency. This provides the ability to cease operation in part of the system, e.g., for servicing, while maintaining operation in the rest of the system.

In an embodiment, one vessel may be both a precipitator (e.g., precipitate the salt from a spent solution and remove a regenerated dilute solution) and a dissolving tank (e.g., add a spent solution to the vessel containing precipitated salt and then dissolve the salt into the solution to may a regenerated concentrated solution). Here, instead of removing the precipitated salt, the salt remains in the vessel and is utilized to make a regenerated concentrated saline solution.

The concentrated and dilute solutions will be in separate loops. However there may some controlled mixing of the two solutions (controlled mixing in RED/PRO stack). Additionally, there may be some uncontrolled mixing osmosis (water flux) occurring between the concentrate and dilute solution within the RED/PRO stack. Some portion of the water in the dilute solution may be transferred or migrate into the concentrated solution in the RED/PRO stack due to osmosis. Because of this movement of water due to osmosis, there may be a controlled flow that acts to balance the total amount of volume in the dilute tank and concentrate tank. Without this, the volume in the concentrate tank would continue to increase. The controlled mixing or flow between the loops may be controlled by incorporating a valve that operates to ensure that both of the loops have the same volume of solution.

A method of generating electrical power from thermal energy is disclosed. The method includes separating, by a selectively permeable membrane, a first saline solution from a second saline solution. The method includes receiving, by the first saline solution and/or the second saline solution, thermal energy from a heat source. The method includes mixing the first saline solution and the second saline solution in a controlled manner, capturing at least some salinity-gradient energy as electrical power as the salinity difference between the first saline solution and the second saline solution decreases. The method includes transferring, by a heat pump, thermal energy from the first saline solution to the second saline solution, causing the salinity difference between the first saline solution and the second saline solution to increase.

The method may include capturing the salinity-gradient energy using reverse electrodialysis. The method may further include capturing the salinity-gradient energy pressure-retarded osmosis driving an electrical generator. In some embodiments, each of the first saline solution and the second saline solution circulate in a closed system. Transferring thermal energy from the first saline solution to the second saline solution may cause the first saline solution to precipitate a salt. The method may include introducing the precipitated salt into the second saline solution, causing the salinity difference between the first saline solution and the second saline solution to increase. The method may include using a portion of the generated electrical power to produce hydrogen gas, and optionally oxygen gas, through electrolysis. In some examples, transferring thermal energy from the first saline solution to the second saline solution includes transferring thermal energy from the first saline solution that is cooler than the second saline solution.

The method may further include coordinating the transfer of heat from one or more heat sources to the first saline solution and/or the second saline solution based on one or more measurements of a state of the one or more heat sources or the first saline solution and/or the second saline solution. The heat source may include one or more of geothermal heat, industrial waste heat (e.g., power plant), exhaust from an transportation vehicle (e.g., car, ship, truck), or solar heat.

The method may include reversing the flow of circulation of the first saline solution and the second saline solution in the closed system. This may be achieved by applying a solenoid valve on both ends of the closed loop system. Reversing the flow of circulation does not stop production of energy and prolongs the use of the selectively permeable membranes such that the membrane may wear out substantially equally on both opposite, lateral sides thereof.

The following discussion omits or only briefly describes conventional features of the disclosed technology that are apparent to those skilled in the art. Reference to various embodiments does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant invention, in combination with routine experiments, to achieve other outcomes not specifically disclosed in the examples or the embodiments.

It is also to be understood that the terminology used in the description is for the purpose of describing the particular versions or embodiments only and is not intended to limit the scope of the present disclosure which will be limited only by the appended claims. Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meanings as commonly understood by one of ordinary skill in the art. Although any methods, equipment, and materials similar or equivalent to those described herein can be used in the practice or testing of embodiments of the present disclosure, the preferred methods, devices, and materials are now described. All references mentioned herein are incorporated by reference in their entirety.

As used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other and are not necessarily "superior" and "inferior". Generally, similar spatial references of different aspects or components indicate similar spatial orientation and/or positioning, i.e., that each "first end" is situated on or directed towards the same end of the device.

The systems and methods described in this disclosure are generally directed to efficiently extracting usable energy from the difference in salt concentration between two solutions via a precisely orchestrated and controlled mixing of the two solutions. The systems may be used to directly generate electrical power or to generate hydrogen gas or hydrogen and oxygen gases, which can be used as a fuel for generating mechanical (and/or electrical) power or to generate pressure and/or gravitational potential energy, either of which can be used to drive a turbine or perform other useful work. The systems encompass a range of sizes and power outputs. Some embodiments may be configured to generate power at the scale of a single residence or commercial building. In some examples, the systems include industrial power generation systems providing electrical power to a regional or national power grid. In some examples, the systems provide hydrogen fuel, e.g., to power a fleet of vehicles, as well as (or instead of) generating electrical power.

FIG. 1 shows an example system 100 for generating electricity from a salinity gradient. The example system 100 includes a reverse electrodialysis (RED) battery 110. The RED battery 110 includes a cathode 112 and an anode 114 separated by one or more cells 150, 150a, 150b. Each cell 150 contains a salt solution 130, i.e., a liquid mixture of a solvent and a salt that has been dissolved into its anionic and cationic constituent components, such that the ionic constituents are free to move with respect to each other. Each ion may have a single charge or may have multiple changes. In some examples, the solvent and solute are water and sodium chloride (NaCl), respectively. The dissociated ions of NaCl are $Na^+$ and $Cl^-$, each having a single charge. Other solvents and solutes may be used that also form a liquid mixture including anions and cations that are free to move with respect to each other. The solvent may be an organic or inorganic liquid, including, but not limited to, water, alcohol, benzene, glycerin. The salt solution may be exothermic or endothermic. That is, as the solution is formed, the solution may either absorb heat, such as when potassium chlorate ($KClO_3$) or potassium nitrate ($KNO_3$) is dissolved in water, or give off heat, such as when calcium chloride ($CaCl_2$) is dissolved in water.

As shown in FIG. 1, the salt solution 130 is separated from a dilute solution 140 (i.e., a solution having a lower solute concentration than the salt solution) by selectively permeable membranes 104, 104a-d. The salt solution 130 is separated from the dilute solution 140 on one side of the cell 150 by a cation-exchange membrane (104a, 104c) and on the other side of the cell 150 by an anion-exchange membrane (104b, 104d) which is spaced apart from the cation-exchange membrane (104a, 104c). The salt solution 130 is disposed in the space between the cation-exchange membrane (104a, 104c) and anion-exchange membrane (104b, 104d). In the absence of these membranes 104, the salt solution 130 would freely diffuse into the dilute solution 140, equalizing the salinity of the two solutions. The movement of negatively charged ions toward the anode 114 and positively charged ions toward the cathode 112 causes an electrical potential difference (voltage) across the cell 150. The total voltage of the battery 110 includes the voltages of each cell 150.

Ions may tend to accumulate near the membranes 104. This accumulation may impede the process of generating power. To counteract this accumulation, the system 100 may apply an agitating or mixing force to the salt solution 130 and/or the dilute solution 140, causing the ions to be distributed more evenly (homogeneously) throughout the solution 130, 140. In some examples, the system 100 applies sonic vibration to one or more solutions 130, 140 to enhance homogeneity of the solution 130, 140. The system 100 may apply sonic vibration to areas of the cell 150 where ions accumulate, e.g., near one or more membranes 104, to effectively enhance homogeneity of one or more solution 130, 140.

As shown in FIG. 1, the electrodes (e.g., cathode 112, anode 114) are surrounded by the dilute solution 140. Alternatively, the electrodes 112, 114 may be surrounded by a rinse solution which is circulated in a closed loop between the electrodes 112, 114 such that the rinse solution is separate from the salt solution 130 and dilute solution 140. In such an arrangement, the outer selectively-permeable membranes 104 (i.e., the membranes 104 closest to the respective electrodes 112, 114 of the RED battery 110) are of the same type (e.g., both anion-exchange membranes or both cation-exchange membranes). For example, a cation-exchange membrane 104 may separate the rinse solution surrounding the cathode 112 from the salt solution 130, and a cation-exchange membrane 104 may also separate the rinse solution surrounding the anode 114 from the dilute solution 140. In this arrangement, the cations that migrate from the salt solution 130 to the electrolyte surrounding the cathode 112 are recirculated to the anode 114, where the cations may pass through the cation-exchange membrane 104 and into the dilute solution 140. Similarly, membranes 104 closest to the respective electrodes 112, 114 may both be anion-exchange membranes, in which case anions are circulated (in the rinse solution) from the anode 114 to the cathode 112, where the anions pass through the anion-exchange membrane 104 into the dilute solution 130. In either configuration, a reduction reaction takes place at the cathode 112 and a balancing oxidation reaction takes place at the anode 114. In some examples, the rinse solution includes a supporting electrolyte to enhance the reactions at the electrodes 112, 114. Because both electrodes 112, 114 are surrounded by the same electrolyte (rinse solution) in this arrangement, the rinse solution may form a resistive load between the electrodes 112, 114, through which current may flow, resulting in a reduction of power output of the RED battery 110. In some examples, the rinse solution and/or associated circulation system may be configured to have a high resistance with respect to the output load of the RED battery 110 or the internal resistance of cells 150 of the RED battery 110. For example, the rinse solution circulation path may be configured to be relatively long.

The electrical current produced by the battery 110 is a function of the rate of ion movement, and the rate of ion movement is a function of several factors, including the salinity gradient (i.e., the salinity difference between the salt solution 130 and the dilute solution 140) and the temperature of (at least) the salt solution 130, as well as aspects of the membranes 104. The temperature of the salt solution 130 affects the rate at which ions in the salt solution 130 move toward (and across) the membranes 104 due to the increased kinetic energy of the ions at higher temperatures. According to the Nernst equation, the power produced is a function of the log of the salinity ration of the salt solution 130 and dilute solution 140. As ions move from the salt solution 130 to the dilute solution 140, however, the salinity of the dilute solution 140 increases and the salinity of the salt solution 130 decreases. Thus the gradient between the "spent" salt solution 130 and the "spent" dilute solution 140 decreases. To maintain electrical current (and therefore, power output) of the battery 110, the salinity difference may be continually regenerated by refreshing the spent salt solution 130 and/or the spent dilute solution 140. To this end, the spent salt solution 130 and/or the spent dilute solution 140 may be circulated (e.g., in a closed loop) between the RED battery 110 and a regeneration system. Alternatively, the spent salt solution 130 and/or the spent dilute solution 140 may be continually replenished, e.g., from natural sources such as rivers and oceans or bays.

Figure 2:
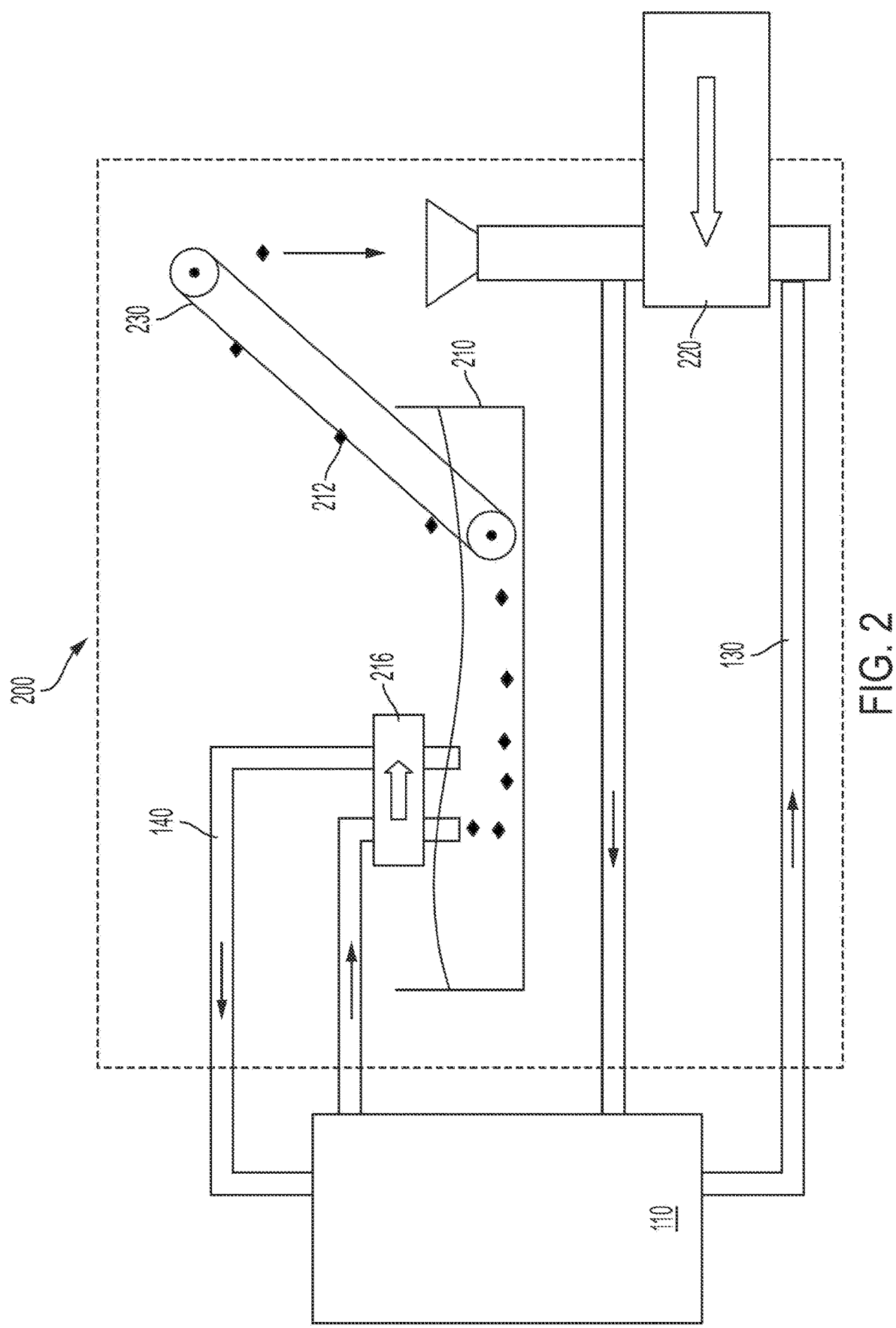
FIG. 2 shows an example regeneration system.

FIG. 2 shows an example regeneration system 200. The example regeneration system 200 includes a salt removal subsystem 210. The regeneration system 200 circulates spent dilute solution 140 in a closed loop from the RED battery 110 through the salt removal subsystem 210 and back to the RED battery 110 as refreshed dilute solution 140. In some examples, the salt removal subsystem 210 evaporates and then condenses the solvent of the dilute solution 140 then circulates the condensed solvent back to the RED battery 110 as refreshed dilute solution 140. The system may evaporate solvent until the remaining dilute solution 140 is close to, or even less than, the solubility limit. The remaining dilute solution 140 may then be reintroduced into the spent salt solution 130 to refresh the salt solution 130. In some examples, the salt removal subsystem 210 evaporates and then condenses the solvent of the salt solution 130 and then circulates the condensed solvent back to the RED battery 110 as refreshed dilute solution 140. In a closed-loop RED battery 110, the salt removal subsystem 210 may evaporate, then condense both the salt solution 130 and the dilute solution 140, circulate the condensed solvent from both solutions back to the RED battery 110 as refreshed dilute solution 140, and circulate the remaining solution back to the RED battery 110 as refreshed (concentrated) salt solution 130. In some examples, the salt removal subsystem 210 decreases the salinity of the dilute solution 140 through the process of salt precipitation, rather than (or in addition to) evaporation, to regenerate the salinity difference between the salt solution 130 and dilute solution 140 in the RED battery 110. Other methods of regenerating the salinity gradient include freezing the spent dilute solution 140, e.g., through Eutectic Chilled Crystallization (ECC), or using microfiltration and/or membrane separation. In some examples, multiple methods are advantageously combined. For example, a precipitation or freezing stage may be enhanced by a subsequent membrane filtration stage in order to optimize the total energy required to separate the salt from the spent dilute solution 140.

As shown in FIG. 2, the example salt removal subsystem 210 removes salt from the spent dilute solution 140 by causing salt to precipitate. Generally, the ability of a solvent to dissolve a solute increases with increased temperature. Conversely, lowering the temperature of a solution below the temperature known as the saturation point (the temperature at which the solution is at its maximum salinity) will generally cause the solute to precipitate. The example salt removal subsystem 210 includes a heat transfer device 216 configured to cool the spent dilute solution 140 to a temperature below the saturation point. If the spent dilute solution 140 is an exothermic solution, the dilute solution 140 will further cool as the salt precipitates. In some examples, the heat transfer device 216 also heats the refreshed dilute solution 140, e.g., back to the temperature of the spent dilute solution 140 prior to cooling. That is, the heat transfer device 216 may transfer some or all of the thermal energy removed from the spent dilute solution 140 back to the refreshed dilute solution 140, as shown by the arrow associated with the heat transfer device 216 of FIG. 2. In this way, the temperature of the refreshed dilute solution 140 entering the RED battery 110 is substantially the same as the temperature of the spent dilute solution 140 leaving the RED cell 150.

In the example salt removal subsystem 210, the precipitated salt 212 settles to the bottom of the salt removal subsystem 210, e.g., in a dense solid form. In some examples, the salt removal subsystem 210 includes a conveying device 230 configured to transport the precipitated salt 212 away from the salt removal subsystem 210. The conveying device 230 may be a belt, pump, Archimedes screw, or other device or system configured to physically transport the precipitated salt 212 away from the salt removal subsystem 210. For example, if the salt is in a solid form, the conveying device 230 may be a mechanical system capable of transporting solid material. In some examples, the removed salt 212 is conveyed to a salt replenishment subsystem 220 where the salt is reintroduced (e.g., redissolved) into the spent salt solution 130, thus refreshing the spent salt solution 130. In a similar manner to how the regeneration system 200 circulates dilute solution 140, the regeneration system 200 may also circulate spent salt solution 130 in a closed loop from the RED battery 110 through the salt replenishment subsystem 220 and back to the RED battery 110 as refreshed salt solution 130. The salt replenishment subsystem 220 may increase the salinity of the salt solution 130 through the process of redissolving the salt removed by the salt removal subsystem 210, thus regenerating the salinity difference between the salt solution 130 and dilute solution 140 in the RED battery 110.

As described above, the ability of solvent to dissolve a solute generally increases with increased temperature. Thus, higher temperatures of the salt solution 130 allow for higher levels of salinity and the accompanying greater differences between the salinity of the salt solution 130 and the dilute solution 140. A solubility curve is a plot of the amount of a solute that a specific amount of solvent can dissolve as a function of temperature. In some examples, a solubility curve associated with a solution is linear. That is, the amount of solute that the solvent can dissolve may change linearly with temperature change over a wide range of temperatures (e.g., the entire range that the solvent is a liquid). In some examples, the amount of solute that the solvent can dissolve changes non-linearly with temperature change. In these cases, the amount of solute that the solvent can dissolve may increase by, e.g., a factor of five or more, even within a narrow range of temperatures. The system 100 may be configured to operate the RED battery 110 within a temperature range where the salinity of the salt solution 130 is high. Dissolving additional salt may require transferring additional heat to the salt solution 130. Furthermore, the system 100 may maintain the temperature of the RED battery 110 at a point above the solubility point to provide a "safety margin," to avoid unwanted precipitation if the salt solution 130 cools below the solubility point.

The salt replenishment subsystem 220 may receive thermal energy from one or more heat sources configured to increase the temperature of the salt solution 130, e.g., to allow additional salt to dissolve. For example, the salt replenishment subsystem 220 may receive waste heat from the heat transfer device 216 of the salt removal subsystem 210. The salt replenishment subsystem 220 may also be configured to receive thermal energy from other heat sources as well, as shown by the arrow associated with the salt replenishment subsystem 220 of FIG. 2. Examples of heat sources include, but are not limited to, geothermal heat, industrial waste heat, solar heat, combustion heat, vapor-compression-cycle waste heat (e.g., from a heat pump), chemical reaction heat, or other forms of heat that are not readily or efficiently converted to usable forms through conventional means, such as a by driving a turbine.

A thermal optimization system may be used to optimize the use of thermal energy with the power generation system 100 described herein. Thermal optimization systems are further described in U.S. Pat. No. 11,067,317, which is hereby incorporated by reference in its entirety. The thermal optimization system may transfer thermal energy from one or more heat sources to one or more heat sinks. Examples of heat sinks include the interior of living or office spaces during cooler seasons of the year, heated swimming pools, saunas, and steam rooms. In these examples, the system may be configured to regulate a temperature by modulating the transfer of thermal energy to a heat sink. For example, the thermal optimization system may monitor the temperature of the heated spaces and/or heated water and modulate the transfer of heat using processor-based logic, such as (but not limited to) running one or more PID feedback loops and/or expert systems. During hotter seasons, the interior spaces may be heat sources. In this case, the processor-based regulation system may modulate the transfer of thermal energy away from these spaces to regulate the temperature.

Figure 3:
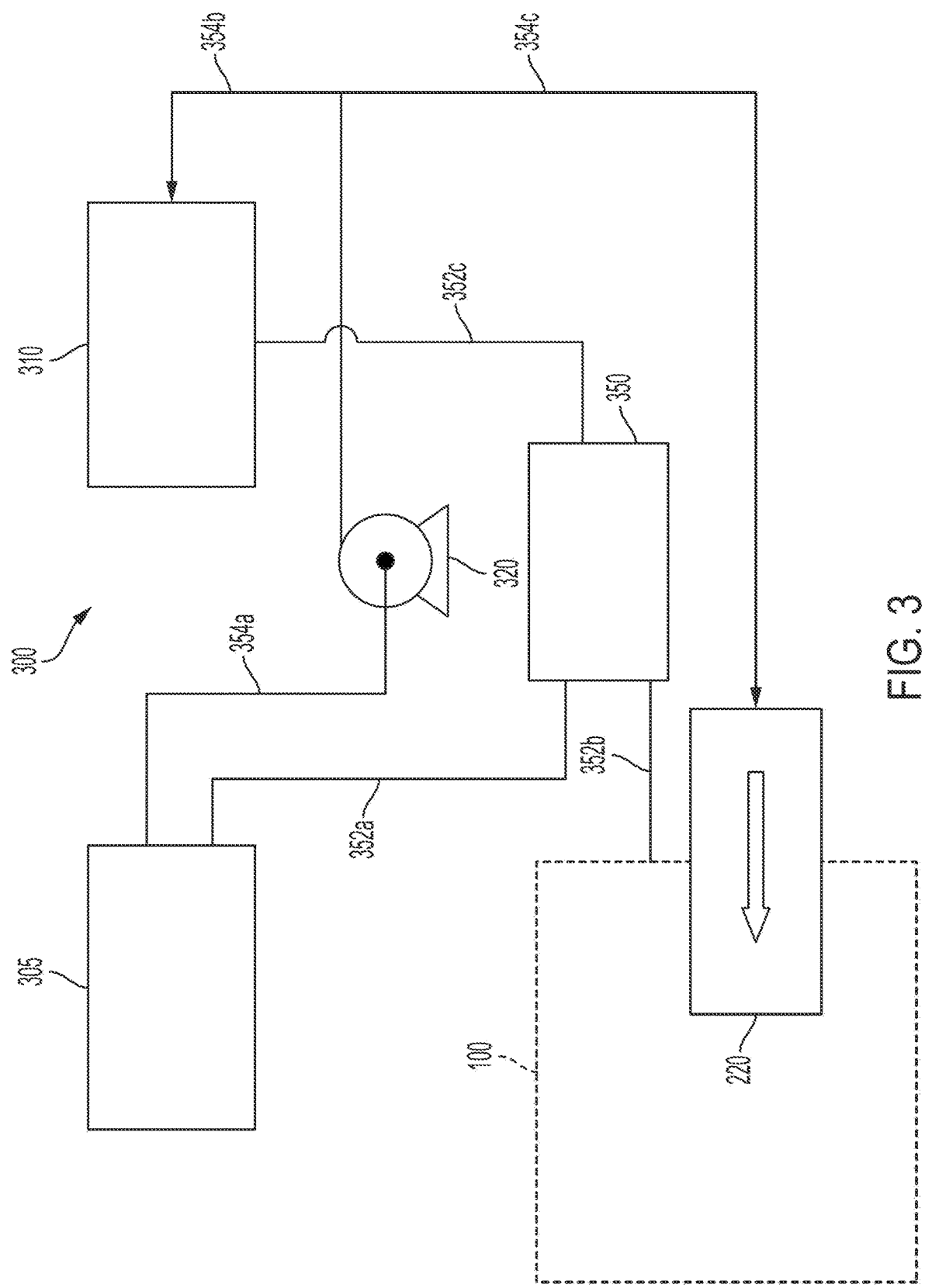
FIG. 3 shows an example thermal optimization system.

FIG. 3 shows an example thermal optimization system 300. The example optimization system 300 includes one or more heat sources 305, one or more heat sinks 310, and one or more RED batteries 110 as described above. In some examples, the power generation system 100 includes a pressure-retarded osmosis (PRO) system (discussed in more detail below), or other systems for generating electricity from a salinity gradient (e.g., capacitive mixing (CAP)) instead of (or in addition to) a RED battery 110. The optimization system 300 may include one or more pumps 320 configured to transfer heat from one location to another.

In some examples, the optimization system 300 uses vapor-compression refrigeration to transfer heat from a heat source to a heat sink. That is, the optimization system 300 may compress a refrigerant to transfer thermal energy from the refrigerant to a heat sink (e.g., by a heat exchanger configured for the purpose of absorbing and distributing thermal energy). The optimization system 300 may then transfer the compressed refrigerant (e.g., by pumping the compressed refrigerant via piping configured for the purpose) to a heat source and allow the refrigerant to expand, absorbing thermal energy from the heat source (e.g., via a heat exchanger configured for the purpose of providing thermal energy from the heat source). The vapor-compression refrigeration system may include a reversing valve or other controllable device that causes the transfer of thermal energy to change direction. The optimization system 300 may control the reversing value to change the direction of heat transfer, e.g., to cool an interior space during the day, when ambient temperatures are relatively high, then reverse the heat flow to heat the interior space at night as ambient temperatures drop.

Operation of the thermal optimization system 300 may be coordinated by a control system 350 having a processor, e.g., as described below with respect to FIG. 7. The processor executes instructions causing the control system 350 to coordinate the transfer of heat between heat sources 305, heat sinks 310, and RED batteries 110 (or PRO or CAP systems), e.g., based on prevailing conditions. The control system 350 may also coordinate the transfer of heat within the power generation system 100, e.g., between subsystems such as the salt removal subsystem 210 and the salt replenishment subsystem 220. The control system 350 may transmit or receive signals 352, 352*a-c* to or from the heat sources 305, heat sinks 310, and RED battery 110 (or PRO or CAP system). The control system 350 may receive signals 352 indicating one or more conditions or states of, e.g., the heat sources 305, heat sinks 310, and RED battery 110 (or PRO system). For example, the signals 352 may indicate measured quantities such as temperatures and/or pressures, or the signals may indicate user inputs, such as target temperatures for heated interior spaces. Temperatures associated with power generation system 100 may include temperatures of the salt solution 130 and dilute solution 140 in the RED battery, in the salt removal subsystem 210, and/or in the salt replenishment subsystem 220, respectively.

A control system 350 may be used to transmit control signals, e.g., to control the speed of a compressor and/or pump, a direction of a reversing valve, the operating speed of the salt conveying/transfer device 230, etc. to achieve the indicated target temperatures and/or power outputs. For example, the control system 350 may adjust the temperature of the salt solution to be at or near its solubility limit. In this way, the control system 350 may efficiently control and modulate the transfer of heat between several heat sources 305 and heat sinks 310 simultaneously, based on prevailing conditions and user settings, while optimizing the output of the power generation system 100. Furthermore, the control system 350 may affect the level of vapor-compression-cycle waste heat generated by one or more heat pumps 320 and transfer the waste heat to one or more heat sinks and/or to the RED battery 110, thus efficiently recapturing its own waste heat for power generation or other purposes. In this way, the optimization system 300 may transfer heat from any or all of a variety of heat sources, under a variety of dynamic conditions (e.g., as conditions change throughout the year or throughout the day) and/or based on demands of the RED battery 110. Furthermore, the control system 350 may configure the power generation system 100 to store excess energy. For example, when demand for electrical energy is low, the control system 350 may configure the RED battery 110 to produce a portion of its energy output as hydrogen gas to be used as fuel at a later time, rather than as electrical energy to be used at the time of generation. Furthermore, in the case of a PRO system, the control system 350 may configure the rate at which pressure is converted to electricity, e.g., by controlling the rate of flow through a turbine. In this way, the control system 350 may retain some energy in the form of, e.g., gravitational potential energy when demand for electrical power is low and convert greater amounts of the gravitational potential energy to electrical energy when demand for electrical power is high.

Figure 4:
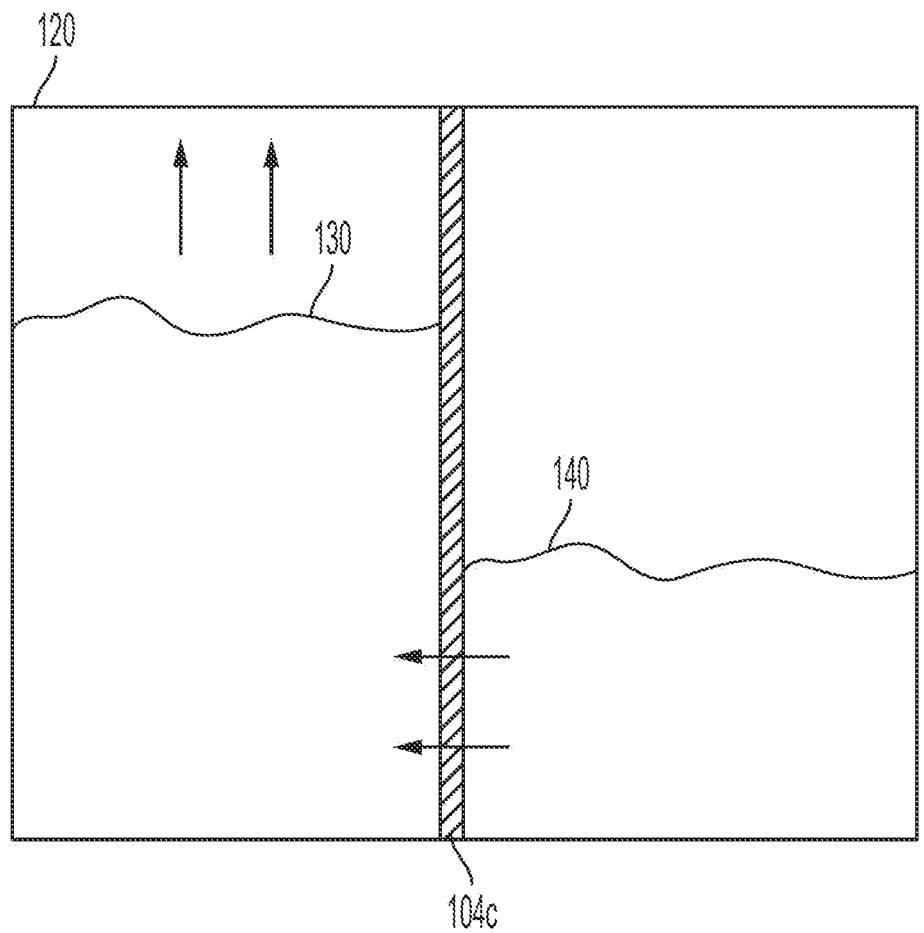
FIG. 4 shows an example pressure-retarded osmosis (PRO) system.

In some embodiments, the system 100 includes a PRO system instead of (or in addition to) the RED battery 110 described above. FIG. 4 shows an example PRO system 120. The example PRO system 120 also includes a salt solution 130 separated from a dilute solution 140 by a selectively permeable membrane 104c, similar to the RED battery 110 described above. However, rather than directly generating electrical power from the salinity difference between the salt solution 130 and the dilute solution 140, the PRO system generates pressure, which may take the form of gravitational potential energy. Therefore, the PRO system may not include electrodes. The selectively permeable membranes of the PRO system may be configured to preferentially allow solvent, rather than solute, to pass through the membrane, e.g., from the dilute solution 140 to the salt solution 130 so as to decrease the salinity difference between the solutions. In the PRO system, the selectively permeable membrane may be a hollow fiber membrane that allows water, but not salt, to permeate. In the PRO system, the selectively permeable membrane may be a hollow fiber membrane, a spiral wound membrane, a flat sheet membrane, or a combination thereof. As a result, the pressure and/or the average height of the solvent in the salt solution 130 may increase over time as solvent migrates across the membrane 104c into the salt solution 130. The system 100 may convert the increased pressure and/or gravitational potential energy of the salt solution 130 into a more usable form of power, such as electrical energy, e.g., by directing the (raised) salt solution 130 through a turbine, paddlewheel, or other suitable mechanism for producing electricity. The system 100 may then circulate the spent salt solution 130 through a solvent removal system similar to the salt removal subsystem 210 described above. For example, the solvent recovery system may remove the excess solvent through evaporation (optionally in a partial vacuum to reduce the boiling point) and subsequent condensation. The solvent recovery system may then circulate the condensed solvent back to the PRO system 120 as refreshed or "make up" dilute solution 140 and circulate the refreshed salt solution (after excess solvent is removed) back to the PRO system 120 as refreshed salt solution 130. Alternatively (or additionally), the solvent recovery system may cause the solute to precipitate out of the spent salt solution 130 before circulating the spent salt solution back to the PRO system 120 as "make up" dilute solution 140 and introducing the precipitated salt back into the salt solution 130, e.g., via the conveying device 230 of FIG. 2. As with the RED battery 110 described above, the rate of power generated by the PRO system 120 is a function at least of the salinity difference between the salt solution 130 and the dilute solution 140 and the temperature of at least the salt solution 130.

The RED system may a capacitive (CAP) system instead of (or in addition to) a RED battery and/or PRO system. CAP system is an electrode-based technology used to produce electrical energy from salinity gradients. Electricity generation using a CAP system is based on a cycle of charging and discharging electrodes. The electrodes in a CAP system are sequentially exposed to two solutions that have large differences in salinity. CAP systems are charged with energy in the form of salinity gradients and extracts energy from salinity differences and benefits from the voltage rise that takes place between two electrodes dipped in a saline solution when its salt concentration is changed. The power production predominantly depends on the following properties of each electrode: the amplitude of the potential rise upon salinity change, and the potential in the high-salinity solution. The electrodes may be identical such that the flow of the system may be reversed and the polarity may be changed without ceasing electricity generation. The CAP system may include one or more selectively permeable membranes as disclosed herein.

As shown in FIG. 1, the salt solution 130 is separated from the dilute solution 140 on one side of the cell 150 by a cation-exchange membrane (104a, 104c) and on the other side of the cell 150 by an anion-exchange membrane (104b, 104d). Alternatively, the salt solution 130 and the dilute solution 140 may be separated by a single selectively permeable membrane 140 (e.g., a cation-exchange membrane or an anion-exchange membrane). The selective movement of ions across the single membrane 140 causes an electrical potential difference (voltage) across the membrane 140. Similar to the embodiment of FIG. 1, electrical current produced by a single-membrane embodiment of a RED cell 150 (e.g., a flow pump) is also a function of the rate of ion movement, and the rate of ion movement is a function of several factors, including the salinity gradient between the salt solution 130 and the dilute solution 140, the temperature of (at least) the salt solution 130 (due to the increased kinetic energy of the ions at higher temperatures), and aspects of the single membrane 104.

In some embodiments, the system includes a first RED battery 110a, configured to use an exothermic salt solution 130a, and a second RED battery 110b, configured to use an endothermic salt solution 130b. The system may transfer heat generated by dissolving the solute in the exothermic salt solution 130a to the endothermic solution 130b to replace heat absorbed while dissolving the solute.

Figure 5:
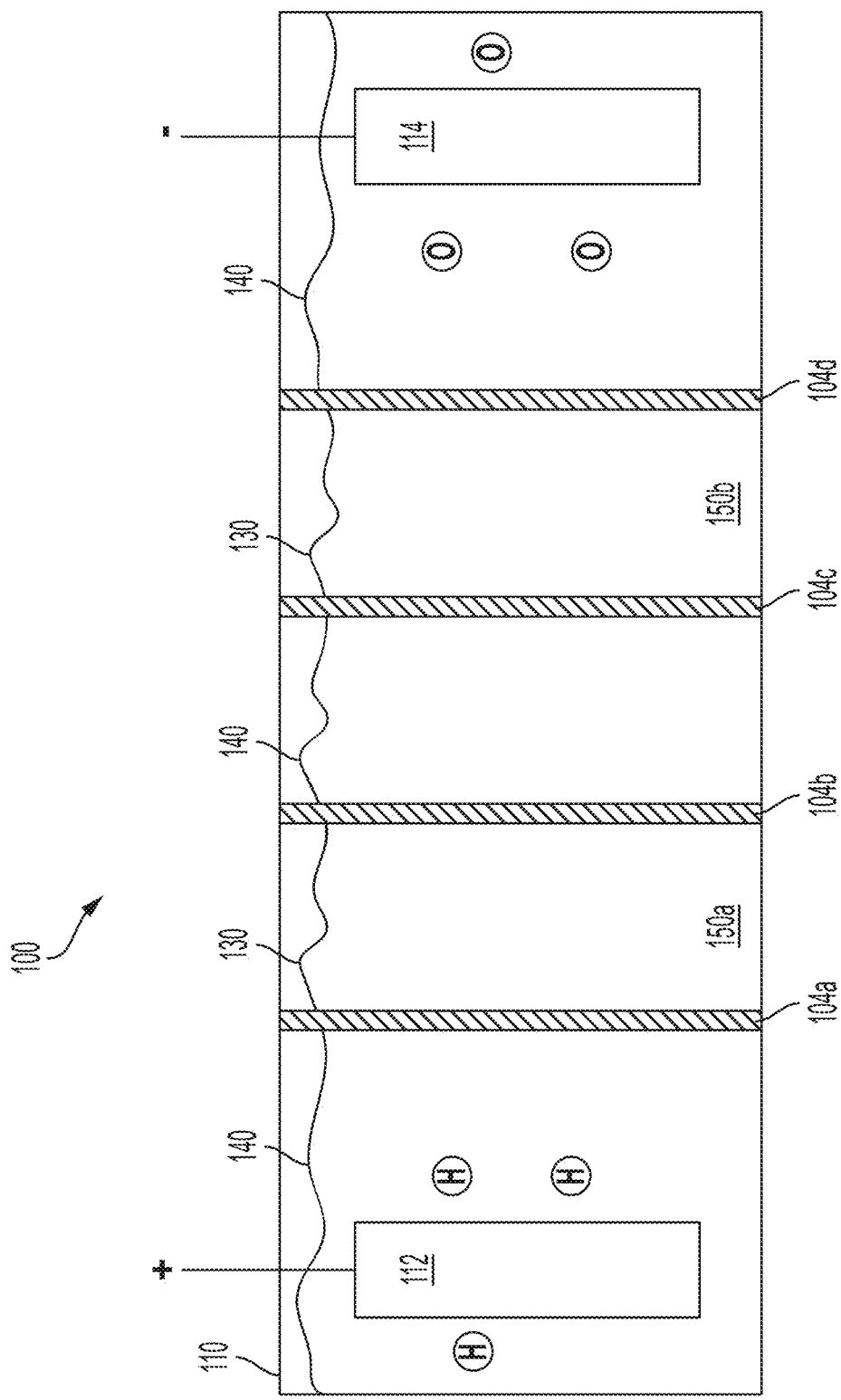
FIG. 5 shows an example hydrogen-generating system.

In some embodiments, a portion of the generated electrical power is used to produce hydrogen gas, e.g., by decomposing water through electrolysis. For example, when the dilute solution is water, a potential difference of 1.23 volts may be applied to the water to split the water into hydrogen and oxygen. The oxygen may be supplied and pumped into a space, such as a building or other indoor area. The hydrogen and/or oxygen may be stored for later use, e.g., as a battery. Either the salt solution or the dilute solution (or both) may be decomposed through electrolysis. FIG. 5 shows an example RED battery 110 configured to generate hydrogen. The liberated hydrogen and oxygen gases may "bubble" to the surface near the respective cathode 112 and anode 114 of the RED battery 110. The system 100 may separate the oxygen and hydrogen gases (e.g., by physically separating the cathode 112 and anode 114), capture and store the hydrogen (e.g., capture the hydrogen gas as it bubbles to the surface near the cathode), and then transport the hydrogen, by appropriate means and to appropriate locations, for use as a fuel. In these cases, the system 100 must replenish or "make up" the solvent lost to electrolysis, e.g., from a stream or other source of fresh water. The RED battery 110 may be configured such that electrolysis naturally occurs. That is, the RED battery 110 may be configured to generate sufficient potential difference to cause electrolysis of its solvent. In some examples, the regeneration system uses electrolysis to refresh the salinity of the spent salt solution 130 as make up fresh water is circulated to the RED battery 110 (or PRO or CAP system) as refreshed dilute solution 140. In some examples, the system includes a separate reservoir of water for generating hydrogen gas through electrolysis (e.g., rather than electrolyzing the solvent of the RED battery or PRO or CAP system). The separate water reservoir may have its own "make up" source while the RED battery or PRO system remains closed loop. In these embodiments, the reservoir of water may also act as a heat reservoir or play other role in the heat optimization process.

Figure 6:
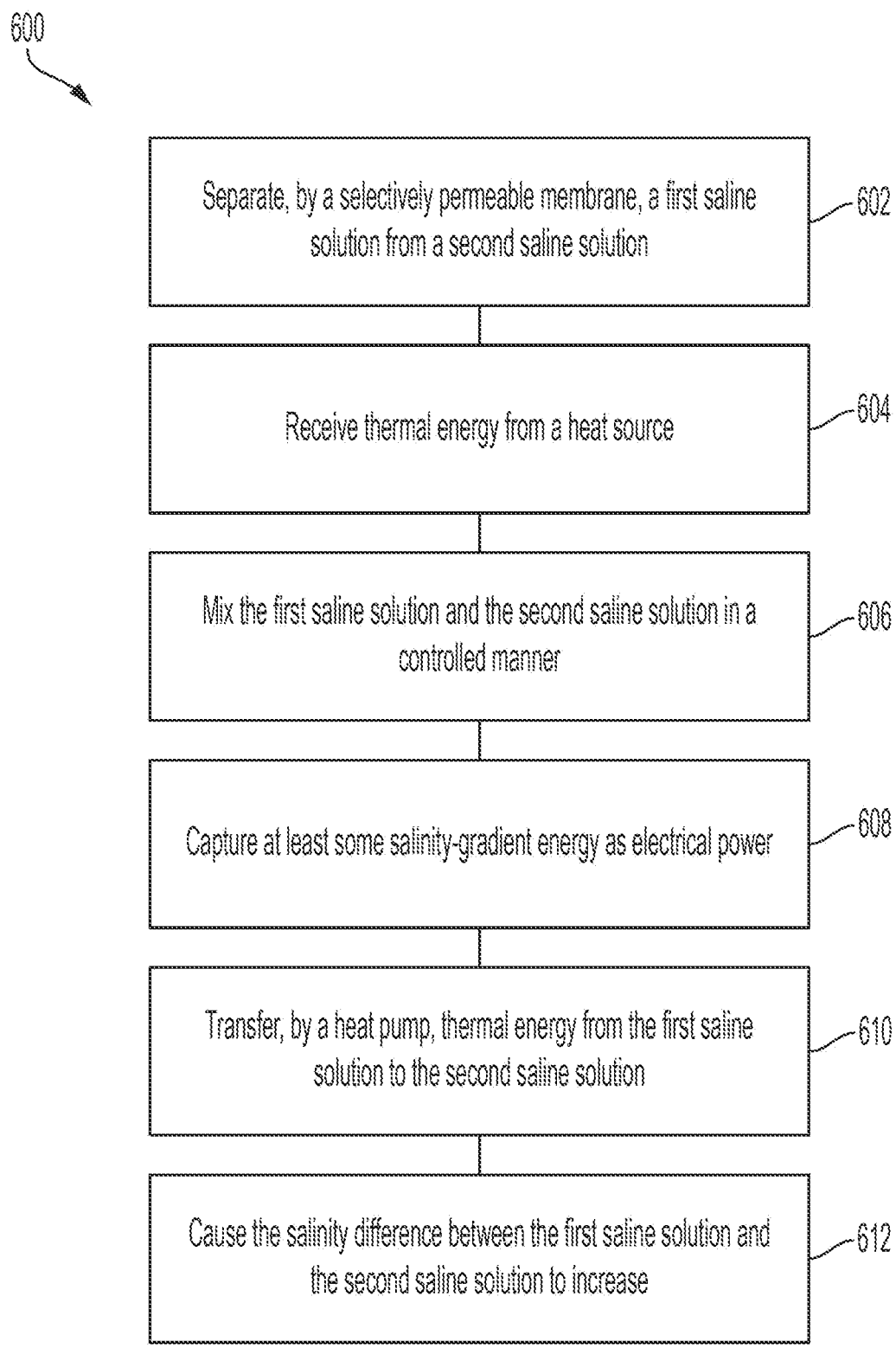
FIG. 6 is a flowchart of a method for generating electrical power from thermal energy.

FIG. 6 shows a flowchart 600 of an example method for generating electrical power from thermal energy. At step 602, the example method includes separating, by a selectively permeable membrane 104, a first saline solution 130 from a second saline solution 140. The selectively permeable membrane 104 may be configured to provide a controlled mixing of the first saline solution 130 and second saline solution 140 so as to capture the salinity-gradient energy in a more useful form as the mixing occurs. In some examples, the selectively permeable membrane 104 is configured to preferentially allow solvent of the first saline solution 130 to pass through the membrane and into the separate second saline solution 140, e.g., as in a PRO system. In some examples, the selectively permeable membrane 104 is configured to preferentially allow either anions or cations of the first saline solution 130 to pass through the membrane and into the separate second saline solution 140, e.g., as in a RED battery 110.

At step 604 the example method includes receiving thermal energy from a heat source. The power generated by the RED battery 110 (or PRO system) is a function of temperature. The received thermal energy may allow the RED battery 110 to continue to operate (e.g., produce electricity). In some examples, the control system 350 is configured to modulate the amount of thermal energy received and to configure which heat sources 305 provide the thermal energy. In some examples, the control system 350 is configured to transfer waste heat from one or more heat pumps 320 to the RED battery 110. In some embodiments, the power generation system 100 provides some or all of the power to operate one or more heat pumps 320. As a prophetic example, a RED battery 110 may have an efficiency of about 30% (i.e., 30% of the thermal energy transferred to the RED battery 110 is converted to electricity or other usable form of energy). A heat pump 320 may have a coefficient of performance (COP) between 3 and 4 (i.e., the heat pump 320 may require 1 KW of power to take up 2-3 KW of power from a heat source and transfer 3-4 KW to a heat sink (the sum of the input power and the thermal power taken up from the heat source). For example, a heat pump 320 with a COP of 4 may require 1 KW of power to transfer a total of 4 KW of heat to the RED battery 110. The heat pump 320 may transfer heat from a low-grade or "waste" heat source, e.g., a source that is not readily converted to a useful form of energy, such as a heat source less than 300 degrees C. In some predicted examples, the heat source may be the result of an industrial process which would otherwise simply output the waste heat to the environment. With an efficiency of 30%, the RED battery 110 may produce 1.2 KW of electrical power from the 4 KW of transferred heat. In this predictive example, 1 KW of the electrical power may be used to power the heat pump 320, leaving 200 W of electrical power for other purposes. Thus, in this predictive example, the combined system 100 of the RED battery 110 and heat pump 320 produces a net output of 200 W of electrical power with no net input of power other than the 3 KW of "waste" heat. In cases where the waste heat is the result of an industrial process, it is predicted that the combined system 110 of the RED battery 110 and heat pump 320 produces a net output of 200 W while simultaneously providing the benefit of cooling the waste heat by 3 KW before outputting it to the environment. The anticipated net efficiency of the combined system 110 may be further amplified with improvements to the efficiency of the RED battery 110.

Furthermore, the power generation system 100 may enhance the effective coefficient of performance (COP) of a heat pump 320, e.g., a heat pump used to heat or cool an inhabited space, by capturing some waste energy produced by one or more heat pumps and converting the waste energy into electrical energy to power the heat pump 320. For example, a heat pump with a heating COP of 3 may require 1.5 KW of power to pump 3 KW of heat from a source to a sink. If the heat sink does not require the full 4.5 KW of power (3 KW of pumped heat plus up to 1.5 KW of waste heat), the control system 350 may configure the optimization system 300 to transfer some or all of the waste heat to the RED battery 110 for conversion to power for the heat pump 320, increasing the effective COP of the heat pump 320. Furthermore, the control system 350 may configure the power generation system 100 to convert some amount to waste energy into a form which can be stored for later use, e.g., if the instantaneous demand for electrical power is greater than the amount of electrical power that can be produced. For example, a PRO system may retain waste energy in the form of unreleased pressure and/or gravitational potential energy, to be released at a future time, e.g., when demand for electrical energy is greater. Similarly, a RED battery 110 may produce hydrogen gas, to be used as fuel at a future time, in lieu of a producing some amount of electrical energy. Thus, waste heat from the heat pump 320 may be flexibly captured and released to further increase the effective COP of the heat pump.

At step 606 the example method includes mixing the first saline solution 130 and the second saline solution 140 in a controlled manner. At step 608, the example method includes capturing at least some salinity-gradient energy as electrical power. As described above, the RED battery 110 or PRO system or CAP system may be configured such that as the solutions (130, 140) mix, the salinity-gradient energy is converted into a more useful form. At step 610, the example method includes transferring, by a heat pump 320, thermal energy from the first saline solution to the second saline solution. At step 612 the example method includes causing the salinity difference between the first saline solution and the second saline solution to increase. As described above, the heat pump 320 may cool the spent dilute solution 140, causing the salt to precipitate from the dilute solution 140, thus refreshing the dilute solution. The heat pump may transfer the heat from the spent dilute solution 140 to the spent salt solution 130, enhancing the process of dissolving salt introduced into the salt solution 130. Alternatively (or in addition), the heat pump 320 may heat the spent salt solution 140, causing the salt solution 140 to evaporate, thus refreshing the salt solution. The evaporated solvent may be condensed (e.g., cooled by the heat pump) as the solvent vapor is circulated back to the RED battery 110 as refreshed dilute solution.

Figure 8:
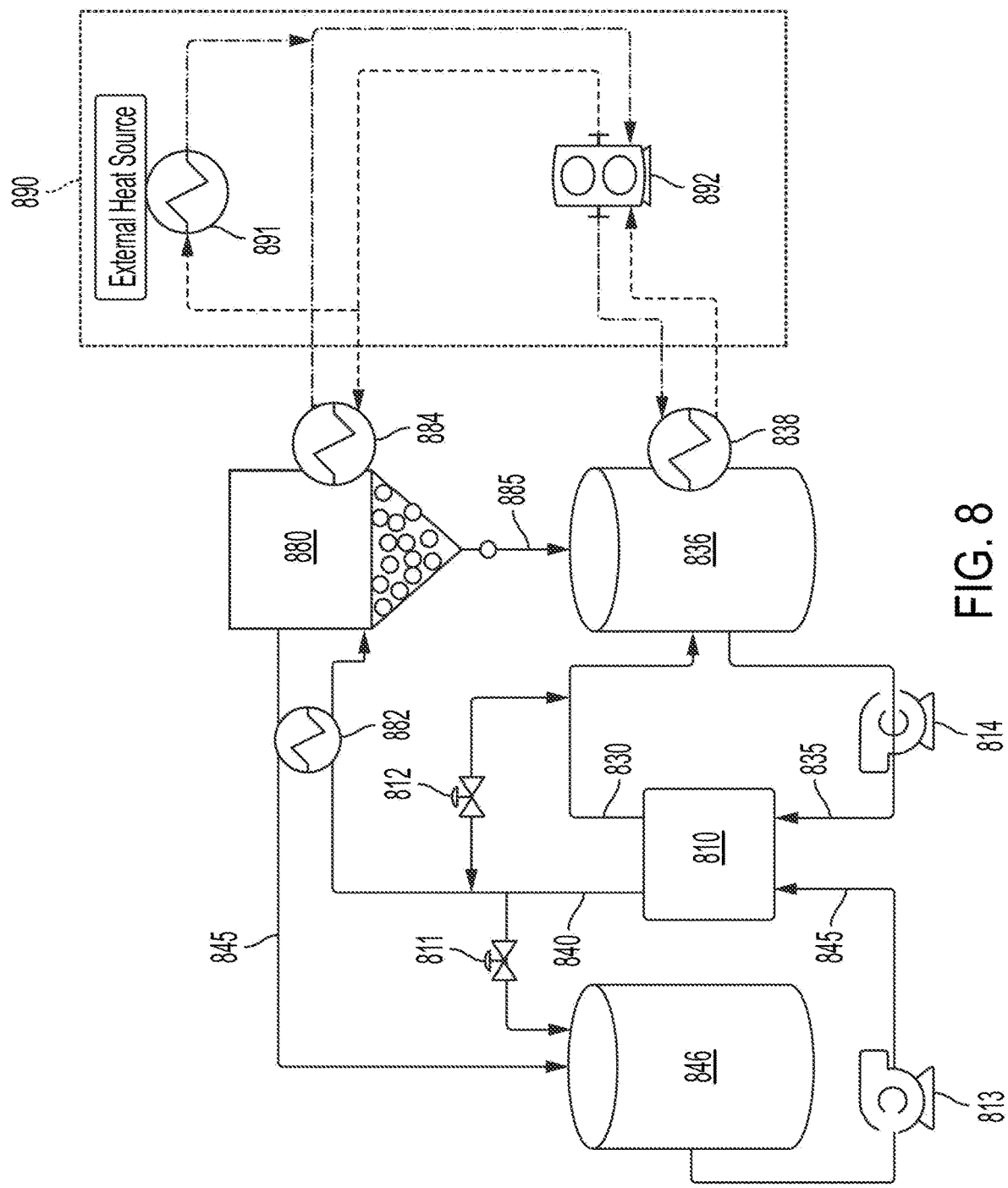
FIG. 8 is an example of a system and method of the disclosure including a RED or PRO battery in connection with a salt precipitation system, and which is connected to an external heat source.

FIG. 8 shows an example regeneration system including a salt precipitation system. In this embodiment, the salt precipitation system includes a salt precipitator 880, three heat exchangers 882, 884, 838 (though alternate embodiments may include one heat exchanger, two heat exchangers or more than three heat exchangers) and an external heat source system 890. This regeneration system circulates spent dilute solution 840 in a closed loop from the RED or PRO battery 810 through the salt precipitation system and back to the RED or PRO battery 810 as refreshed dilute solution 845. Optionally, the refreshed dilute solution 845 may be stored for a period of time in a tank 846 for holding the dilute solution before being directed to the RED or PRO battery 810. The spent dilute solution 840 is directed into the salt precipitator 880 where the heat exchanger 884 is applied to remove thermal energy from spent dilute solution 840 causing precipitation of a salt 885, which further dilutes the solution within the salt precipitator 880 thereby providing a regenerated dilute solution 845 (which may also be referred to as a refreshed dilute solution). The salt 885 is directed to a concentrate tank 836 (or a tank configured to regenerate the spent concentrated solution), which houses the spent concentrated solution 830. Within the concentrate tank 836, optionally with application of thermal energy via a heat exchanger 838 or the like, the salt 885 is dissolved into the spent concentrated solution 830 to increase the salt concentration and make a regenerated concentrated solution 835 (which may also be referred to as a refreshed concentrated solution).

The salt precipitation system decreases the salinity of the spent dilute solution 840 through the process of salt precipitation, rather than (or in addition to) evaporation, and increases the salinity of the spent concentrated solution 830 using the precipitated salt 885, to regenerate the salinity difference between the concentrated solution 835 and dilute solution 845 so that the streams may be directed to and used in the RED or PRO battery 810.

As shown in FIG. 8, the example salt precipitation system removes salt from the spent dilute solution 840 by causing salt to precipitate. Lowering the temperature of a solution below the temperature known as the saturation point (the temperature at which the solution is at its maximum salinity) will generally cause the solute to precipitate. This system includes a heat transfer device, shown in FIG. 8 as a heat exchanger 884, configured to cool the spent dilute solution 840 to a temperature below the saturation point. Heat exchanger 882 passively exchanges heat between the refreshed dilute solution 845 and the spent dilute solution 840. Heat exchanger 882 heats the refreshed dilute solution 845, e.g., back to the temperature of the spent dilute solution 840 prior to cooling, because the temperature of the solution in the dilute tank 846 may optimally be about 30° C. to about 50° C. That is, the heat exchanger 882 may transfer some or all of the thermal energy removed from the spent dilute solution 840 back to the refreshed dilute solution 845. The spent dilute solution 840 may be about 30° C. to about 40° C. and it will be lowered to about 5° C. in the precipitator. In this way, the temperature of the refreshed dilute solution 845 entering the battery 810 is substantially the same as the temperature of the spent dilute solution 840 leaving the battery 810. Heat exchanger 882 may act to both cool and heat as previously described or it may be positioned in the system to only heat the regenerated dilute solution 845 after it leaves the precipitator 880. For example, it may heat the stream of regenerated dilute solution 845 by blowing hot air on it. Control valves 811, 812 are included in the system to control and balance the volume of the flow of solutions. Pumps 813, 814 are included in the system to move the solution and allow the flow to the RED or PRO battery 810. Pumps 813, 814 may be any such pump or device known for use in the art that does work on a fluid to move the fluid, for example, but not limited to, a diaphragm or centrifugal, peristaltic pumps. The number of control valves and heat pumps may differ between systems of the disclosure. It will be understood by one of skill in the art that one or more control valves may be added to any embodiment in the disclosure. Heat exchangers 884, 838 transfer heat from the precipitator 880 or tank 836, respectively into the heat source system 890. Heat exchangers 884, 838 may be coils submerged in the precipitator 880 or tank 836, respectively, with liquid circulating within the coil, or each may be any other heat exchanger known in the art, such as a shell or tube heat exchanger.

FIG. 8 includes an external heat source system 890 including a heat exchanger 891, which adds heat into the system, and a heat pump 892. The external heat source system 890 may be used with a salt precipitation system to supply thermal energy to the concentrate tank 836. The external heat source system 890 is depicted as having closed loops, optionally refrigerant loops, to create the warming and cooling of the precipitator 880 and the concentrate tank 836. Heat exchanger 891 pulls in low grade heat, e.g., below about 100° C., or below about 200° C., or ultra low grade heat, e.g., ambient air, or below about 80° C.), optionally directly from the air, or from an external heat source. The external heat source supplies external heat into the heat source system 890 which is ultimately may be converted into electricity by the RED/PRO battery 810.

Figure 9:
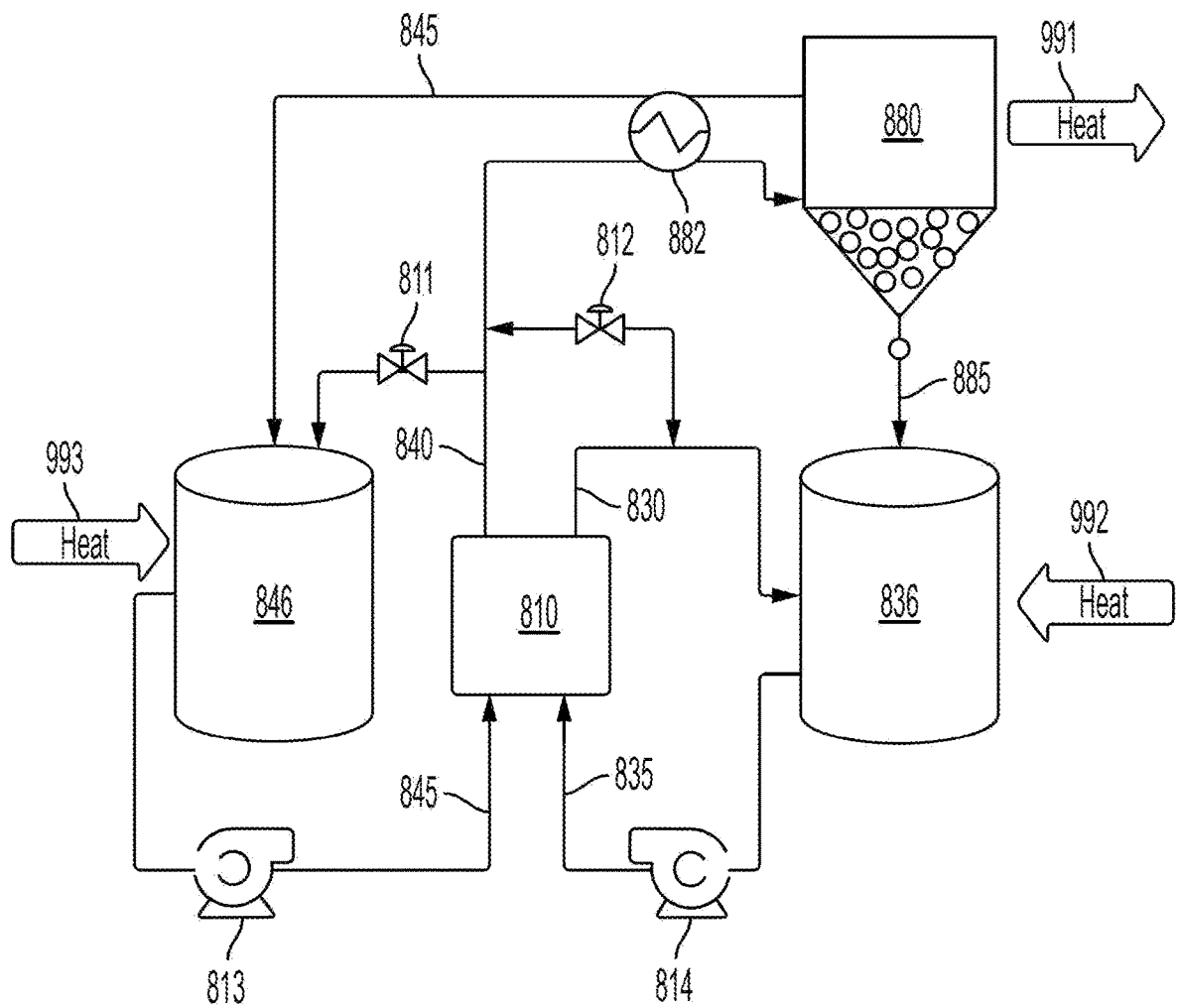
FIG. 9 is another example of a system and method of the disclosure including a RED or PRO battery in connection with a salt precipitation system. This system does not include an external heat source system, but heat is added to the dilute tank, e.g., via a heat pump loop and/or waste heat.

In other embodiments, the heat source system 890 is not present, and instead, high grade heat (e.g., steam, or from any source supplying heat above about 100° C.) can be added directly into the concentrate tank to heat it. FIG. 9 shows an example of a regeneration system including a salt precipitation system, but without the external heat source system included in FIG. 8. In FIG. 9, when the salt precipitator 880 is cooled, thermal energy is released, optionally as heat 991. The heat 991 may be removed and directed to any source, released, or directed back into the system via heat 992 by any means known in the art. Heat 992, 993 may be introduced into the system from ambient energy, a heat pump, or elsewhere in the system (e.g., heat 991).

FIG. 10 shows an example regeneration system including a salt decomposition system. In this embodiment, the salt decomposition system includes an absorber 1080, a salt decomposition vessel 1081, two heat exchangers 1082, 1084 (though alternate embodiments may include one heat exchanger, or more than two heat exchangers) and a heat pump 1013. Heat is added to the salt decomposition. This regeneration system circulates spent dilute solution 1040 in a closed loop from the RED or PRO battery 1010 through the salt decomposition vessel 1081, where heat is applied to warm the tank and form vapor and gaseous salt 1085, and back to the RED or PRO battery 1010 as refreshed dilute solution 1045. A heat exchanger 1084 is positioned to transfer thermal energy between the spent and refreshed dilute solution streams 1040, 1045. The spent concentrated solution 1030 circulates in a closed loop from the RED or PRO battery 1010 through the absorber 1080, and subsequently back to the RED or PRO battery 1010 as refreshed concentrated solution 1035. A heat exchanger 1082 is positioned to transfer thermal energy between the spent and refreshed concentrated solution streams 1030, 1035. When heat is applied to the vessel 1081, a gaseous product (e.g., decomposed gaseous salt) 1085 is released from the vessel and received by the adsorber 1080, where the salt that is decomposed within the vapor is absorbed into the spent concentrated solution 1035 to increase the salt concentration of the solution. Salt is removed from the spent dilute solution 1040 in the salt decomposition vessel 1081 leaving a regenerated dilute stream 1045. Heat 992, 993 may be introduced into the system from ambient energy, a heat pump, or elsewhere in the system. Heat 991 may be removed and used in a heat pump, or released. The heat pump 1013 may simultaneously heat and cool (see heat in 991 and heat out 993) and use heat/thermal energy 994 from another source. A control valve 1011 is included in the system to control and balance the volume of the flow of solutions. Salt decomposition vessel 1081 separates gas from the liquid; it may include a flash tank or stripper column to decompose the salt in the solution. The salt decomposition vessel 1081 and absorber 1080 may be any vessel or group of vessels, tanks and/or columns, and that achieve the functionality described herein, and are readily understood by one of skill in the art.

Figure 11:
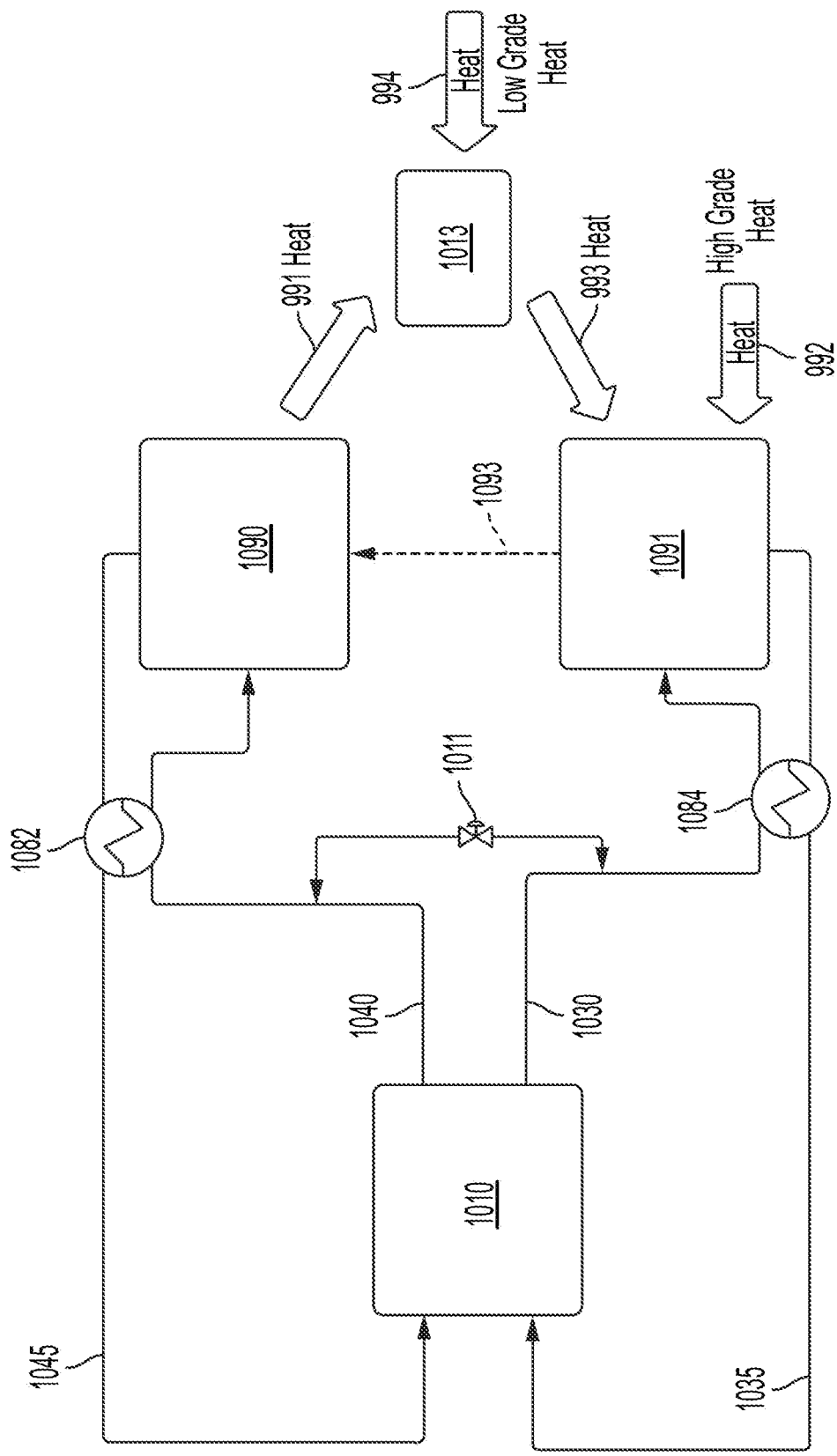
FIG. 11 is an example of a system and method of the disclosure including a RED or PRO battery in connection with an evaporation system.

FIG. 11 is another example of a regeneration system including an evaporation system. FIG. 11 differs from the embodiment of FIG. 10 in that it incorporates an evaporator 1091 and a condenser 1090. In this example, the spent concentrated solution 1030 circulates in a closed loop from the RED or PRO battery 1010 through the evaporator 1091, in which heat 992, 993 is applied which causes the solution to boil and water to evaporate as vapor 1093, thereby leaving a more concentrated solution, i.e., the refreshed concentrated solution that is directed back to the RED or PRO battery 1010. The vapor 1093 is directed from the evaporator 1091 to the condenser 1090, where the vessel is cooled and vapor is condensed to water and mixed with the spent dilute solution 1040 to make the refreshed dilute solution 1045, which is directed back to the RED or PRO battery 1010 in a closed loop. Heat pump 1013 produces a chilling effect for the condenser 1090. Traditionally, a cool water loop would be used in place of this heat pump, and any heat put into the system would be lost. By incorporating the heat pump as shown, heat is recovered, which makes the process more energy efficient. The evaporator 1091 and condenser 1090 may be any tank, vessel, column, or grouping thereof that achieves the function described herein, and is readily understood by one of skill in the art.

FIG. 12 is an example of a regeneration system including electrodialysis and salt precipitation. Dilute solution 1141 and concentrated solution 1131 are directed to the electrodialysis system 1190, in which electricity is supplied to force salt to separate from the dilute solution 1141 by moving ions from the dilute to the concentrate, which creates an ultra dilute solution 1147. By using electrodialysis, electricity is used to generate a more concentrated solution 1132 and an ultra dilute solution 1147. The spent dilute solution 1140 has salt removed in the precipitator 1180 leaving a dilute solution 1141 (having a lower salinity concentration than the spent dilute solution 1140). The dilute solution 1141 is further diluted beyond the solubility curve by using electrodialysis to produce an ultra dilute solution 1147 and create a greater salt gradient. As depicted in FIG. 12, the ultra dilute solution flows from the electrodialysis tank to the dilute storage tank 1146, where it mixes with the dilute solution 1141, if any, from the precipitator 1180. In an alternative embodiment, the system may be configured for the ultra dilute solution 1147 to flow directly into the battery 1110, with valves employed and positioned to change the flow of the solution, as readily envisioned by one of skill in the art.

The spent dilute solution 1140 is directed into the salt precipitator 1180 which is cooled (heat 1191 is removed). Removal of thermal energy from spent dilute solution 1140 causing precipitation of a salt 1185, which further dilutes the solution within the salt precipitator 1180 thereby providing a dilute solution 1147, which may be sent to the storage tank 1146 and/or further diluted by processing by electrodialysis. A regenerated dilute solution 1145 (which may also be referred to as a refreshed dilute solution) has the same salinity concentration as the ultra dilute solution 1147, or a lower salinity concentration than the dilute solution 1141 after mixing with the ultra dilute solution 1147 in the tank 1146. The regenerated dilute solution 1145 flows back to the battery 1110 to utilize the salinity gradient. The salt 1185 is combined with the spent concentrated solution 1130 to increase its salinity and then directed into a concentrate storage tank 1136. Within the concentrate storage tank 1136, optionally with the application of any heat 1192 or other thermal energy source, the salt 1185 is dissolved into the spent concentrated solution 1130 to increase the salt concentration and make a concentrated solution 1131, which is then directed into the electrodialysis system 1190 to increase its salinity concentration and produce a more concentrated solution 1132. The more concentrated solution 1132 may have a higher or equal salinity concentration as the regenerated concentrated solution 1135 (which may also be referred to as a refreshed concentrated solution). Concentrate tank 1136 may have excess salt at the bottom of it (not shown), which, if present, may function as a battery to allow the process to continue to operate when excess heat is temporarily not available.

The salt precipitation system decreases the salinity of the spent dilute solution 1140 through the process of salt precipitation, rather than (or in addition to) evaporation, and increases the salinity of the spent concentrated solution 1130 using the precipitated salt 1185, to increase the salinity difference between the concentrated solution 1131 and dilute solution 1141. In this embodiment, unlike in FIG. 2, the concentrated solution 1131 and dilute solution 1141 are further processed by electrodialysis to increase the salinity difference between the solutions before reintroduction into the battery 1110. Electricity 1171 generated by the RED or PRO battery 1110 may be used by any means known in the art, stored, and/or used as electricity 1170 for operation of the electrodialysis system 1190.

While in FIG. 12, a different tank is used for the electrodialysis system 1190 than the RED or PRO battery 1110, while in other embodiments, the same tank may be used for electrodialysis as is used for reverse-electrodialysis.

FIG. 13 is an example of a regeneration system incorporating a membrane distillation system 1390, where the electrodialysis system 1190 was in FIG. 12, and salt precipitation. The membrane distillation system 1390 includes a heat pump (not shown) that vaporizes water that can permeate through a porous hydrophobic membrane (not shown) into the dilute solution to decrease its salinity concentration, thereby creating an ultra dilute solution 1347. The ultra dilute solution 1347 may go directly to the battery 1110 or the dilute tank as shown, with valves employed and positioned to change the flow of the stream. As depicted in FIG. 13, the ultra dilute solution 1137 flows from the membrane distillation system 1390 to the dilute storage tank 1146, where it mixes with the dilute solution 1141, if any, from the precipitator 1180. In an alternative embodiment, the system may be configured for the ultra dilute solution 1347 to flow directly into the battery 1110, with valves employed and positioned to change the flow of the solution, as readily envisioned by one of skill in the art.

Within the concentrate storage tank 1136, optionally with the application of any heat 1192 or other thermal energy source, the salt 1185 is dissolved into the spent concentrated solution 1130 to increase the salt concentration and make a concentrated solution 1131, which is then directed into the membrane distillation system 1390 to increase its salinity concentration and produce a more concentrated solution 1332. The more concentrated solution 1332 may have a higher or equal salinity concentration as the regenerated concentrated solution 1135 (which may also be referred to as a refreshed concentrated solution).

Figure 14:
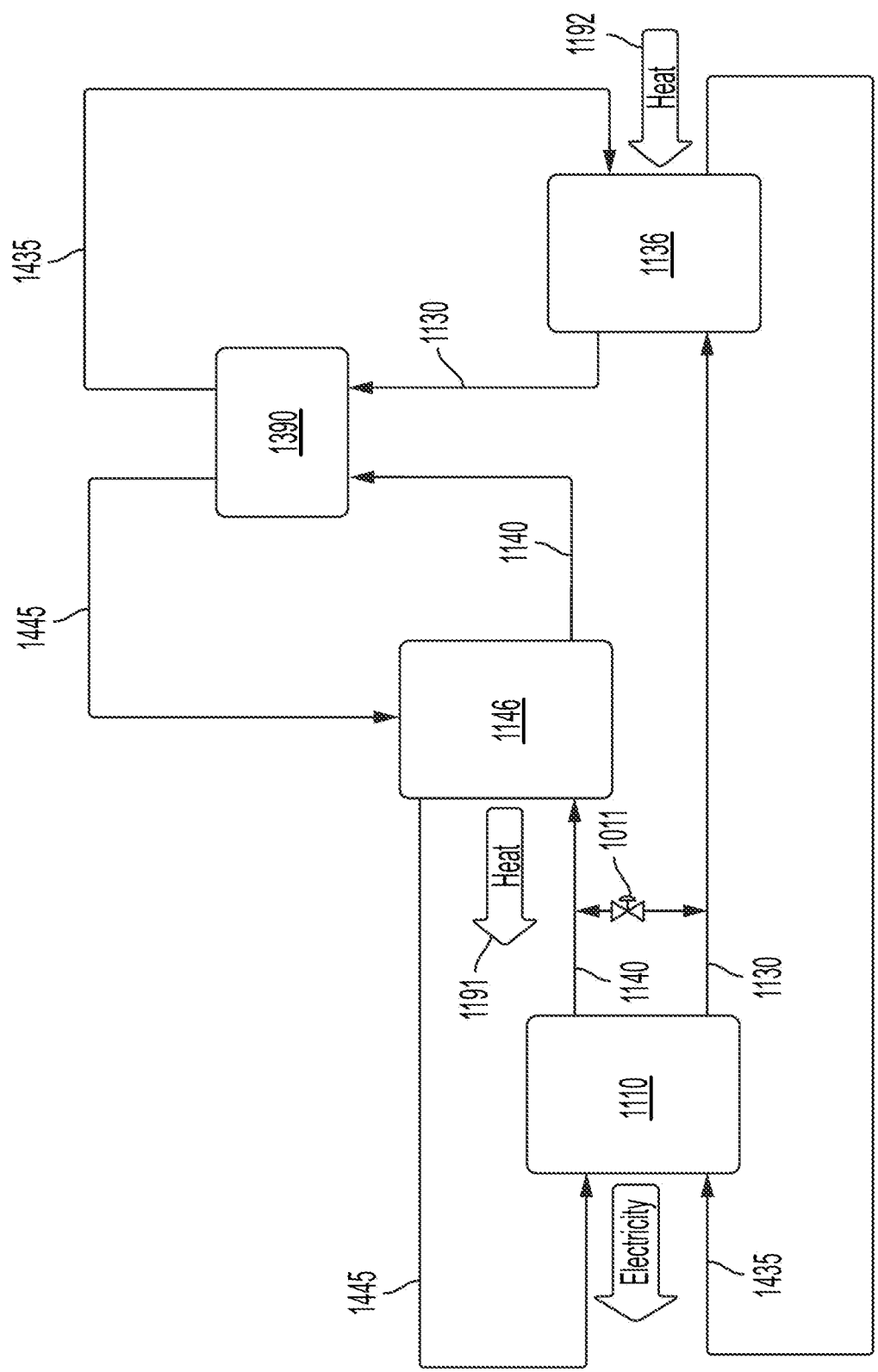
FIG. 14 is an example of a regeneration system incorporating a membrane distillation system.

FIG. 14 is an example of a regeneration system incorporating a membrane distillation system 1390, without salt precipitation. The spent dilute solution 1140 is directed to a dilute storage tank 1146 where it is cooled (i.e., thermal energy 1191 is removed) and directed to the membrane distillation system 1390. The spent concentrated solution 1130 is directed to a concentrate storage tank 1136 where it is warmed (i.e., thermal energy 1192 is put into the system) and directed to the membrane distillation system 1390. The heating and cooling of the storage tanks may optionally be supplied by one or more heat pumps (not shown). The spent dilute stream 1140 and the spent concentrate stream 1130 are directed into the membrane distillation system 1390, which operates using the difference in vapor pressure created by the temperature difference between the streams across the hydrophobic membrane (not shown). A regenerated dilute solution 1445 and regenerated concentrated solution 1435 are produced by operation of the membrane distillation system 1390, which are then circulated back into the RED or PRO battery 1110, optionally back through the storage tanks 1146, 1136 as shown in FIG. 14.

Figure 15:
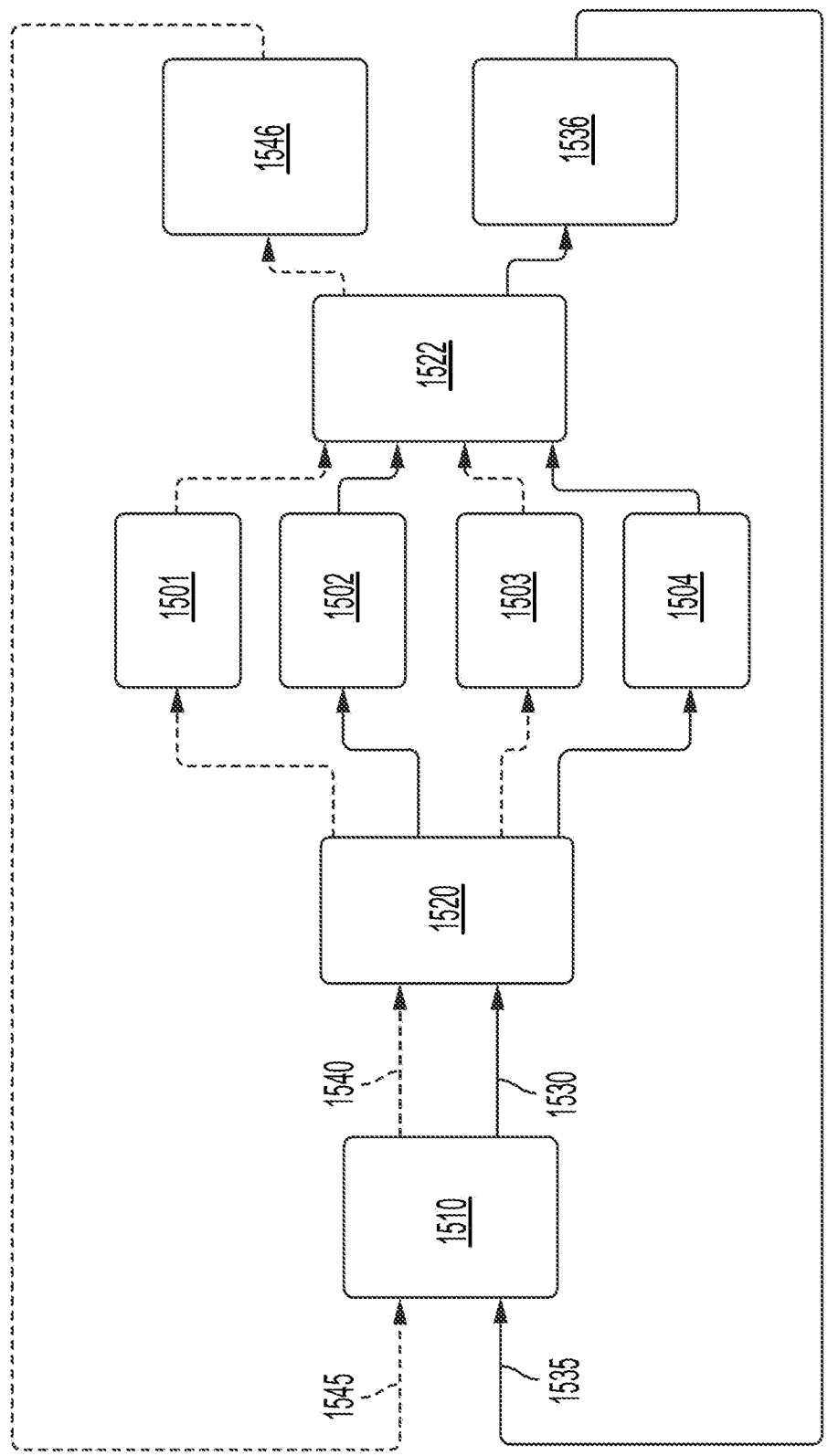
FIG. 15 is an example of a batch system for regeneration, with all of the operating tanks working.

FIG. 15 is an example of a RED/PRO tank in combination with a regeneration system with multiple tanks operational in a batch system. Each of operating tanks 1501, 1502, 1503, 1504 may be a cooling tank (i.e., precipitator), heating tank (i.e., dissolving tank), or may be inactive at any given time. For example, tank 1501 may first operate as a cooling tank to precipitate salt from spent dilute solution leaving regenerated dilute solution 1545 which may then be directed to the dilute tank 1546. Then, the operation of tank 1501 may change to a heating tank wherein spent concentrated solution 1530 is directed into the tank holding the precipitated salt and then warmed to dissolve the salt into the solution leaving regenerated concentrated solution 1535 which may then be directed to the concentrate tank 1536. At other times, tank 1501 may be inactive when it requires servicing, or for any other reason. This change in operation may be applied to any of the operating tanks in a batch system, as needed.

A valve system 1520 separates the tanks from the RED/PRO battery 1510 and operates by directing the flow of all or a portion of each of the spent dilute solution 1540 and the spent concentrated solution 1530 to one or more operating tanks 1501, 1502, 1503, 1504. A second valve system 1522 separates the operating tanks 1501, 1502, 1503, 1504 from the storage tanks and operates by directing the flow of the regenerated dilute solution 1545 and the regenerated concentrated solution 1535 to the respective storage tanks 1546, 1536: the dilute tank 1546 receive and holds the regenerated dilute solution 1545, and the concentrate tank 1536 receive and holds the regenerated concentrated solution 1535. While this FIG. 15 shows four operating tanks, fewer or more than four tanks may be connected to the system and work in a batch system.

Figure 16:
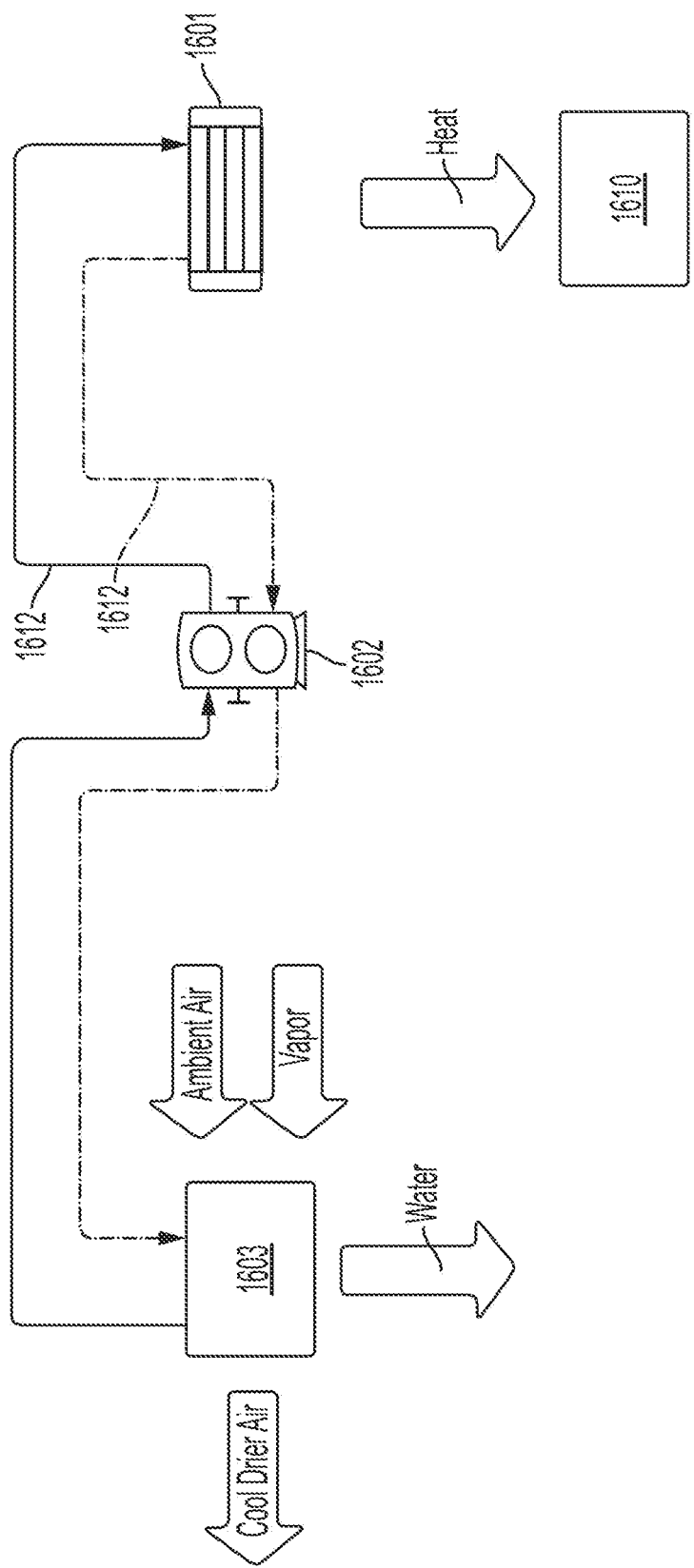
FIG. 16 is an example of water production using a vapor condenser and heat pump.

FIG. 16 shows a method of water production utilizing a vapor condenser 1601, a compressor or heat pump 1602, and an evaporator 1603. Refrigerant 1612 circulates through the vapor condenser 1601, heat pump 1602, and evaporator 1603. As shown, the evaporator 1603 removes water vapor from the ambient air, releasing water and air that is cooler and drier than the ambient air that entered. The condenser releases latent heat which may be used in a salinity gradient energy system 1610 disclosed herein. For example, this system may be used in a home or other building to dehumidify (or pull water from) the ambient air, and optionally to produce heat which may be converted into electricity by the RED/PRO battery.

Figure 17:
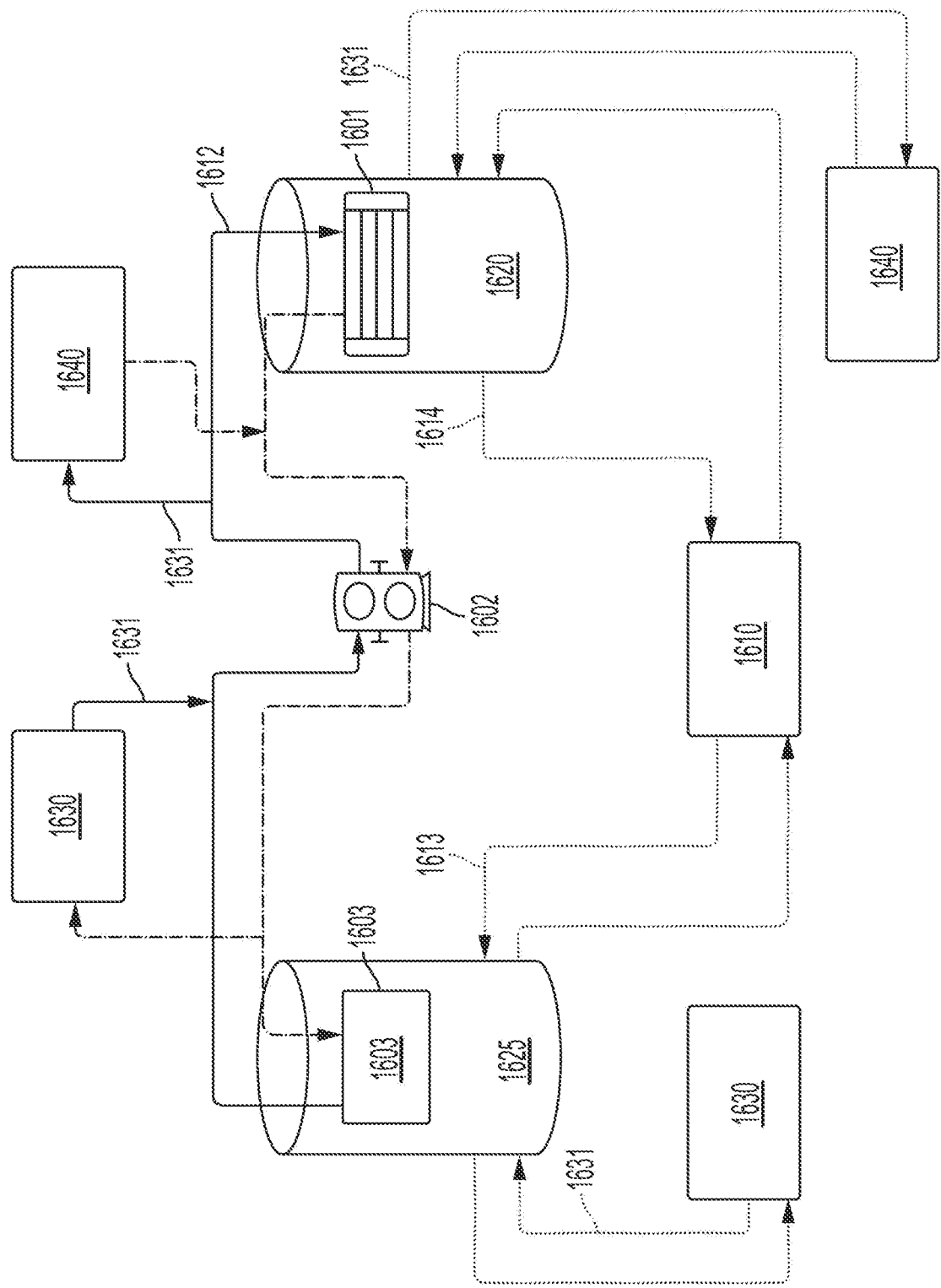
FIG. 17 is an example of how the system of FIG. 16 is used to create cold and hot tanks of fluid for use in a salinity gradient energy heat system.

FIG. 17 incorporates the system of FIG. 16 as a method of producing a hot water tank 1620 and a cold water tank 1625, which may be used to warm and cool solutions used in a salinity gradient engine heat system 1610 disclosed herein, optionally including a regeneration system, such as any of those shown in FIGS. 8-15. The evaporator 1603 cools the water to make a cold tank 1625, while the condenser 1601 heat the water to make a hot tank 1620. A heat transfer medium 1613 (e.g., water, glycol, oil, refrigerant) flows from the cold tank 1625 through the salinity gradient engine system 1610 in a closed loop and a heat transfer medium 1614 flows from the hot tank 1620 through the salinity gradient engine heat system 1610 in a closed loop. While optional, heat sinks 1640 are shown and serve to absorb or dissipate excess heat from the system. If the system is creating more heat than needed, it can be transferred to a heat sink which, e.g., may release the heat 1631 into the atmosphere. While optional, other heat sources 1630 are shown which provide thermal energy or heat 1631 into the system. Each other heat source may be any means known in the art, for example, but not limited to, heat exchanger, industrial steam, radiator, ambient, coil, convection.

A salinity gradient system disclosed herein may produce water (also referred to herein as atmospheric water generation). Atmospheric water generation is a process of extracting water from the air using various techniques such as condensation, adsorption, and cooling. The concept of atmospheric water generation is based on the fact that the atmospheric environment contains a significant amount of water vapor, even in arid and desert regions. When this is coupled with a RED/PRO battery, a heat pump, and a closed loop process, energy and water can be produced.

One means of atmospheric water generation is through condensation, which involves cooling the air to a temperature below the dew point/condensing temperature so that the water vapor in the air condenses into liquid water. This method is commonly used in thermodynamic cycles, such as dehumidifiers and heat pumps. This process is dependent on the temperature and humidity of the air, which is readily understood by one of ordinary skill in the art, for example, by review of a psychometric chart.

Another means of atmospheric water generation is through adsorption, which uses a desiccant material, such as silica gel, or zeolite, to absorb moisture from the air. Once the desiccant material has absorbed moisture and optionally becomes saturated, it may be heated to release the water, which can be collected and used. In a similar way, liquid desiccants, which are substances having a high affinity for water molecules, can be used to remove moisture from the air in what may be referred to as a liquid desiccant dehumidification process. The process may include: passing air (optionally having a mid to high humidity content, e.g., over about 30%; not dry or arid) over a surface coated with liquid desiccant, which absorbs the moisture from the air. When the absorbed water is removed from the liquid desiccant, it can be regenerated to its original state. Any solid desiccant material or liquid desiccant known in the art may be used herein.

The liquid desiccant dehumidification process may be a closed-loop system that includes two separate air-handling units: one unit for dehumidification (also referred to as the Conditioner), and the other unit for regeneration (also referred to as the Generator). The dehumidification unit typically consists of an absorber, where the liquid desiccant is sprayed or coated onto a surface, and a fan or blower circulates the humid air over the surface. As the air passes over the surface, the liquid desiccant absorbs the moisture from the air, leaving dry air to be discharged into the conditioned space.

The regeneration system may include a separate vessel containing the used liquid desiccant and a heat source, in this case a heat pump. In this embodiment, the absorbed moisture is removed from the liquid desiccant through a process called regeneration, where heat is applied to the liquid desiccant to drive off the absorbed water. The removed water vapor can be condensed via a heat pump to produce water, (which, with added filtration (e.g., Reverse osmosis or any other known system for use in the art), may be drinkable water) or, which may be added to the dilute solution to increase the salinity gradient of the RED/PRO battery. This produced water may additionally or alternatively be used to generate hydrogen as it can be used as a feed for electrolysis and/or RED.

Typically atmospheric water generation is highly energy intensive as it opposes the latent heat of vaporization of water to generate water. Coupled with a closed loop salinity gradient engine system, such as RED, that latent heat can be harnessed and converted into hydrogen and/or electricity rather than vented into the atmosphere. Certain advantages of liquid desiccant dehumidification process include its ability to extract water from low humidity levels in hot and humid climates, and its ability to use waste heat, solar energy and/or a heat pump for regeneration. Using a heat pump alone to condense water vapor from a dry hot climate region will be far more difficult than to use desiccants in conjunction with a heat pump. The liquid desiccant dehumidification process in combination with a heat pump, and a salinity gradient engine system allows for substantial water and energy production even in very dry and hot climates.

Figure 18:
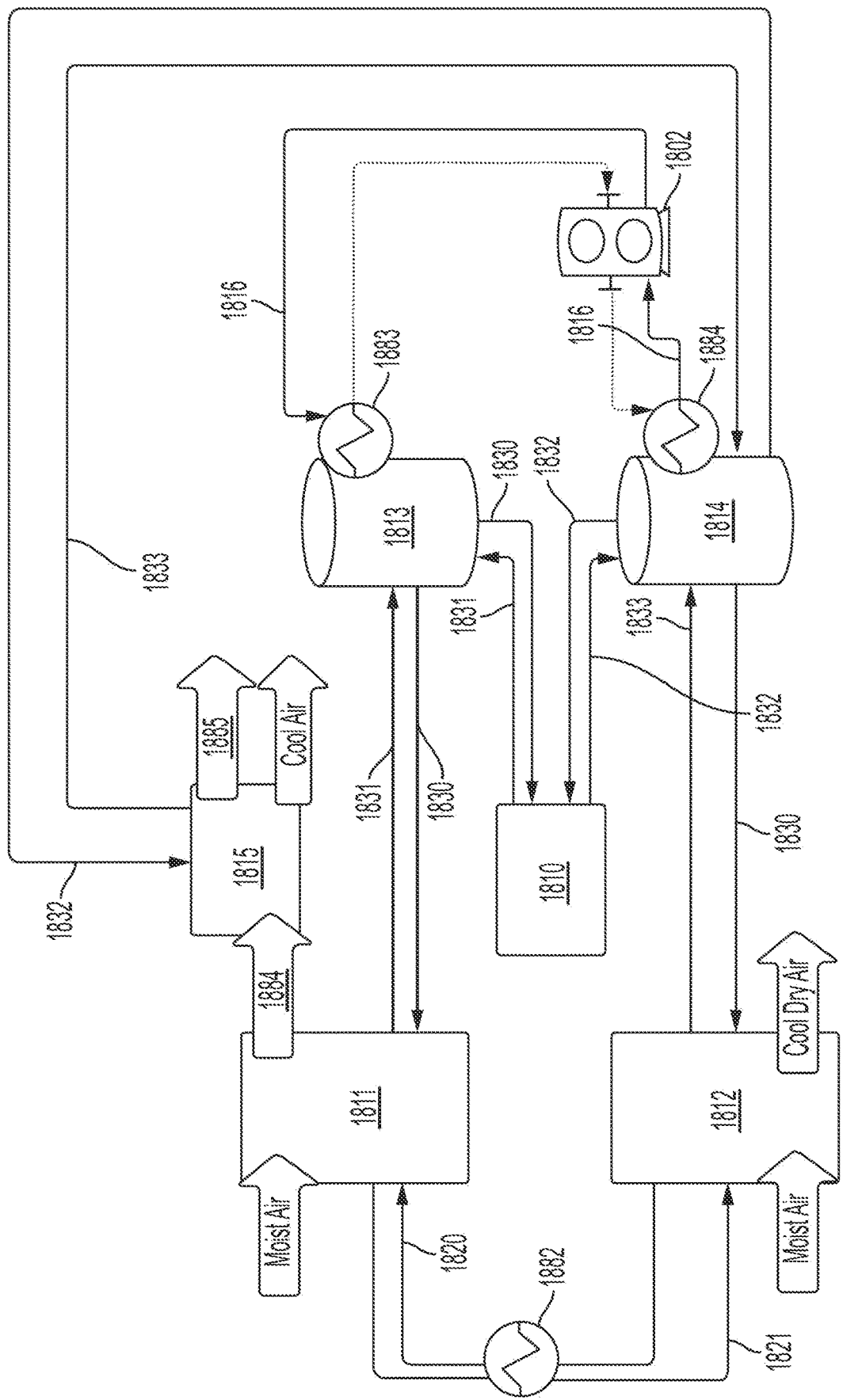
FIG. 18 is an example of a system and method of the disclosure including a RED or PRO battery in connection with atmospheric water generation using a liquid desiccant dehumidification process.

FIG. 18 is an example of atmospheric water generation using a liquid desiccant dehumidification process. In this example, water is pulled out of the air and absorbed by a desiccant within the conditioner 1812. The used (weakened) desiccant 1820 is transferred to the generator 1811 wherein the desiccant is regenerated by evaporation of water, thereby regenerating a strong desiccant 1821 which is redirected back to the conditioner 1812. Heat pump 1882 is employed to transfer heat between the streams of weakened and regenerated strong desiccant 1820, 1821. The vapor 1884 removed from the generator 1811 may be directed to a vapor condenser 1815 where it is cooled and liquified to make water 1885 for any purpose, including drinkable water (with application of a filtration system).

FIG. 18 utilizes the method of producing a hot water tank 1813 and a cold water tank 1814, which may be used to warm and cool solutions (e.g., water) used in a salinity gradient engine heat system 1810 disclosed herein, optionally including a regeneration system, such as any of those shown in FIGS. 8-15. The heat exchanger 1884 cools the water to make a cold tank 1814, while the heat exchanger 1883 heat the water to make a hot tank 1813. A heat transfer medium 1816 (e.g., water, glycol, oil, refrigerant) flows from the heat exchanger 1883, 1884 and into the heat pump 1802 in a closed loop One or more heat sinks and other heat sources may be incorporated to provide heating or cooling to one or both of the hot or cold tanks 1813, 1814. The hot tank 1813 provides hot water in closed loops to the generator 1811 and to the salt gradient heat engine system 1810 as hot supply streams 1830 which return back to the hot tank 1813 as streams 1831 at a lower temperature. The cold tank 1814 provides cold water in closed loops to the vapor condenser 1815, to the conditioner 1812, and to the salt gradient heat engine system 1810 as cold supply streams 1832 which return back to the cold tank 1814 as streams 1833 at a higher temperature.

A salinity gradient system disclosed herein may include forward osmosis (FO) as a means of regenerating the spent dilute and spent concentrated solutions from the RED/PRO battery, i.e., a regeneration system. In a forward osmosis system, a feed solution, such as the spent concentrated solution, may be placed on one side of a semipermeable membrane, and a draw solution may be placed on the other side of the semipermeable membrane. The draw solution may be any solution that has a higher osmotic pressure than the feed solution; it may include a different salt, a synthetic salt, or it can be essentially the same as the feed solution but at a higher concentration. A salt gradient is created to pull water out of the spent concentrated solution and then regenerated by the switchable solubility system incorporating the draw solution. The osmotic pressure gradient created by the draw solution pulls water molecules from the feed solution through the membrane, while leaving the salt and other contaminants on the side with the feed solution. This allows for the regeneration of the concentrated solution that may be directed back into the RED/PRO battery. The membrane used in the FO system may be any membrane that may be used in the PRO battery. However, with FO, the membrane doesn't have to be designed to withstand as high a pressure as the PRO membrane.

A forward osmosis system may incorporate a switchable solubility system, which utilizes the draw solution and a reversible reaction between carbon dioxide ($CO_2$) and water to create a solution having switchable solubility properties. These switchable solubility solutions are able to switch between a hydrophobic form and a hydrophilic form. A method of making a switchable solubility solution may include: dissolving an amine in water, and creating a solution with a specific pH level. For example, the amine may be 1-cyclohexylpiperidine, N-methyldipropylamine, Ethyl 4-(diethylamino)butanoate, N,N-Dimethylphenethylamine, N,N-diethylbutylamine, or the like. A draw solution, as referred to herein, is a solution that has high osmotic pressure or concentration to pull water across a semipermeable membrane. As such, the switchable solubility solution may be the draw solution in the forward osmosis system. When $CO_2$ is introduced into the switchable solubility solution, it reacts with the amine to form a salt, which causes the pH of the solution to lower. This change in pH causes the solubility of the amine to change, making it more or less soluble in water. Thus the solubility of the amine can be altered by the presence of $CO_2$ and is reversible by applying heat. Specifically, at a low pH (e.g., below about 7, or between 7 and 1), the amine becomes more soluble in the solution. Conversely, when the pH is high (e.g., above 7), the amine becomes less soluble in water, and less dissolves in the solution. The solubility of $CO_2$ is temperature dependent. With increased temperatures, the solubility of $CO_2$ decreases and allows for the water and $CO_2$ to separate out from the amine solution. Once the water is removed, the solution is cooled down to increase the $CO_2$ solubility to allow for the amine to completely dissolve and increase in solubility.

Using a switchable solubility system as described above permits regeneration of the draw solution while also leveraging the power of a heat pump which can provide simultaneous heating and cooling. When the solubility of the draw solution decreases, the water can be separated and sent and mixed with the spent dilute solution from the RED/PRO battery. By removing water, this concentrates and regenerates the draw solution used in the forward osmosis system, which regenerates the spent concentrated solution coming from the RED/PRO battery.

When the salinity gradient engine system operates near an industrial facility, such as a power plant, it can provide a number of benefits. A power plant produces both excess waste heat and release of $CO_2$ as an unwanted byproduct in the process. This industrial $CO_2$ may be used in the forward osmosis system disclosed herein to control the solubility of the draw solution.

Figure 19:
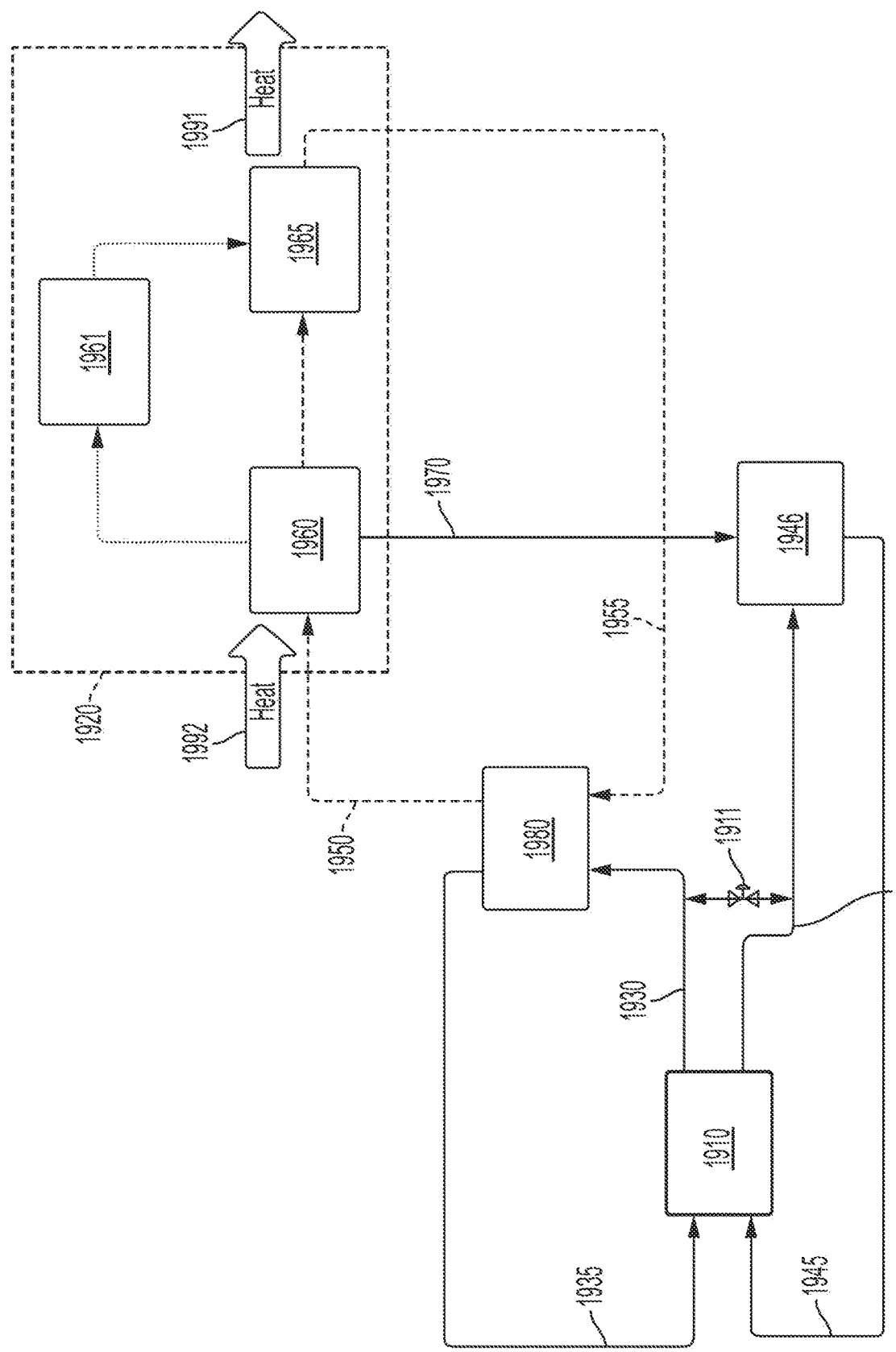
FIG. 19 is an example of a system and method of the disclosure including a RED or PRO battery in connection with a forward osmosis system.

In FIG. 19, this regeneration system circulates spent dilute solution 1940 in a closed loop from the RED or PRO battery 1910 through the dilute tank 1946, where water 1970 is added to make a regenerated dilute solution 1945 which is directed back to the RED or PRO battery 1910. The spent concentrated solution 1930 is also circulated in a closed loop from the RED or PRO battery 1910 through the forward osmosis system 1980, to make a regenerated concentrated solution 1935 which is directed back to the RED or PRO battery 1910. The switchable solubility system 1920 is also depicted. A draw solution 1955 is circulated through the forward osmosis system 1980 and used to operate the system, resulting in a spent draw solution 1950. In the recovery 1960, heat 1992 is added to the spent draw solution 1950 and $CO_2$ is released so that the solubility of the spent draw solution drops and water 1970 can be separated and decanted. When $CO_2$ is added back into the system in the generator 1965, the solubility of the solute in the draw solution increases (e.g., salt can be redissolved into the solution; it should be concentrated so that the osmotic pressure is high). To increase the solubility of $CO_2$, the solution is cooled (thermal energy 1991 is taken out of the system).

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a RED battery, a PRO system, a CAP system, a hydrogen generation subsystem, a salt precipitation subsystem, an evaporation subsystem, etc.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Figure 7:
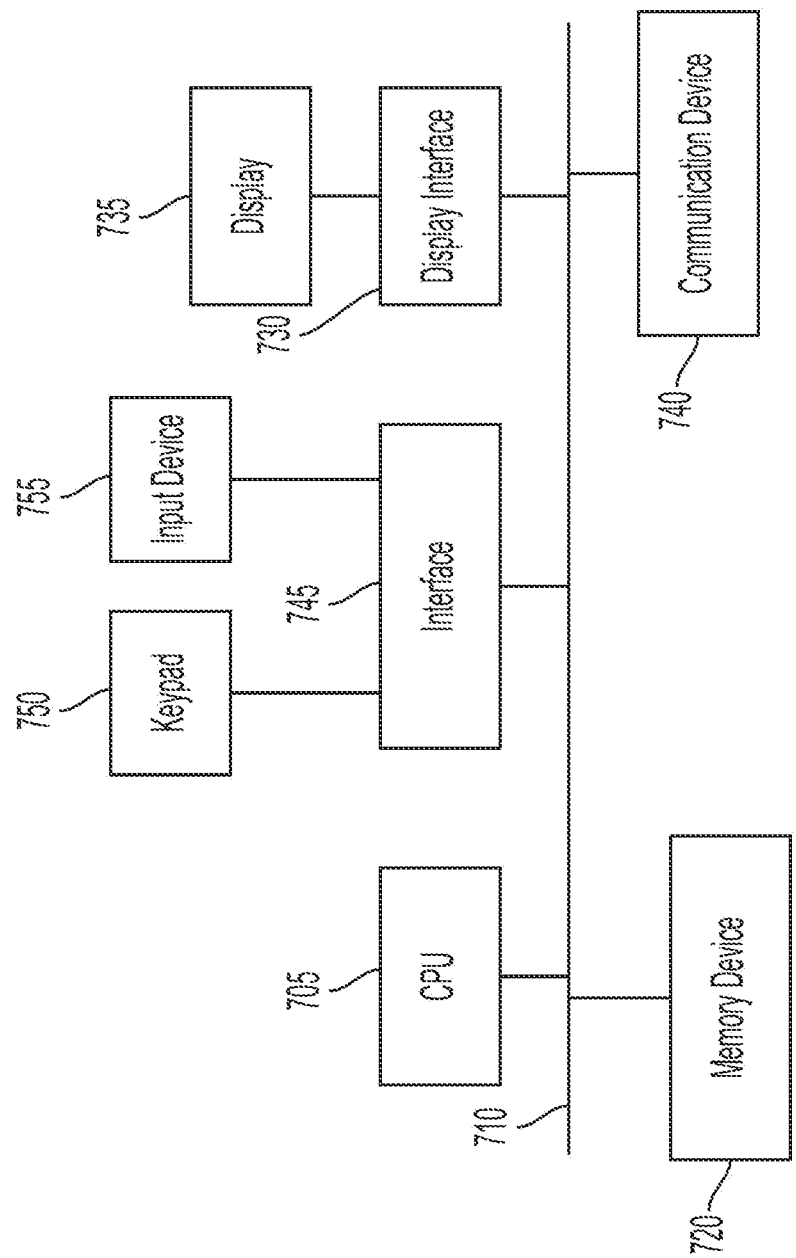
FIG. 7 shows a block diagram of an example of internal hardware that may be used to contain or implement program instructions according to an embodiment.

FIG. 7 illustrates example hardware that may be used to contain or implement program instructions. A bus 710 serves as the main information highway interconnecting the other illustrated components of the hardware. Central Processing Unit (CPU) 705 is the central processing unit of the system, performing calculations and logic operations required to execute a program. CPU 705, alone or in conjunction with one or more of the other elements disclosed in FIG. 7, is an example of a processor as such term is used within this disclosure. Read only memory (ROM) and random-access memory (RAM) constitute examples of non-transitory computer-readable storage media 720, memory devices or data stores as such terms are used within this disclosure.

Program instructions, software or interactive modules for providing the interface and performing any querying or analysis associated with one or more data sets may be stored in the memory device 720. Optionally, the program instructions may be stored on a tangible, non-transitory computer-readable medium such as a compact disk, a digital disk, flash memory, a memory card, a universal serial bus (USB) drive, an optical disc storage medium and/or other recording medium.

An optional display interface 730 may permit information from the bus 710 to be displayed on the display 735 in audio, visual, graphic or alphanumeric format. Communication with external devices may occur using various communication ports 740. A communication port 740 may be attached to a communications network, such as the Internet or an intranet.

The hardware may also include an interface 745 which allows for receipt of data from input devices such as a keypad 750 or other input device 755 such as a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also, that various presently unforeseen or unanticipated alternatives, modifications, variations or improvements therein may be subsequently made by those skilled in the art which are also intended to be encompassed by the following claims.

What is claimed is:

1. A salt gradient heat engine system for generating electricity comprising:
   a first saline solution;
   a second saline solution, wherein the salinity of the second saline solution is different than the salinity of the first saline solution;
   a heat pump configured to transfer thermal energy to the first saline solution and/or the second saline solution;

a selectively permeable membrane separating the first saline solution from the second saline solution, the selectively permeable membrane configured to control the mixing of the first saline solution and the second saline solution, the selectively permeable membrane further configured to capture at least some salinity-gradient energy as electrical power as the first saline solution and the second saline solution mix; and a regeneration system comprising a salt precipitation system configured to:
  receive a spent dilute solution;
  remove, by the heat pump, thermal energy from the spent dilute solution, causing the spent dilute solution to precipitate a salt and regenerate the dilute saline solution;
  after regenerating the dilute saline solution, circulate the dilute saline solution;
  introduce the precipitated salt into a spent concentrated solution; and
  cause the precipitated salt to dissolve in the spent concentrated solution and regenerate the concentrated saline solution.

2. The system of claim 1, wherein the heat pump is a vapor compress cycle, a thermoelectric chiller, a chemical absorption chiller, or other apparatus for simultaneous heating and cooling.

3. The system of claim 1, wherein the regeneration system is further configured to transfer at least some of the thermal energy removed from the dilute saline solution back to the dilute saline solution after causing salt dissolved in the dilute saline solution to precipitate.

4. The system of claim 1, wherein the regeneration system is further configured to transfer at least some of the thermal energy removed from the spent dilute solution to the spent concentrated solution, causing the precipitated salt to dissolve in the spent concentrated solution.

5. The system of claim 1, wherein the heat source is configured to transfer thermal energy to the spent concentrated solution, causing the precipitated salt to dissolve in the spent concentrated solution.

6. The system of claim 1, wherein the concentrated saline solution comprises a substance having a solubility with a non-linear temperature dependence.

7. The system of claim 1, wherein the regeneration system further comprises a membrane distillation system.

8. The system of claim 1, wherein the regeneration system further comprises an electrodialysis system.

9. The system of claim 1, wherein the heat source comprises one or more of geothermal heat, industrial waste heat, or solar heat.

10. The system of claim 1, wherein the permeability of the selectively permeable membrane is adjustable by application of a stretching force.

11. A salt gradient heat engine system for generating electricity comprising:
  a first saline solution;
  a second saline solution, wherein the salinity of the second saline solution is different than the salinity of the first saline solution;
  a heat pump configured to transfer thermal energy to the first saline solution and/or the second saline solution;
  a selectively permeable membrane separating the first saline solution from the second saline solution, the selectively permeable membrane configured to control mixing of the first saline solution and the second saline solution, the selectively permeable membrane further configured to capture at least some salinity-gradient energy as electrical power as the first saline solution and the second saline solution mix; and
  a regeneration system comprising a salt precipitation system comprising:
    a salt precipitator configured to receive a spent dilute solution and precipitate salt from the spent dilute solution to regenerate the dilute saline solution;
    a concentrate tank configured to receive a spent concentrated solution and receive salt generated by the salt precipitator to regenerate the concentrated saline solution; and
    one or more heat exchangers.

12. The system of claim 11, further comprising a dilute tank configured to receive the dilute saline solution from the salt precipitator.

13. The system of claim 11, further comprising a heat source system configured to supply thermal energy to the concentrate tank.

14. The system of claim 11, wherein the regeneration system is further configured to transfer at least some of the thermal energy removed from the dilute saline solution back to the dilute saline solution after causing salt dissolved in the dilute saline solution to precipitate.

15. The system of claim 11, wherein the regeneration system is further configured to transfer at least some of the thermal energy removed from the spent dilute solution to the spent concentrated solution, causing the precipitated salt to dissolve in the spent concentrated solution.

16. The system of claim 13, wherein the heat source is configured to transfer thermal energy to the spent concentrated solution, causing the precipitated salt to dissolve in the spent concentrated solution.

17. The system of claim 11, wherein the concentrated saline solution comprises a substance having a solubility with a non-linear temperature dependence.

18. The system of claim 11, wherein the regeneration system further comprises a membrane distillation system.

19. The system of claim 11, wherein the regeneration system further comprises an electrodialysis system.

20. The system of claim 11, wherein the thermal energy comprises one or more of geothermal heat, industrial waste heat, or solar heat.

21. The system of claim 11, wherein the permeability of the selectively permeable membrane is adjustable by application of a stretching force.

22. The system of claim 11, wherein the heat pump is a vapor compress cycle, a thermoelectric chiller, a chemical absorption chiller, or other apparatus for simultaneous heating and cooling.

* * * * *